US009169626B2

(12) United States Patent
Guler et al.

(10) Patent No.: US 9,169,626 B2
(45) Date of Patent: Oct. 27, 2015

(54) AUTOMATIC BATHROOM FLUSHERS

(76) Inventors: Fatih Guler, Winchester, MA (US); Kay Herbert, Winthrop, MA (US); Qiaohong Chen, Lexington, MA (US); Xiaoxiong Mo, Lexington, MA (US); Wei Jin, Waltham, MA (US); James Counaghton Allen, Chicago, IL (US); John R. Wilson, Naperville, IL (US); Martin Marcichow, Riverside, IL (US); Natan E. Parsons, Brookline, MA (US); Amy Parsons, legal representative, Brookline, MA (US); Jean F. Daher, Auburn, MA (US)

( * ) Notice: Subject to any disclaimer, the term of this patent is extended or adjusted under 35 U.S.C. 154(b) by 1059 days.

(21) Appl. No.: 12/655,696

(22) Filed: Jan. 4, 2010

(65) Prior Publication Data

US 2010/0252759 A1 Oct. 7, 2010

Related U.S. Application Data

(63) Continuation of application No. PCT/US2008/008242, filed on Jul. 3, 2008, and a continuation-in-part of application No. 11/716,546, filed on Mar. 9, 2007, now abandoned, which is a (Continued)

(51) Int. Cl.
*F16K 31/12* (2006.01)
*F16K 31/02* (2006.01)
(Continued)

(52) U.S. Cl.
CPC . *E03D 3/06* (2013.01); *E03D 5/105* (2013.01)

(58) Field of Classification Search
CPC ..... F16K 31/02; F16K 31/06; F16K 31/0644; F16K 31/0672; F16K 31/0675; F16K 31/402; F16K 31/404; F16K 31/406; F16K 31/408; F16K 31/0655; E03D 5/10; E03D 5/105

USPC .......... 251/129.03, 129.04, 30.01–30.05, 45, 251/28; 4/302, 304, 305, 313, 406; 340/3.1
See application file for complete search history.

(56) References Cited

U.S. PATENT DOCUMENTS

| 207,482 A | 8/1878 | Blessing | 137/188 |
| 1,501,331 A | 7/1924 | Gulick | 137/245 |

(Continued)

FOREIGN PATENT DOCUMENTS

| DE | 196 08 157 | 7/1997 |
| DE | 29717352 | 1/1998 |

(Continued)

OTHER PUBLICATIONS

International Search Report issued in PCT Application PCT/US 03/41303 on May 4, 2004 (5 pages).

(Continued)

*Primary Examiner* — John K Fristoe, Jr.
*Assistant Examiner* — Andrew J Rost
(74) *Attorney, Agent, or Firm* — Ivan David Zitkovsky

(57) ABSTRACT

An automatic bathroom flusher includes a flusher body, a valve assembly, an electronic control system, and a flusher cover. The flusher body includes an inlet and an outlet, and is designed to accommodate the valve assembly that controls water flow between the inlet and the outlet. The valve assembly includes a valve member movable with respect to a valve seat providing a sealing action. The bathroom flusher may include a user sensor, and one or more photovoltaic cells for supplying electrical power to the electronic control system. The bathroom flusher enables two or multiple flush volumes in automatic or manual modes, depending on a user action. The bathroom flusher may include a user interface including a button and visible LEDs.

38 Claims, 60 Drawing Sheets

Related U.S. Application Data continuation of application No. 10/783,701, filed on Feb. 20, 2004, now Pat. No. 7,188,822, and a continuation-in-part of application No. 11/159,422, filed on Jun. 22, 2005, now abandoned, which is a continuation of application No. PCT/US03/41303, filed on Dec. 26, 2003, which is a continuation-in-part of application No. PCT/US03/38730, filed on Dec. 4, 2003.

(60) Provisional application No. 60/958,358, filed on Jul. 3, 2007, provisional application No. 60/999,591, filed on Oct. 19, 2007, provisional application No. 60/448,995, filed on Feb. 20, 2003.

(51) Int. Cl.
  *E03D 3/06* (2006.01)
  *E03D 5/10* (2006.01)

(56) References Cited

U.S. PATENT DOCUMENTS

| | | | | |
|---|---|---|---|---|
| 1,518,942 | A | 12/1924 | Spear | 251/20.04 |
| 2,471,328 | A | 5/1949 | Jones | 137/403 |
| 2,619,122 | A | 11/1952 | Hunter | 251/120 |
| 2,619,986 | A | 12/1952 | Goepfrich et al. | 251/129.17 |
| 2,685,301 | A | 8/1954 | Dreier | 137/386 |
| 2,827,073 | A | 3/1958 | Owens | 137/426 |
| 2,842,400 | A | 7/1958 | Booth et al. | 239/569 |
| 2,877,791 | A | 3/1959 | Rich | 137/487 |
| 2,923,314 | A | 2/1960 | Badger, Jr. et al. | 137/414 |
| 2,986,155 | A | 5/1961 | Doyle | 137/218 |
| 2,999,191 | A | 9/1961 | Muradian et al. | 361/195 |
| 3,019,453 | A | 2/1962 | Radcliffe | 4/249 |
| 3,034,151 | A | 5/1962 | Filliung | 4/249 |
| 3,056,143 | A | 10/1962 | Foster | 4/249 |
| 3,058,485 | A | 10/1962 | McQueen | 137/403 |
| 3,098,635 | A | 7/1963 | Delaporte et al. | 251/54 |
| 3,166,291 | A | 1/1965 | Specht | 251/285 |
| 3,242,940 | A | 3/1966 | Sirotek | 137/218 |
| 3,254,664 | A | 6/1966 | Delaney et al. | 137/244 |
| 3,285,261 | A | 11/1966 | Chaney | 137/505.12 |
| 3,318,565 | A | 5/1967 | Cutler | 251/45 |
| 3,369,205 | A | 2/1968 | Hamrick | 335/177 |
| 3,373,449 | A | 3/1968 | Rusnok | 4/305 |
| 3,386,462 | A | 6/1968 | Walters | 137/244 |
| 3,400,731 | A | 9/1968 | McCormack | 137/245 |
| 3,495,803 | A | 2/1970 | Schoepe et al. | 251/25 |
| 3,495,804 | A | 2/1970 | Muller et al. | 251/36 |
| 3,559,675 | A | 2/1971 | Schoepe et al. | 137/436 |
| 3,586,017 | A | 6/1971 | Walters | 137/59 |
| 3,606,241 | A | 9/1971 | Bornholdt | 251/52 |
| 3,693,649 | A | 9/1972 | Gordon et al. | 137/414 |
| 3,740,019 | A | 6/1973 | Kessell et al. | 251/129.17 |
| 3,763,881 | A | 10/1973 | Jones | 137/414 |
| 3,778,023 | A | 12/1973 | Billeter | 251/30.01 |
| 3,791,619 | A | 2/1974 | Pett | 251/45 |
| 3,802,462 | A | 4/1974 | Trösch | 137/556 |
| 3,812,398 | A | 5/1974 | Kozel et al. | 251/331 |
| 3,821,967 | A | 7/1974 | Sturman | 137/624.15 |
| 3,842,857 | A | 10/1974 | McCornack | 137/242 |
| 3,864,567 | A | 2/1975 | Bez | 250/338.1 |
| 3,895,645 | A | 7/1975 | Johnson | 137/403 |
| 4,010,769 | A | 3/1977 | De Lorenzo et al. | 137/312 |
| 4,011,553 | A | 3/1977 | Barri | |
| 4,065,095 | A | 12/1977 | Johnson | 251/118 |
| 4,097,786 | A | 6/1978 | Lund | 318/282 |
| 4,105,186 | A | 8/1978 | Eby | 251/35 |
| 4,114,647 | A | 9/1978 | Sturman et al. | 137/624.2 |
| 4,135,696 | A | 1/1979 | Saarem et al. | 251/30.02 |
| 4,141,091 | A | 2/1979 | Pulvari | 4/313 |
| 4,206,901 | A | 6/1980 | Williams | 251/35 |
| 4,228,534 | A * | 10/1980 | Fellrath et al. | 368/224 |
| 4,231,287 | A | 11/1980 | Smiley | 92/94 |
| 4,272,052 | A | 6/1981 | Gidner | 251/39 |
| 4,280,680 | A | 7/1981 | Payne | 251/175 |
| 4,295,485 | A | 10/1981 | Waterfield | 137/74 |
| 4,295,631 | A | 10/1981 | Allen | 251/30.03 |
| 4,295,653 | A | 10/1981 | Coles | 277/320 |
| 4,304,391 | A | 12/1981 | Yamaguchi | 251/129.05 |
| 4,309,781 | A | 1/1982 | Lissau | 4/304 |
| 4,383,234 | A | 5/1983 | Yatsushiro et al. | 335/253 |
| 4,505,451 | A | 3/1985 | Jonas | 251/285 |
| 4,541,563 | A | 9/1985 | Uetsuhara | 239/64 |
| 4,570,272 | A | 2/1986 | Kawaguchi et al. | 4/302 |
| 4,604,735 | A | 8/1986 | Parsons | 367/93 |
| 4,609,178 | A | 9/1986 | Baumann | 251/229 |
| 4,611,356 | A | 9/1986 | Lin | 4/301 |
| 4,671,485 | A | 6/1987 | Saarem | 251/60 X |
| 4,672,206 | A | 6/1987 | Suzuki et al. | 250/347 |
| 4,709,427 | A | 12/1987 | Laverty, Jr. | 4/427 |
| 4,729,342 | A | 3/1988 | Loctin | 119/163 |
| 4,742,583 | A | 5/1988 | Yoshida et al. | 4/313 |
| 4,756,031 | A | 7/1988 | Barrett | 4/407 |
| 4,787,411 | A | 11/1988 | Moldenhauer | 137/244 |
| 4,793,588 | A | 12/1988 | Laverty, Jr. | 251/30.03 |
| 4,795,908 | A | 1/1989 | Morimoto et al. | 250/353 |
| 4,796,662 | A | 1/1989 | Hoffmann et al. | 137/596.16 |
| 4,805,247 | A | 2/1989 | Laverty, Jr. | 4/304 |
| 4,823,414 | A | 4/1989 | Piersimoni et al. | 4/623 |
| 4,823,825 | A | 4/1989 | Buchl | 137/1 |
| 4,826,132 | A | 5/1989 | Moldenhauer | 251/129.17 |
| 4,832,263 | A | 5/1989 | Poynor | 239/197 |
| 4,832,582 | A | 5/1989 | Buffet | 417/413.1 |
| 4,839,039 | A | 6/1989 | Parsons et al. | 210/143 |
| 4,887,032 | A | 12/1989 | Hetrick | 324/207.16 |
| 4,891,864 | A | 1/1990 | Laverty, Jr. | 91/399 |
| 4,893,645 | A | 1/1990 | Augustinas et al. | 137/315.03 |
| 4,894,698 | A | 1/1990 | Hijikigawa et al. | 257/254 |
| 4,894,874 | A | 1/1990 | Wilson | 4/623 |
| 4,910,487 | A | 3/1990 | Kleinhappl | 335/234 |
| 4,911,401 | A | 3/1990 | Holcomb et al. | 251/30.03 |
| 4,914,758 | A * | 4/1990 | Shaw | 4/304 |
| 4,921,208 | A | 5/1990 | LaMarca | 251/30.04 |
| 4,921,211 | A | 5/1990 | Novak et al. | 251/129.04 |
| 4,932,430 | A | 6/1990 | Fernstrom | 137/85 |
| 4,941,215 | A | 7/1990 | Liu | 4/406 |
| 4,941,219 | A | 7/1990 | Van Marcke | 4/623 |
| 4,944,487 | A | 7/1990 | Holtermann | 251/129.17 |
| 4,977,929 | A | 12/1990 | Chinnock et al. | 137/863 |
| 4,988,074 | A | 1/1991 | Najmolhoda | 251/129.08 |
| 4,989,277 | A | 2/1991 | Tsutsui et al. | 4/367 |
| 4,998,673 | A | 3/1991 | Pilolla | 239/67 |
| 5,025,516 | A | 6/1991 | Wilson | 4/623 |
| 5,027,850 | A | 7/1991 | Peterson et al. | 137/245 |
| 5,032,812 | A | 7/1991 | Banick et al. | 335/17 |
| 5,036,553 | A | 8/1991 | Sanderson | 4/313 |
| 5,063,955 | A | 11/1991 | Sakakibara | 137/1 |
| 5,074,520 | A | 12/1991 | Lee et al. | 251/40 |
| 5,086,526 | A | 2/1992 | Van Marcke | 4/623 |
| 5,109,886 | A | 5/1992 | Tauscher | 137/596.17 |
| 5,125,621 | A | 6/1992 | Parsons et al. | 251/30.03 |
| 5,127,625 | A | 7/1992 | Kleinhappl | 251/129.17 |
| 5,169,118 | A | 12/1992 | Whiteside | 251/30.03 |
| 5,188,337 | A | 2/1993 | Mertens et al. | 251/129.17 |
| 5,195,720 | A | 3/1993 | Nortier et al. | 251/129.04 |
| 5,213,303 | A | 5/1993 | Walker | 251/30.02 |
| 5,213,305 | A | 5/1993 | Whiteside et al. | 251/40 |
| 5,224,685 | A | 7/1993 | Chiang et al. | 251/129.04 |
| 5,232,194 | A | 8/1993 | Saadi et al. | 251/40 |
| 5,244,179 | A | 9/1993 | Wilson | 251/30.03 |
| 5,245,024 | A | 9/1993 | Scarpa et al. | 536/56 |
| 5,251,188 | A | 10/1993 | Parsons et al. | 367/140 |
| 5,251,872 | A | 10/1993 | Kodaira | 251/129.04 |
| 5,265,594 | A | 11/1993 | Olsson et al. | 128/204.18 |
| 5,265,843 | A | 11/1993 | Kleinhappl | 251/129.17 |
| 5,281,808 | A | 1/1994 | Kunkel | 250/221 |
| 5,295,655 | A | 3/1994 | Wilson et al. | 251/40 |
| 5,313,673 | A | 5/1994 | Saadi et al. | 4/313 |
| 5,315,719 | A | 5/1994 | Tsutsui et al. | 4/300 |
| 5,335,694 | A | 8/1994 | Whiteside | 137/625.37 |
| 5,375,811 | A | 12/1994 | Reinicke | 251/129.16 |
| D354,113 | S | 1/1995 | Nortier et al. | D23/233 |
| D355,478 | S | 2/1995 | Allen et al. | D23/249 |

(56) References Cited

U.S. PATENT DOCUMENTS

| | | | |
|---|---|---|---|
| 5,408,369 A | 4/1995 | Miura et al. | 360/75 |
| D357,976 S | 5/1995 | Allen et al. | D23/233 |
| 5,412,816 A | 5/1995 | Paterson et al. | 4/623 |
| 5,431,181 A | 7/1995 | Saadi et al. | 137/15.11 |
| 5,433,245 A | 7/1995 | Prather et al. | 137/554 |
| 5,456,279 A | 10/1995 | Parsons et al. | 137/245 |
| 5,474,303 A | 12/1995 | Coles | 277/317 |
| 5,481,187 A | 1/1996 | Marcott et al. | 324/207.16 |
| 5,497,135 A | 3/1996 | Wisskirchen et al. | 335/253 |
| 5,508,510 A | 4/1996 | Laverty et al. | 250/221 |
| 5,539,198 A | 7/1996 | McMichael et al. | 250/221 |
| 5,548,119 A | 8/1996 | Nortier | 4/623 |
| 5,555,912 A | 9/1996 | Saadi et al. | 137/801 |
| 5,566,702 A | 10/1996 | Philipp | 137/1 |
| 5,574,617 A | 11/1996 | Shimanuki et al. | 361/154 |
| 5,583,434 A | 12/1996 | Moyers et al. | 324/207.16 |
| 5,584,465 A | 12/1996 | Ochsenreiter | 251/65 |
| 5,586,746 A | 12/1996 | Humpert et al. | 4/623 |
| 5,588,636 A | 12/1996 | Eichholz et al. | 251/129.04 |
| 5,600,237 A | 2/1997 | Nippert | 324/207.16 |
| 5,636,601 A | 6/1997 | Moriya et al. | 123/90.11 |
| 5,651,384 A | 7/1997 | Rudrich | 137/1 |
| 5,668,366 A | 9/1997 | Mauerhofer | 250/221 |
| 5,680,879 A | 10/1997 | Sheih et al. | 137/240 |
| 5,708,355 A | 1/1998 | Schrey | 323/282 |
| 5,709,245 A | 1/1998 | Miller | 137/625.64 |
| 5,716,038 A | 2/1998 | Scarffe | 251/30.19 |
| D393,898 S | 4/1998 | Gotwald | D23/303 |
| 5,747,684 A | 5/1998 | Pace et al. | 73/119 A |
| 5,749,521 A | 5/1998 | Lattery | 239/64 |
| D396,090 S | 7/1998 | Marcichow et al. | D23/233 |
| 5,780,854 A | 7/1998 | Lin | 250/347 |
| 5,785,955 A | 7/1998 | Fischer | 424/49 |
| 5,787,915 A | 8/1998 | Byers et al. | 137/1 |
| 5,787,924 A | 8/1998 | Cewers et al. | 137/487.5 |
| 5,797,360 A | 8/1998 | Pischinger et al. | 123/90.11 |
| 5,804,962 A | 9/1998 | Kather et al. | 324/207.16 |
| 5,815,362 A | 9/1998 | Kahr et al. | 361/153 |
| 5,819,336 A | 10/1998 | Gilliam et al. | 4/623 |
| 5,855,356 A | 1/1999 | Fait | 251/129.04 |
| 5,881,993 A | 3/1999 | Wilson et al. | 251/40 |
| 5,887,848 A | 3/1999 | Wilson | 251/40 |
| 5,900,201 A | 5/1999 | Chatterjee et al. | 264/109 |
| 5,901,384 A | 5/1999 | Sim | 4/302 |
| 5,905,625 A | 5/1999 | Schebitz | 361/154 |
| D411,609 S | 6/1999 | Stoltenberg et al. | D23/233 |
| 5,915,417 A | 6/1999 | Diaz et al. | 137/624.11 |
| 5,918,855 A | 7/1999 | Hamanaka et al. | 251/129.04 |
| 5,927,603 A | 7/1999 | McNabb | 239/63 |
| 5,941,505 A | 8/1999 | Nagel | 251/335.2 |
| 5,943,712 A | 8/1999 | Van Marcke | 4/623 |
| 5,950,983 A | 9/1999 | Jahrling | 4/313 |
| 5,960,813 A * | 10/1999 | Sturman et al. | 137/78.3 |
| 5,964,192 A | 10/1999 | Ishii | 123/90.11 |
| 5,966,076 A | 10/1999 | Cantrell | |
| 5,967,182 A | 10/1999 | Wilson | 137/544 |
| 5,979,500 A | 11/1999 | Jahrling et al. | 137/624.12 |
| 5,984,262 A | 11/1999 | Parsons et al. | 251/129.04 |
| 5,996,965 A | 12/1999 | Eichholz et al. | 251/30.05 |
| 6,000,674 A | 12/1999 | Cheng | 251/26 |
| 6,019,343 A | 2/2000 | Tsai | 251/30.02 |
| 6,024,059 A | 2/2000 | Kamimaru et al. | 123/90.11 |
| 6,044,814 A | 4/2000 | Fuwa | 123/90.11 |
| 6,056,261 A | 5/2000 | Aparicio et al. | 251/129.03 |
| 6,127,671 A | 10/2000 | Parsons et al. | 250/221 |
| 6,155,231 A | 12/2000 | Adachi et al. | 123/399 |
| 6,158,715 A | 12/2000 | Kirschbaum | 251/129.06 |
| 6,161,726 A | 12/2000 | Parsons et al. | 222/52 |
| 6,182,689 B1 | 2/2001 | Lauer et al. | 137/550 |
| 6,212,697 B1 | 4/2001 | Parsons et al. | 4/302 |
| 6,216,730 B1 | 4/2001 | Hall | 7/550 |
| 6,227,219 B1 | 5/2001 | Pino | 137/1 |
| 6,243,885 B1 | 6/2001 | Lopez-Torres, Jr. | 4/300 |
| 6,250,601 B1 | 6/2001 | Kolar et al. | 251/129.04 |
| 6,260,576 B1 | 7/2001 | Allen | 137/550 |
| 6,273,394 B1 | 8/2001 | Vincent et al. | 251/129.04 |
| 6,286,153 B1 | 9/2001 | Keller | 4/301 |
| 6,293,516 B1 | 9/2001 | Parsons et al. | 251/129.04 |
| 6,299,127 B1 | 10/2001 | Wilson | 251/38 |
| 6,305,662 B1 | 10/2001 | Parsons et al. | 251/129.04 |
| D452,898 S | 1/2002 | Johnson | D23/233 |
| 6,340,032 B1 | 1/2002 | Zosimadis | 137/552 |
| 6,353,942 B1 | 3/2002 | Pondelick et al. | 4/431 |
| 6,367,096 B1 | 4/2002 | Quintana | 4/427 |
| 6,382,586 B1 | 5/2002 | Wilson et al. | 251/40 |
| 6,450,478 B2 | 9/2002 | Parsons et al. | 251/129.04 |
| 6,499,152 B2 | 12/2002 | Johnson | 3/302 |
| 6,560,790 B2 | 5/2003 | Saar et al. | 4/302 |
| 6,609,698 B1 | 8/2003 | Parsons et al. | 251/129.17 |
| 6,619,614 B2 | 9/2003 | Parsons et al. | 251/129.04 |
| D480,450 S | 10/2003 | Saadi et al. | D23/249 |
| 6,643,853 B2 | 11/2003 | Wilson et al. | 4/249 |
| 6,659,420 B2 | 12/2003 | Hwang et al. | 251/26 |
| 6,685,158 B2 | 2/2004 | Parsons | 251/30.01 |
| 6,871,835 B2 | 3/2005 | Parsons | 251/30.83 |
| 6,938,280 B2 | 9/2005 | Wawrla et al. | 4/304 |
| 6,956,498 B1 * | 10/2005 | Gauthier et al. | 340/12.51 |
| D531,696 S | 11/2006 | Lopez | D23/235 |
| 7,188,822 B2 | 3/2007 | Marcichow | 251/30.01 |
| 7,325,781 B2 | 2/2008 | Parsons | 251/129.04 |
| D569,947 S | 5/2008 | Johnson | D23/233 |
| 2002/0162166 A1 * | 11/2002 | Saar et al. | 4/302 |

FOREIGN PATENT DOCUMENTS

| | | |
|---|---|---|
| EP | 0337367 | 10/1989 |
| EP | 1 057 942 | 12/2000 |
| JP | 09242155 | 9/1997 |
| JP | 2000282528 | 10/2000 |
| WO | WO85/05648 | 12/1985 |
| WO | WO 0116436 | 3/2001 |

OTHER PUBLICATIONS

International Search Report issued in PCT Application PCT/US 03/38730 on May 12, 2004 (6 pages).

International Search Report issued in PCT Application PCT/US 03/20117 on Dec. 18, 2003.

International Preliminary Report on Patentability and Written Opinion issued in PCT Application PCT/US 08/008242 issued on Jan. 5.2010, and Oct. 1, 2008 (6 pages).

* cited by examiner

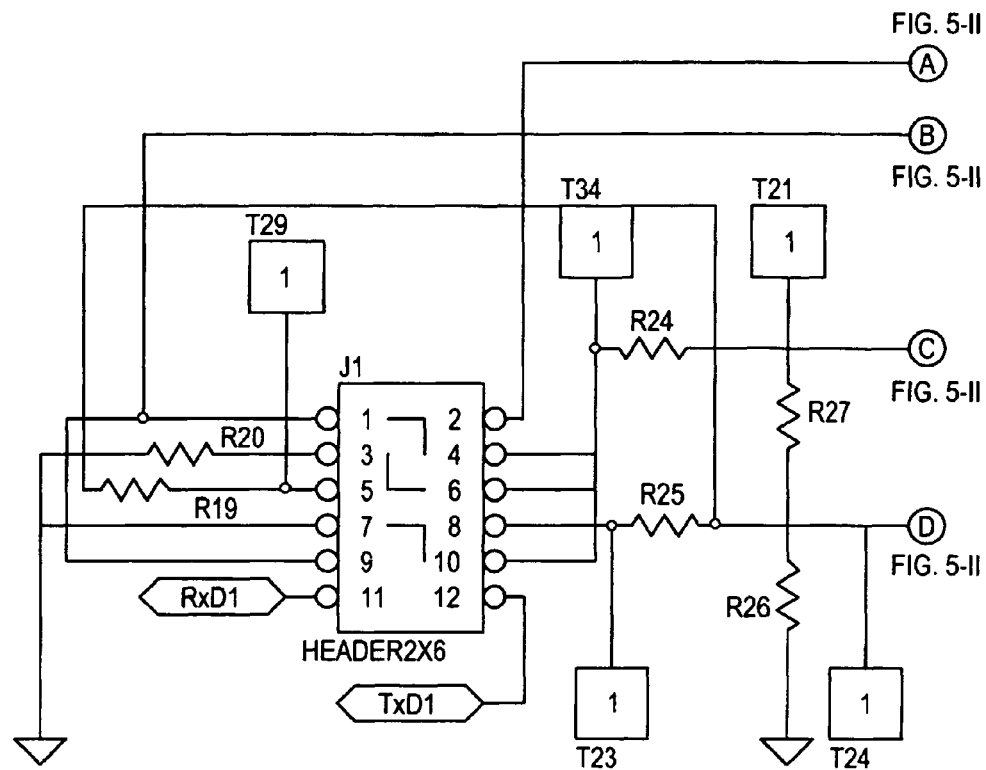
FIG. 5-I
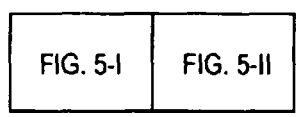
FIG. 5

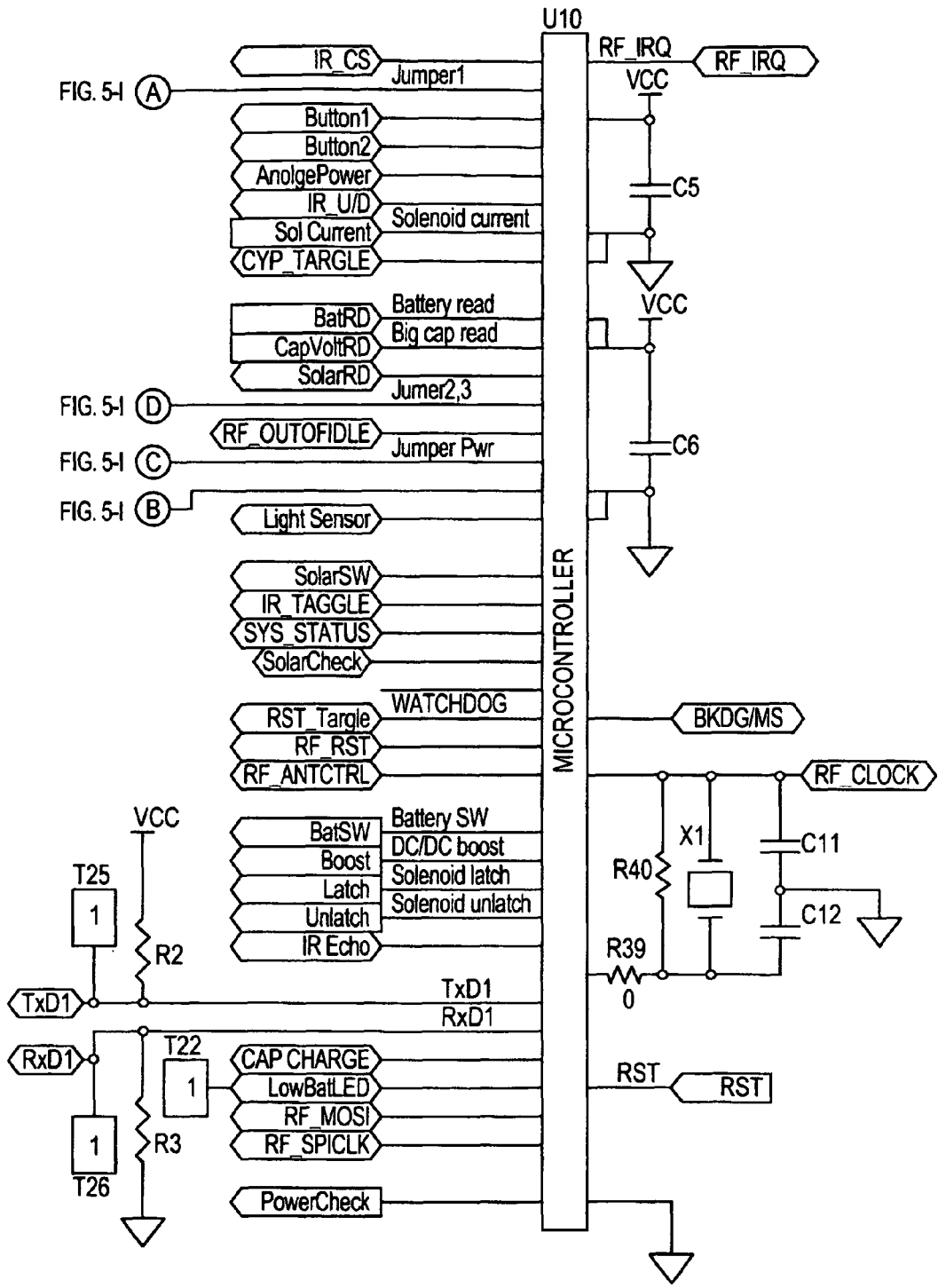
FIG. 5-II

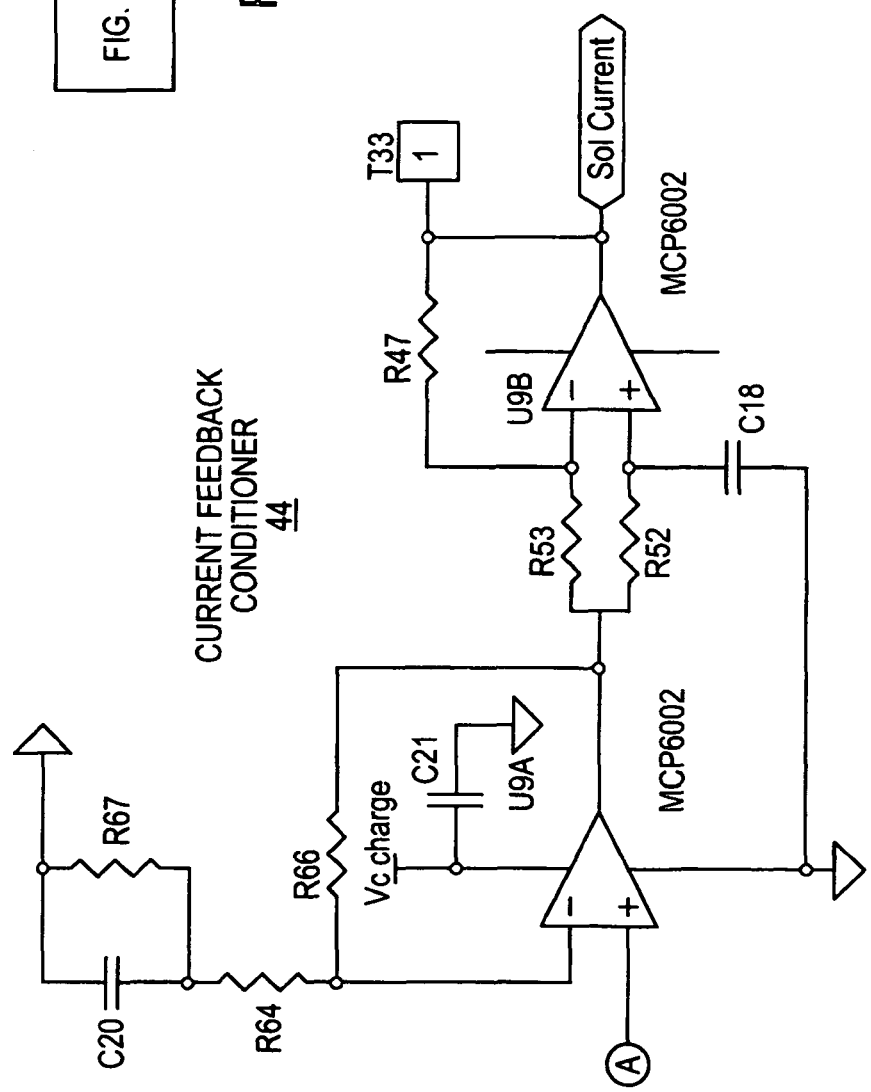

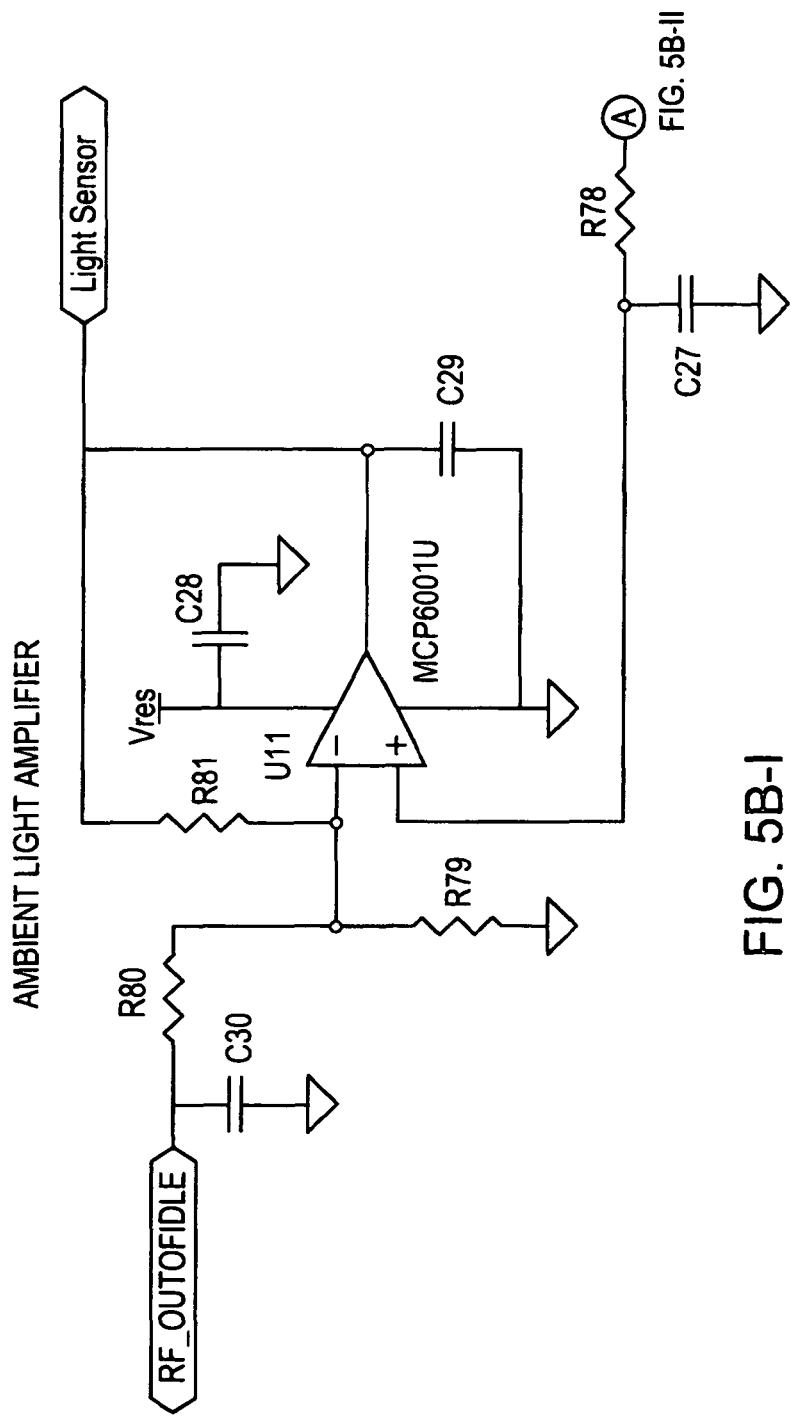
FIG. 5B-I

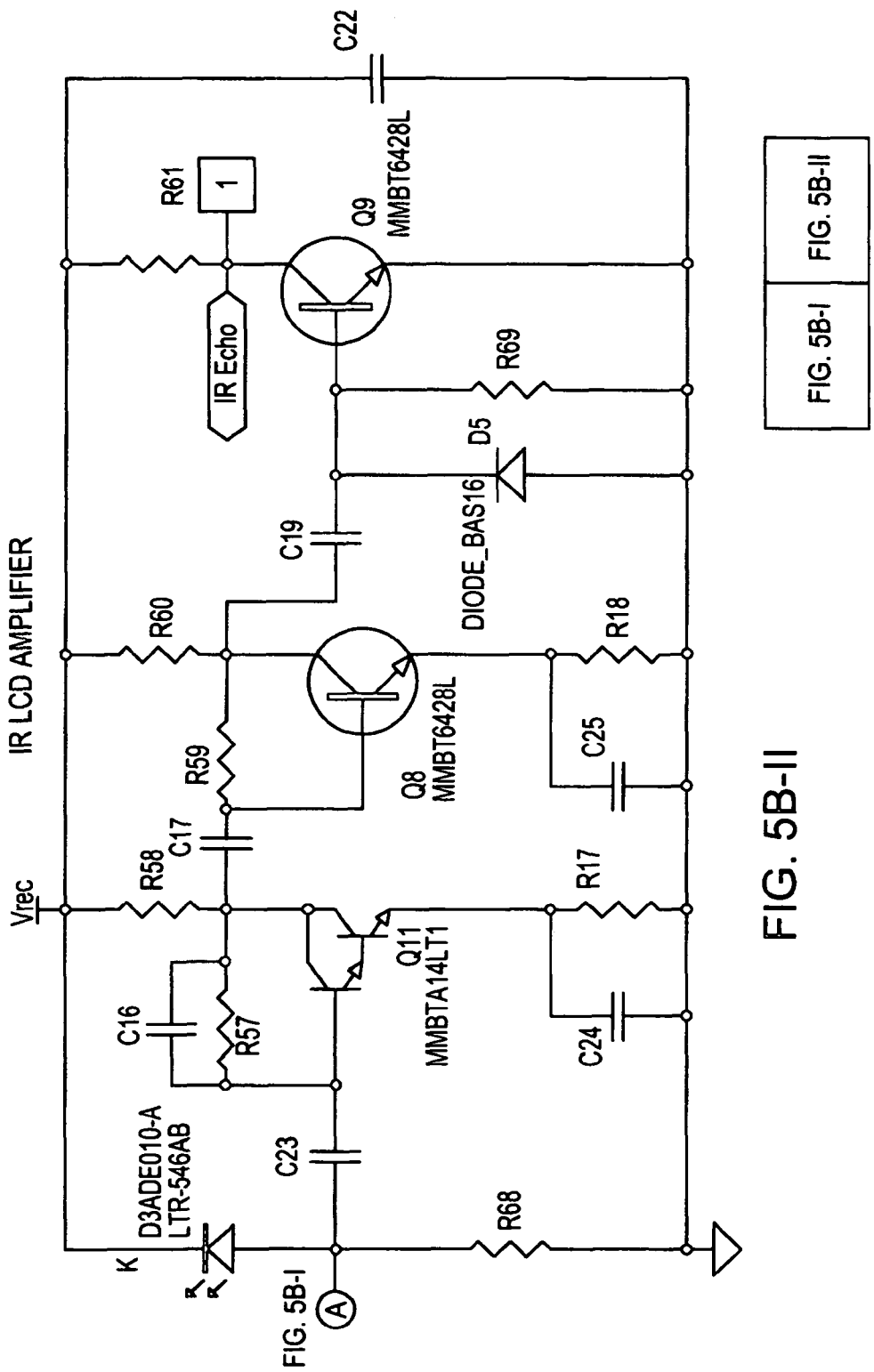

AUTOMATIC BATHROOM FLUSHERS

This application is a continuation of PCT Application PCT/US2008/008242, filed on Jul. 3, 2008, which claims priority from U.S. Provisional Application 60/958,358 filed on Jul. 3, 2007, and claims priority from U.S. Provisional Application 60/999,591 filed on Oct. 19, 2007. This application is also a continuation-in-part of U.S. application Ser. No. 11/716,546, filed on Mar. 9, 2008 now abandoned, which is a continuation of U.S. application Ser. No. 10/783,701, filed on Feb. 20, 2004, now U.S. Pat. No. 7,188,822, which claims priority, from U.S. Provisional Application 60/448,995, filed on Feb. 20, 2003. This application is also a continuation-in-part of U.S. application Ser. No. 11/159,422 filed on Jun. 22, 2005 now abandoned, which is a continuation of PCT Application PCT/US03/041303, filed on Dec. 26, 2003, which is a continuation-in-part of PCT Application PCT/US03/38730, filed on Dec. 4, 2003, all of which are incorporated by reference.

FIELD OF THE INVENTION

The present inventions are directed to automatic bathroom flushers using photovoltaic cells for supplying electrical power. The present inventions are also directed to automatic flushers enabling two or multiple flush volumes in automatic or manual modes, depending on a user action to save water during regular operation, or provide cleaning action by increasing flush volume. The present inventions are also directed to automatic flushers including a user interface comprising a button and visible LEDs.

BACKGROUND OF THE INVENTION

Automatic bathroom flushers have become increasingly prevalent, particularly in public restrooms, both for flushing toilets and urinals. Such flushers contribute to hygiene, facility cleanliness and water conservation.

There are several types of tankless bathroom flushers on the market including flushers supplied by Sloan Valve Company, for example, sold as ROYAL® or GEM® flush valves. ROYAL® flush valves may be manually operated, or automatically operated using OPTIMA® controllers and infrared sensors. In general, bathroom flushers receive a pressurized water supply at an input and provide flush water at an output during a flush cycle. The flush cycle provides a predetermined amount of water (depending on the external water pressure) even though there is no water tank.

In manual flushers, users initiate a flushing cycle by displacing a handle that controls a flushing mechanism including a piston or a flexible diaphragm. The handle movement causes a water leak from a control or pilot chamber to the flusher's output, which lowers pressure in the pilot chamber. Due to the lower pressure, the external water pressure lifts the flusher's piston or diaphragm from a valve seat thereby enabling water flow. The stroke of the piston or diaphragm controls the volume of water passing through the flush valve. After some time, the pressure in the pilot chamber increases (through a control passage) forcing the piston or diaphragm onto the valve seat and thus terminating the water flow.

In automatic flushers, an object sensor initiates the flushing cycle, where an actuator opens a relief passage enabling water flow from the pilot chamber to the flusher's output. This flow lowers pressure in the pilot chamber. Due to the lower pressure, as mentioned above, the external pressure lifts the flusher's piston or diaphragm from a valve seat thereby enabling main water flow used for flushing. After the actuator seals the relief passage, the pressure in the pilot chamber increases forcing the piston or diaphragm onto the valve seat and thus closing the water flow. Manual flush valves (e.g., ROYAL® flush valves) may be converted into automatically operated valves using a controller and sensor unit, sold under the name OPTIMA® by Sloan Valve Company. Overall, the flush valves supplied by Sloan Valve Company are durable, highly reliable, and suitable for long-term operation.

There is, however, a need for improved automatic flushers due to a high demand for flushers and their need in thousands of restrooms.

SUMMARY OF THE INVENTION

Embodiments of the present inventions are directed to automatic bathroom flushers using photovoltaic cells for supplying electrical power. Embodiments of the present inventions are also directed to automatic flushers enabling two or multiple flush volumes in automatic or manual modes, depending on a user action to save water during regular operation, or provide cleaning action by increasing flush volume. Embodiments of the present inventions are directed to automatic bathroom flushers using two or more manually activated sensors that override the automatic operation of the flushers. The manually activated sensors may be capacitive sensors or push buttons. Embodiments of the present inventions are also directed to automatic flushers including a user interface comprising a button and visible LEDs.

The described inventions are directed to automatic bathroom flushers using photovoltaic cells for supplying electrical power. The described inventions are also directed to automatic bathroom flushers having modular design, and methods for operating and servicing such flushers. The described inventions are also directed to a novel flusher cover enabling easy servicing and adjustments and optional optimal operation.

According to one aspect, the present invention is a bathroom flusher. The bathroom flusher includes a flusher body, a valve assembly, an electronic control system, and a flusher cover. The flusher body includes an inlet and an outlet, and is designed to accommodate the valve assembly that controls water flow between the inlet and the outlet. The valve assembly includes a valve member movable with respect to a valve seat providing a sealing action based on applied pressure on the valve assembly.

According to another aspect, an automatic toilet room flusher includes a valve including a valve body having an inlet and an outlet, and a valve seat inside the body. The flush valve also includes a valve member (i.e., a flush valve mechanism) and an external cover. The valve member is cooperatively arranged with the valve seat, wherein the valve member is constructed and arranged to control water flow between the inlet and the outlet. The movement of the valve member between open and closed positions is controlled by water pressure inside a pilot chamber. The external cover is designed for enclosing an electronic control module comprising a sensor and an actuator for controlling operation of the flush valve. A photovoltaic cell provides electrical power. An optional external switch is located on the external cover for manually triggering a manual flush of the flush valve.

Preferred embodiments of the above aspects include one or more of the following features: The external cover includes main cover body, a front cover and a top cover. The front cover includes an optical window, wherein the sensor is an optical sensor geometrically aligned with the optical window. The main cover body provides overall rigidity to the external cover. The individual cover parts of the external cover enable separate servicing and replacement of the cover parts. The external cover includes two external switches.

The sensor may be an optical sensor and the sensor window is an optical window. Alternatively, the sensor includes an ultrasonic sensor or a heat sensor designed to detect body heat. Alternatively, the sensor is a near-infrared sensor that detects optical radiation in the range of about 800 nm to about 1500 nm. Alternatively, the sensor is a presence sensor. Alternatively, the sensor is a motion sensor.

The top cover is removable while maintaining the front cover, including a sensor window located in place with respect to the main cover body. The flush valve is further constructed to adjust detection sensitivity of the sensor while maintaining the optical window located on the main cover body.

The top cover may include at least one side surface designed for facilitating removal of the top cover. The top cover is attached with respect to the valve body using at least one screw, wherein tightening of the at least one screw attaches the main cover body, the front cover, and the top cover to a pilot cap defining the pilot chamber and attached to the valve body.

The external cover may include a vent passage for venting water from inside the external cover. The top cover includes a button constructed to move between upper and lower positions and designed for manually triggering a flush cycle when pushed to the lower position. The movable button includes a magnet co-operatively arranged with a reed sensor capable of providing a signal to a microcontroller.

The flush valve may include a piston, or a flexible diaphragm. The flexible diaphragm includes a centrally located passage connecting the relief passage and the outlet, wherein the flexible diaphragm is retained with respect to the valve body by a pressure cap defining the pilot chamber. The flush valve may include a bypass orifice in the diaphragm connecting the inlet with the pressure chamber, the orifice having a cross section area smaller than that of the passage.

According to yet another aspect, in an automatic toilet flush valve including a body having an inlet and an outlet, there is a valve assembly located in the body and constructed and arranged to open and close water flow from the inlet to the outlet upon actuation signals provided by an electronic system to an actuator. The automatic flush valve includes a pressure cap defining a pilot chamber in communication with the output via a relief passage controlled by the actuator. The automatic flush valve also includes a sensor, as part of the electronic system, constructed to detect a user located in front of the flush valve and designed to provide control signals to the electronic system, the electronic system being constructed to provide drive signals to the actuator. An external cover is mounted above the pressure cap and is constructed to provide housing for the electronic system. The external cover is designed cooperatively with the electronic system to enable sensitivity adjustment of the sensor without removal of the cover's sensor window.

Preferred embodiments of the above aspects include one or more of the following features: The sensor includes an infrared sensor or an ultrasonic sensor or a heat sensor. The sensor includes a presence sensor or a motion sensor.

The cover is mounted above the pressure cap. The valve assembly includes a flexible diaphragm fixed relative to the pressure cap, wherein the valve assembly includes a vent passage in the flexible diaphragm in communication with the pilot chamber, being controllably sealable by the actuator.

The vent passage includes a flexible member extending between a pilot chamber cap and the vent passage in the flexible diaphragm, wherein the flexible member includes a seal remaining stationary during movement of the flexible diaphragm between open and closed positions of the flush valve. The flexible member is a hollow tube. The hollow tube may include a spring positioned therein. The spring may be a coiled wire.

The actuator may be an isolated actuator. The valve assembly may include a filter for filtering water passing toward the actuator. The filter may be attached to the flexible diaphragm.

According to yet another aspect, a method for operating an automatic flusher providing a flusher body, a valve assembly, an electronic control system including a microcontroller, and a flusher cover, wherein the flusher body includes an inlet and an outlet, and is designed to accommodate the valve assembly that controls water flow between the inlet and the outlet, and wherein the valve assembly includes a valve member movable with respect to a valve seat providing a sealing action based on applied pressure on the valve assembly, and executing a flusher algorithm for controlling water flow from the inlet to the outlet by controlling operation of the valve member.

Preferably, the flusher algorithm controls the water volume based on the duration of a user present in front of the flusher. For a short use duration, the flusher delivers a small amount of water, while for a long duration, the flusher delivers a larger amount of water, after the user has left the flusher's vicinity. This enables large water savings. The flusher algorithm also scans manual flush buttons of the flusher to prevent extra flushes. The flusher algorithm also facilitates a user interface using a single or multicolor LED and one of several flush buttons. Upon pushing on two flush buttons, the user or operator can initiate a large volume, longer duration flush for cleaning purposes. The flusher algorithm also signals to a user various error states of the flusher including low battery or other error conditions.

BRIEF DESCRIPTION OF THE DRAWINGS

FIG. 5, shown as FIGS. 5-I, and 5-II, shows circuit diagrams that illustrate the electronics of the automatic bathroom flusher.

FIG. 5B, shown as FIGS. 5B-I, and 5B-II, shows circuit diagrams that illustrate the electronics of the automatic bathroom flusher.

FIGS. 13, 13A, and 13B are a front view, a perspective view and a top view of the flusher cover shown in FIG. 12, respectively.

FIGS. 16, 16A, and 16B are a front view, a perspective view and a top view of the flusher cover shown in FIG. 15, respectively.

DETAILED DESCRIPTION OF ILLUSTRATED EMBODIMENTS

Figure 1:
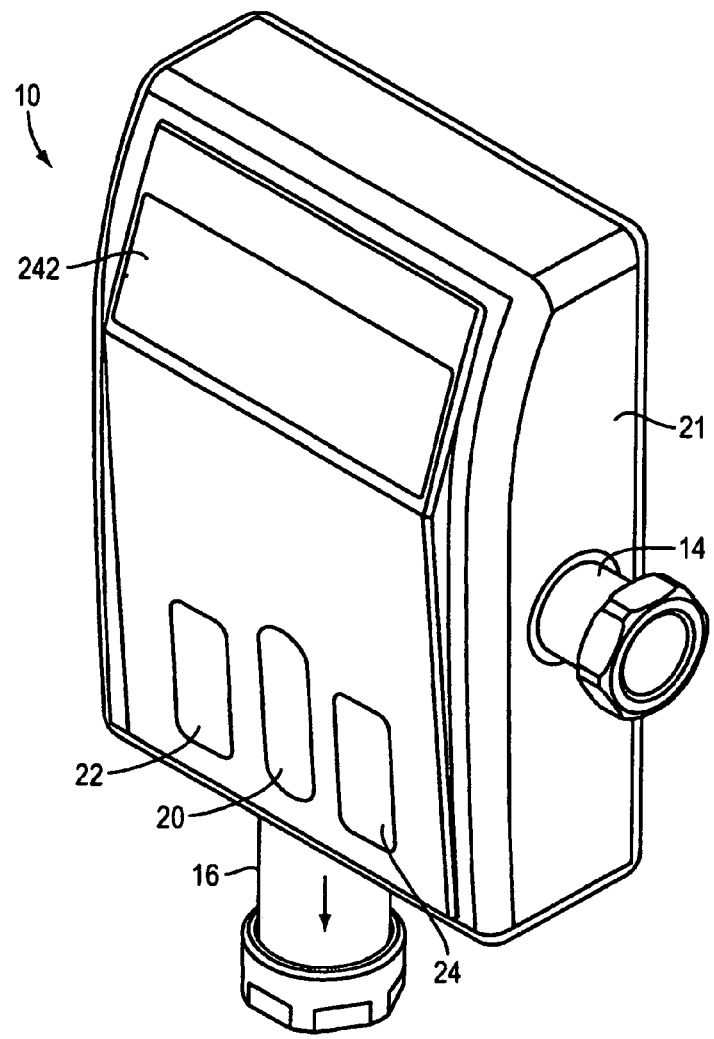
FIG. 1 is a perspective view of an automatic bathroom flusher used for flushing a toilet or a urinal.

FIG. 1 is a perspective view of an automatic bathroom flusher used for flushing a toilet or a urinal. An automatic bathroom flusher 10 includes a flusher body located inside enclosure 21 coupled to a water supply line 14 and also coupled to a water output line 16 providing output to the connected toilet or urinal. The manual embodiments of the bathroom flusher are described in U.S. Pat. Nos. 3,778,023; 5,881,993; 5,295,655, all of which are incorporated by reference for explanation and better understanding, but are not part of the present invention. The manual flush valves may be converted to automatic flushers using the modules described below.

Automatic bathroom flusher 10 includes manual override sensors 22 and 24 used to override the flusher's sensor (e.g., an optical sensor, an ultrasonic sensor, a capacitive sensor, a heat sensor or a passive near infrared sensor used for automatic operation). Preferably, manual override sensors 22 and 24 are capacitive sensors. Preferably, automatic bathroom flusher 10 also includes an optical window 20 used by an active or passive infrared sensor, and includes a photovoltaic cell 242.

Figure 2:
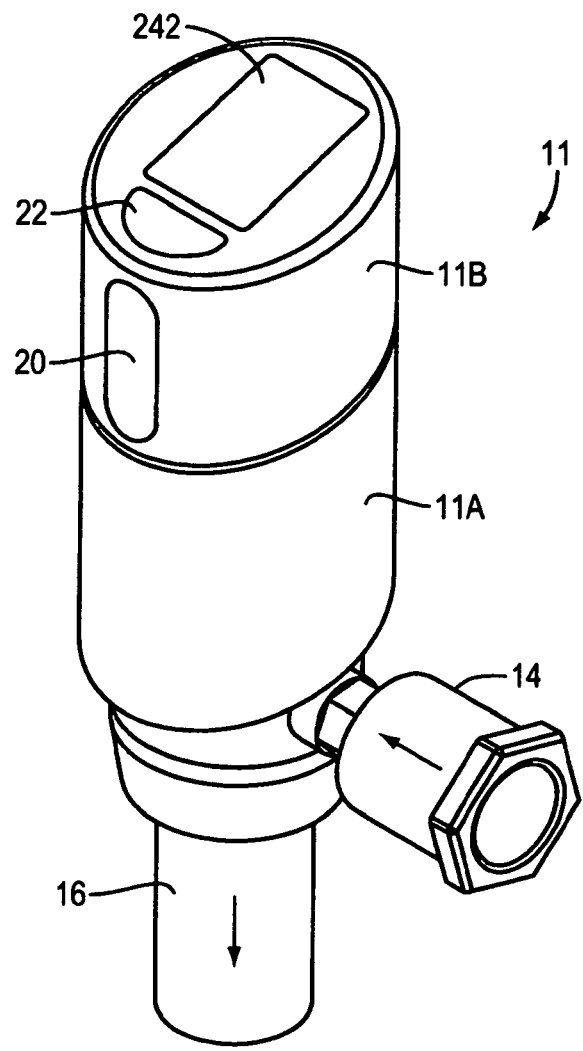
FIG. 2 is a perspective view of another embodiment of the automatic bathroom flusher.

FIG. 2 is a perspective view of another embodiment of an automatic bathroom flusher used for flushing a toilet or a urinal. An automatic bathroom flusher 11 includes a flusher body located inside enclosures 11A and/or 11B coupled to a water supply line 14 and also coupled to a water output line 16 providing output to the connected toilet or urinal. Automatic bathroom flusher 11 includes a manual override sensor 22 (or a button as described below) used to override the flusher's automatic sensor used for automatic operation. Preferably, manual override sensor 22 is a capacitive sensor. Automatic bathroom flusher 11 also includes optical window 20 and a photovoltaic cell 242 for providing electric power.

The automatic bathroom flusher may include one, two or several photovoltaic cells. The photovoltaic cell is mounted on the flusher cover, preferably, behind an optically transparent window. Alternatively, the photovoltaic cell is mounted on a frame movable relative to the flushers body. Several photovoltaic cells may be mounted on several frames independently movable relative to the flushers body. The movement can be pre-biased with a spring and maintained in an extended position (or depressed inside the cover). Alternatively, the photovoltaic cell and the corresponding frame may be movable as a button for manually activating the flusher (large or small water volume, as described below) or may be used for set up mode, diagnostics.

Figure 3:
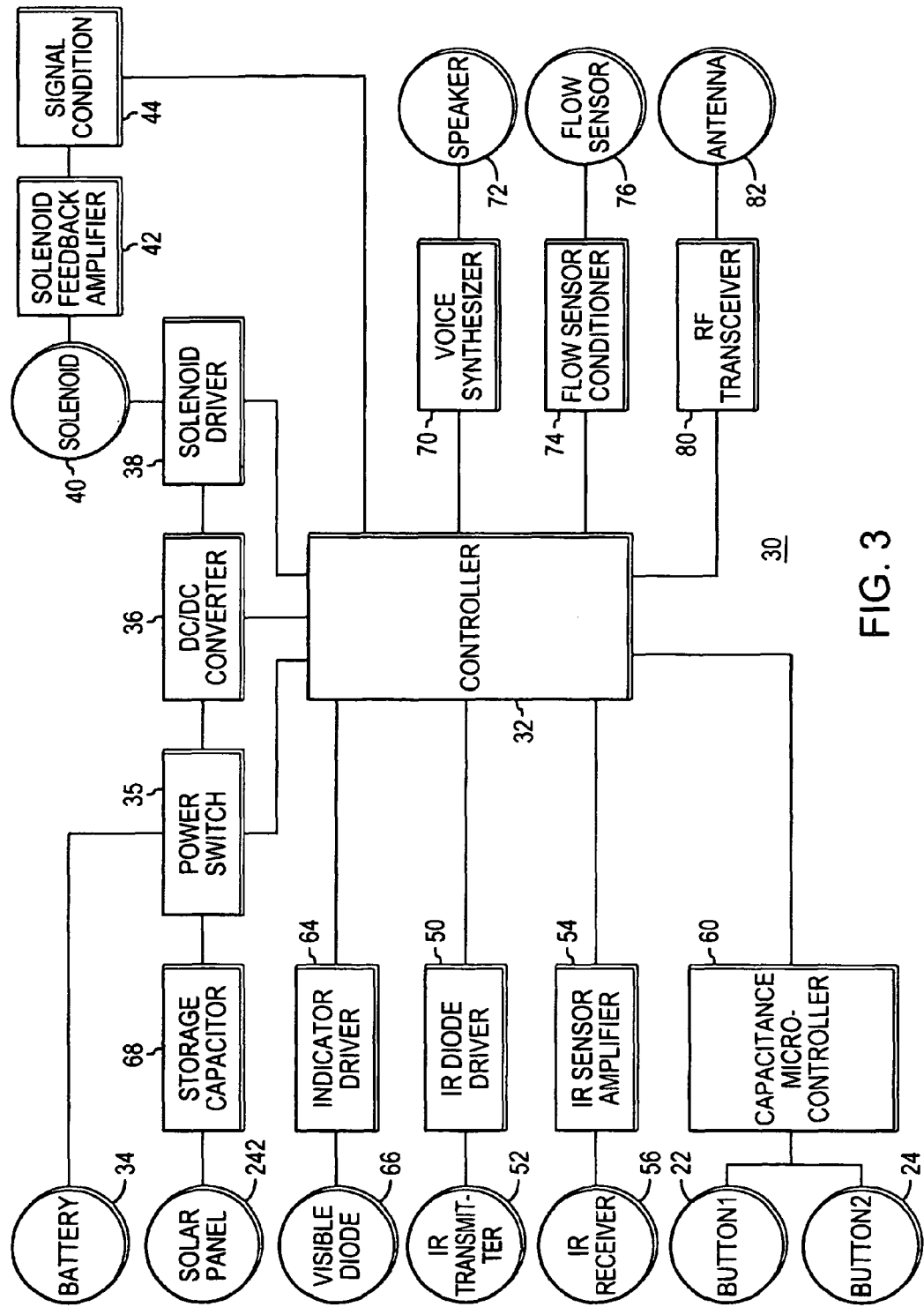
FIG. 3 illustrates diagrammatically control electronics and components used in the automatic bathroom flusher.

FIG. 3 illustrates control electronics 30 with a controller 32 powered by a battery 34. Controller 32 is preferably a microcontroller MC9S08GT16A made by Freescale®. The microcontroller executes various detection and processing algorithms, which are preferably downloaded. However, the controller and algorithms may also be implemented in the form of dedicated logic circuitry, or other.

The control electronics 30 includes a power switch 35, a DC-DC converter 36, a solenoid driver 38. Solenoid driver 38 provide drive signal to a solenoid 40 monitored by a solenoid feedback amplifier 42, and a signal conditioner 44. Controller 32 communicates with an indicator driver 64 driving a visible diode 66 (e.g., a blue diode) for communicating with the user. The active optical sensor includes an IR diode driver 50 providing power to an IR transmitter 52, and an IR sensor amplifier 54 receiving a signal from an IR receiver 56. The entire operation is controlled by controller 32.

The IR diode driver 50 is designed to progressively increase and decrease the optical power output according to target and environment conditions. The same applies to the IR receiver using IR sensor amplifier 54. Usually only one of the modes is used both since one is enough to achieve the purpose. The following examples of the conditions: If the environment is too IR bright, the system boosts the optical emission signal. If the target is too close, such as in the closet, the system reduces the IR signal to save power. If the target is not sufficiently IR reflective, the system boosts the IR signal either from the IR transmitter 52 or using IR sensor amplifier 54.

Figure 6:
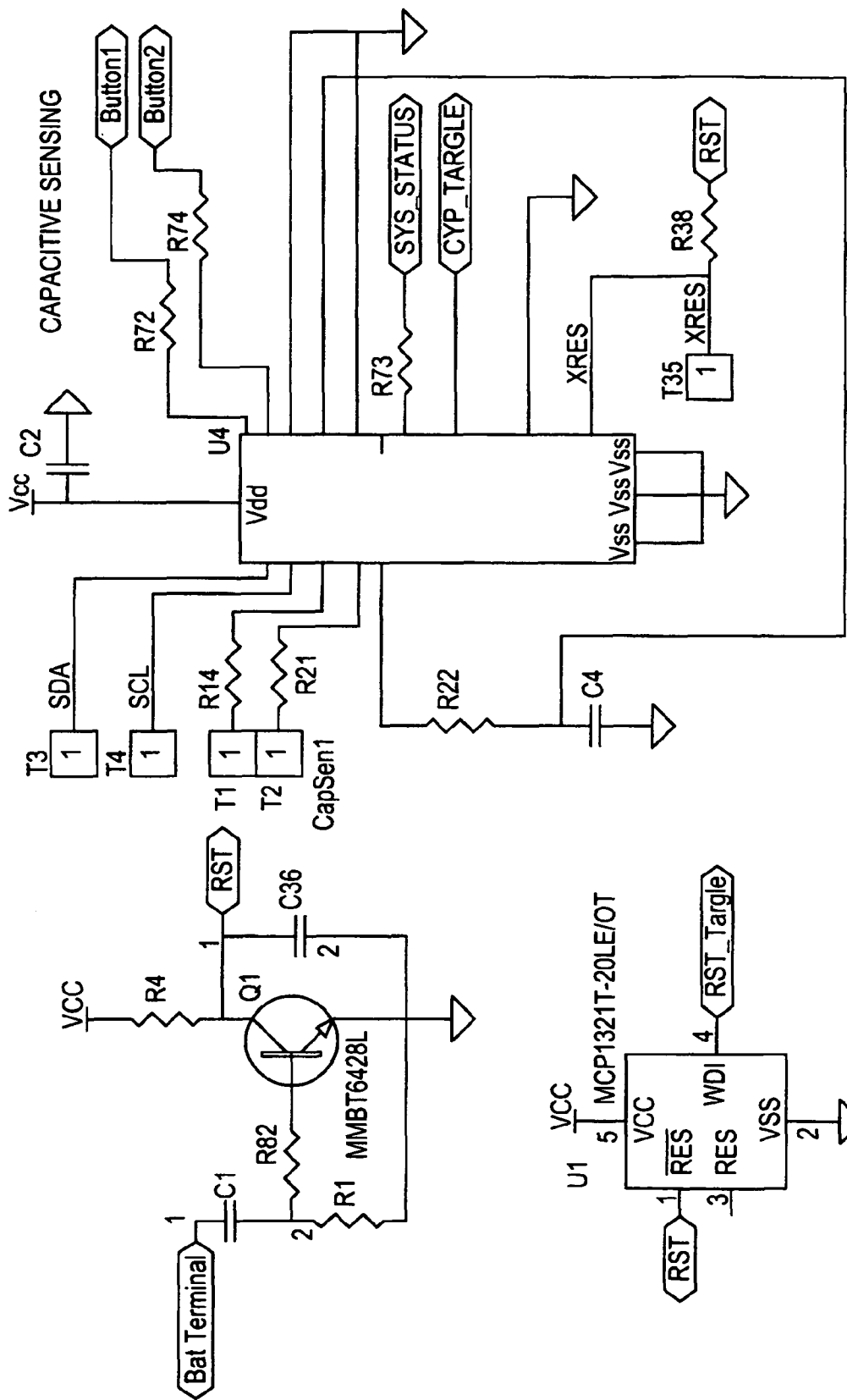
FIG. 6 is a circuit diagram of a capacitive sensor for detecting manual activation of the automatic bathroom flusher.

The system uses a capacitive controller 60, which monitors sensors 22 and 24, and is shown in detail in FIG. 6. The system also uses an optional voice synthesizer 70 connected to a speaker for providing a user interface. An optional flow sensor conditioner 74 connected to a flow sensor 76 is used for detecting water flow through the flusher. Alternatively, a sensor may be used to detect overflow of water in a toilet or urinal and provide signal to controller 32 for shutting down the automatic flusher.

The system also uses an optional RF transceiver 80 connected to an antenna 82 for wireless communication with a remotely located central controller or network. The present design may be deployed with a network of wirelessly connected bathroom flushers and sanitary appliances. The remotely located network enables monitoring and gathering of information concerning the flushers and appliances. The communication between the flushers and appliances uses preferably low frequency RF signals, and the communication to the remotely located network node uses preferably a high frequency RF signals.

In general, wired or wireless data communication is used for transmitting information as it relates to the well being of the bathroom flushers and sanitary appliances. The transmitted information (together with the ID of the device) may include the battery voltage, number of flushes, the unit is on run-on condition (cannot turn off), no water condition (cannot turn on), etc. Using RF transceiver 80 and antenna 82, the system can receive information such as command remotely initiated from somewhere else. The fixture may talk to each other in a networked fashion. The fixtures may talk to a proximal central unit and the said unit may transmit data (wired or wireless) to a wider network such as internet. In preferred embodiment; the user initiates a location wide diagnostic mission by requesting each fixture to turn on and then off. In turn, each fixture reports successful/unsuccessful operation. The fixture may also report other variables such as battery voltage, number of flushes, etc. The user then gathers the information and schedules a maintenance routing according to results. This is particularly useful in establishments such as convention centers, ballparks, etc. where the maintenance personnel currently send crews to monitor the well being of the fixtures and take notes manually prior to an event.

Microcontroller MC9S08GT16A is used for the following main functions: Microcontroller 32 manages the voltage regulation so that we deliver fixed amount of voltage to sections of the hardware as needed regardless of the battery voltage (DC to DC converter). Microcontroller 32 monitors manual flush buttons. In case of capacitance touch, maintain necessary functions and adjustments as the background of the environment changes over time. Microcontroller 32 monitors target by use of IR emitter and receiver circuit and act accordingly. Microcontroller 32 provides necessary signal to solenoid so it would turn on and off. Microcontroller 32 maintain self monitoring such that if the executable software goes to a dead loop then reset the program accordingly. Microcontroller 32 manages all user diagnostics input. Microcontroller 32 manages all mode settings. Microcontroller 32 monitors power source levels and take action as necessary such as close the valve and shut down operation. Microcontroller 32 monitors solenoid latch and unlatch signals to conserve power.

Another embodiments of the control electronics is described in PCT Publications WO2005/056938 and WO2004/061343, both of which are incorporated by reference.

According to another embodiment, the control electronics includes a microcontroller that is an 8-bit CMOS microcontroller TMP86P807M made by Toshiba. The microcontroller has a program memory of 8 Kbytes and a data memory of 256 bytes. Programming is done using a Toshiba adapter socket with a general-purpose PROM programmer. The microcontroller operates at 3 frequencies ($f_c$=16 MHz, $f_c$=8 MHz and $f_s$=332.768 kHz), wherein the first two clock frequencies are used in a normal mode and the third frequency is used in a low power mode (i.e., a sleep mode). The microcontroller operates in the sleep mode between various actuations. To save battery power, microcontroller periodically samples optical sensor unit for an input signal, and then triggers power consumption controller. Power consumption controller powers up signal conditioner and other elements. Otherwise, the optical sensor unit, the voltage regulator (or the voltage boost) and the signal conditioner are not powered to save battery power. During operation, the microcontroller also provides indication data to an indicator, e.g., a visible diode 66 or speaker 72. Control electronics may receive a signal from the passive optical sensor or the active optical sensor described above. A Low battery detection unit may be the low battery detector model no. TC54VN4202EMB, available from Microchip Technology. The voltage regulator may be the voltage regulator part no. TC55RP3502EMB, also available from Microchip Technology (http://www.microchip.com). Microcontroller may alternatively be a microcontroller part no. MCU COP8SAB728M9, available from National Semiconductor.

Figure 4:
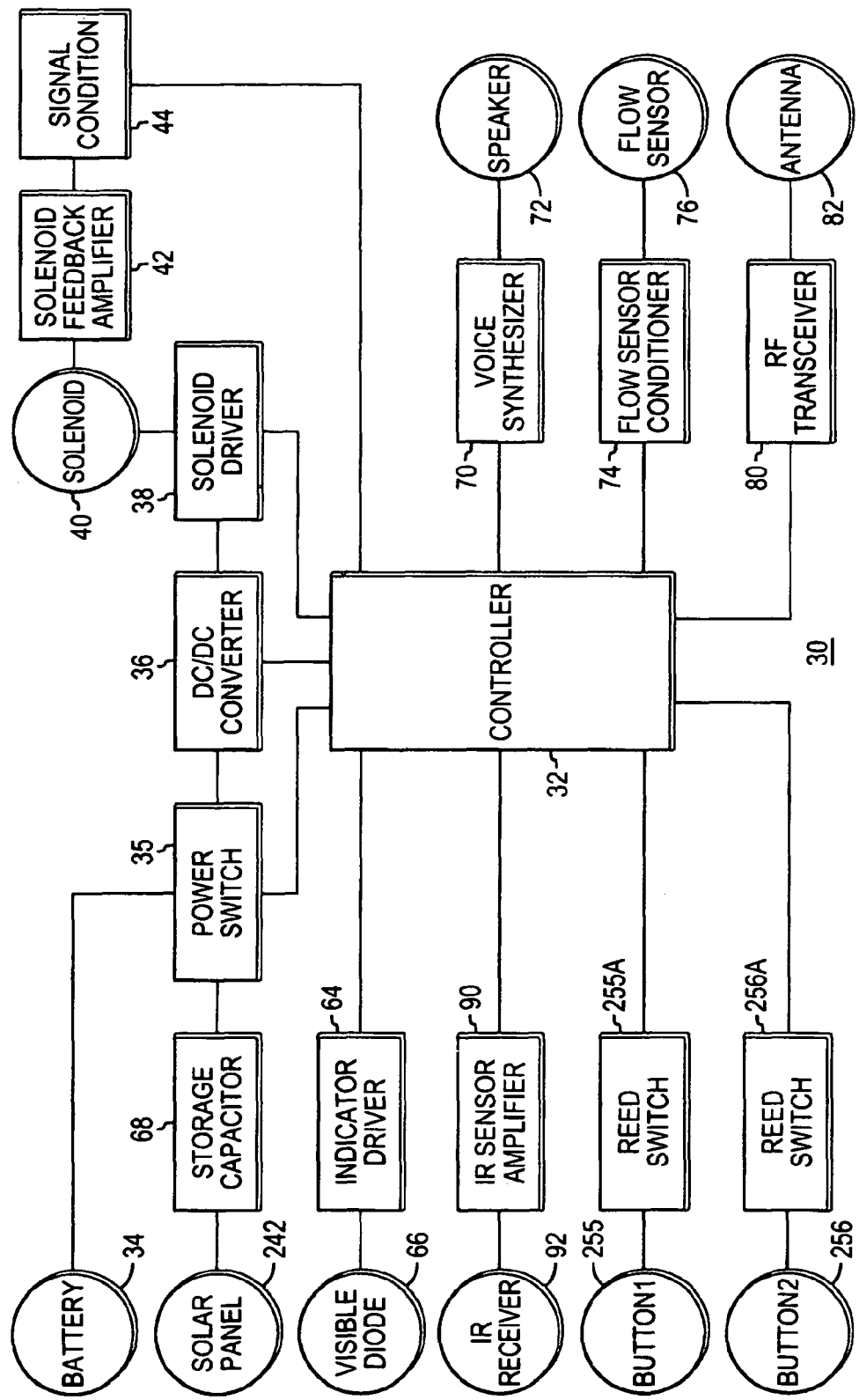
FIG. 4 illustrates diagrammatically control electronics and components used in another embodiment of the automatic bathroom flusher.

FIG. 4 illustrates control electronics 30A with controller 32 monitoring reed switches 255A and 256A, activated by manual buttons 255 and 256, respectively. Each manual button switch is formed by a reed switch, and a magnet. When the button is pushed down by a user, the circuitry sends out a signal to the clock/reset unit through manual signal IRQ, then forces the clock/reset unit to generate a reset signal. At the same time, the level of the manual signal level is changed to acknowledge to microcontroller 32 that it is a valid manual flush signal.

Control electronics 30A shown in FIG. 4 uses passive optical detector including IR sensor amplifier 90 and an IR receiver 92. The passive optical detector is described in detail in PCT Publications WO2005/056938 and WO2004/061343, both of which are incorporated by reference.

Depending on the embodiment, the flusher includes one or several photovoltaic cells for producing voltage that is proportional to the amount of light that it receives. When system 30 or 30A powers up and starts operation the system this voltage and continuously monitors the voltage thereafter. At first time power up, if there is no voltage from the photovoltaic cell, this means dark environment and therefore the unit marks the time and count for a predetermined amount of time.

It the time is long enough, such as hours and days, and there is no target detected within the same period of time then the flusher system is powered up but no body is using the bathroom (i.e., the lights are turned off) and therefore the system goes into a power saving mode. In this mode, the system scans for target at a much slower frequency to conserve battery power. The system may also shut down or slow down other functions such as scanning the override buttons, battery voltage, etc.

If there is no voltage from the photovoltaic cell, but yet the system acquires a valid target then the system indicates an error (that is, the photovoltaic cell is broken or malfunctioning or the connections and/or the circuit that relates to photovoltaic cell is broken.) In such case the system can disable all or some of the functionalities related to the photovoltaic cell. These functionalities are monitoring light or dark conditions of the environment, target shadow detection, power generation, etc.

After the first time power up, the system monitors the photovoltaic cell function normally. In such case the module would monitor the photovoltaic cell voltage continuously (in normal operation mode). In cases, where the output voltage is sufficient, the system uses the corresponding energy for flushing, or stores the in a rechargeable device for later use. The rechargeable device may be a capacitor or a rechargeable cell/battery. If the photovoltaic cell voltage does not provide sufficient power for operation, there may be a condition where the target is casting shadow on the photovoltaic cell. In such case, the system uses the low voltage information as a supplement to the target detection algorithm, whereby prior to the condition the flusher may be in slow operation mode. In this mode of operation, the system conserves energy. Each target is detected using the detection algorithms (for the active or passive sensor) and the photovoltaic information provides a supplemental data.

If the system detects valid targets using the active or passive sensor algorithm, and yet the photovoltaic cell voltage is low or zero over several detection cycles, an error condition is indicated. In such case, the system deems the photovoltaic cell broken and ignores functionalities related to the photovoltaic cell, using just the battery power.

FIGS. 5, 5A, 5B, 5C, 5D, 5E, 5F and 5G are circuit diagrams that illustrate the electronics of the automatic bathroom flusher. The circuit includes a Cypress microprocessor CY8C21634-24LFXI which detect the capacitance touch (proximity) sensing. The Cypress microprocessor includes an analog section that detects of the capacitance issues and the digital section responsible of converting these signals to microcontroller 32 for input/output. The capacitance "button" may have different shapes and surfaces.

The circuit enables mode selection by use of jumper pins used to set flush volume. The flush volume is set depending on the toilet bowl. The circuit also uses a processor U7, which is digital trimpot used to set detection range.

Figures 1, 5A:
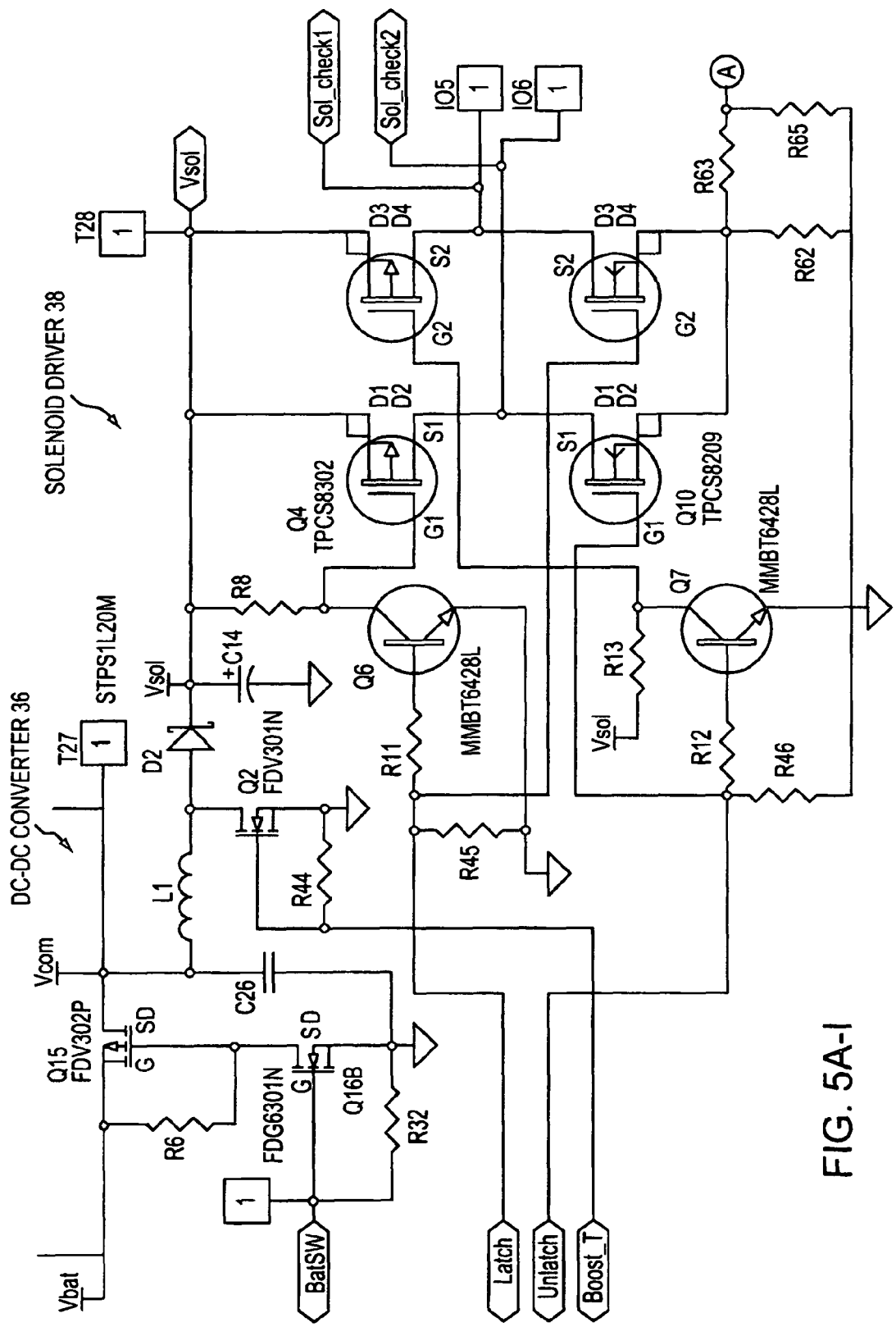
FIG. 5A, shown as FIGS. 5A-I, and 5A-II, shows circuit diagrams that illustrate the electronics of the automatic bathroom flusher.
Figure 5C:
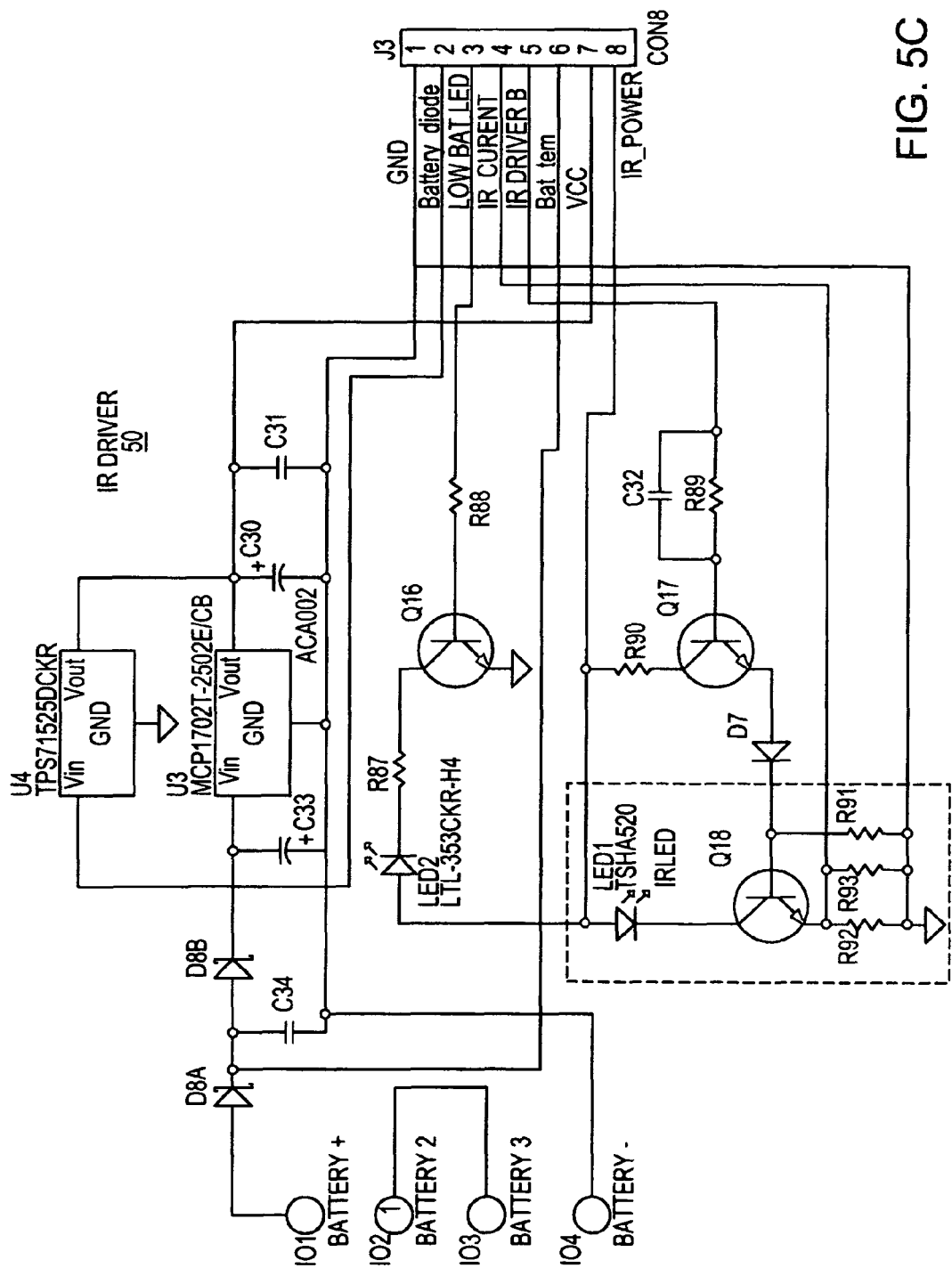
FIGS. 5C, 5D, 5E, 5F, and 5G are circuit diagrams that illustrate the electronics of the automatic bathroom flusher.
Figure 5D:
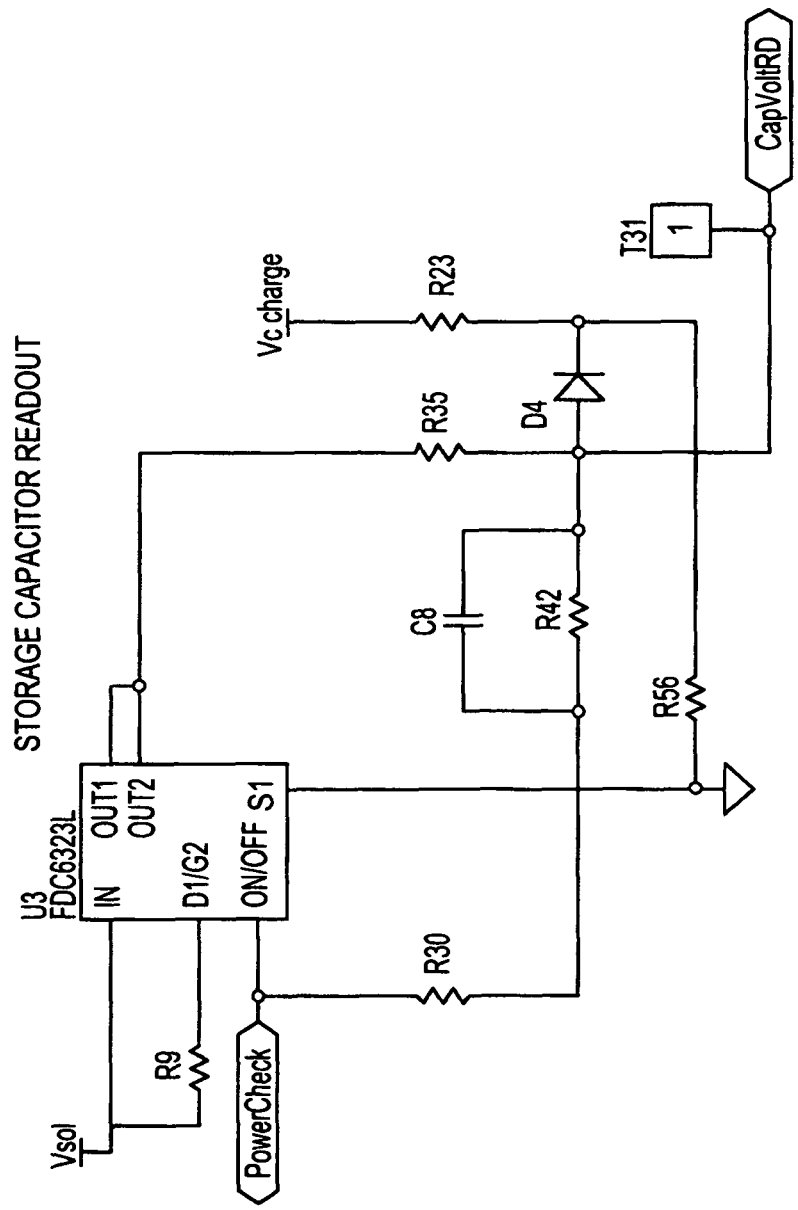
Figure 5E:
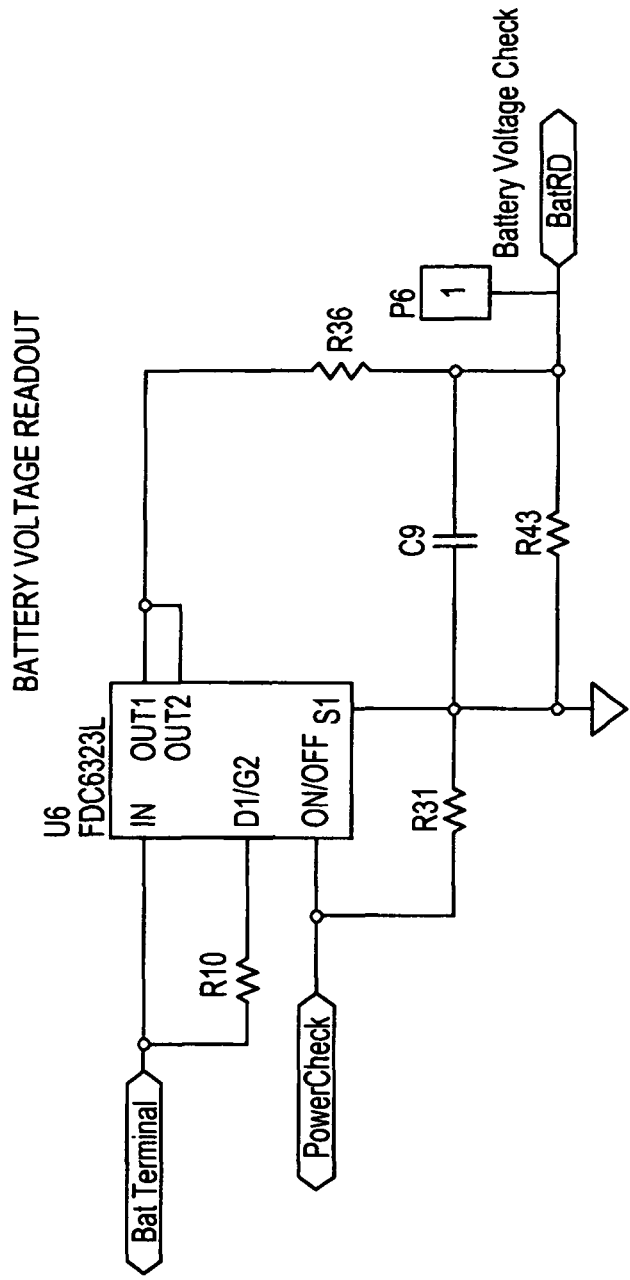
Figure 5F:
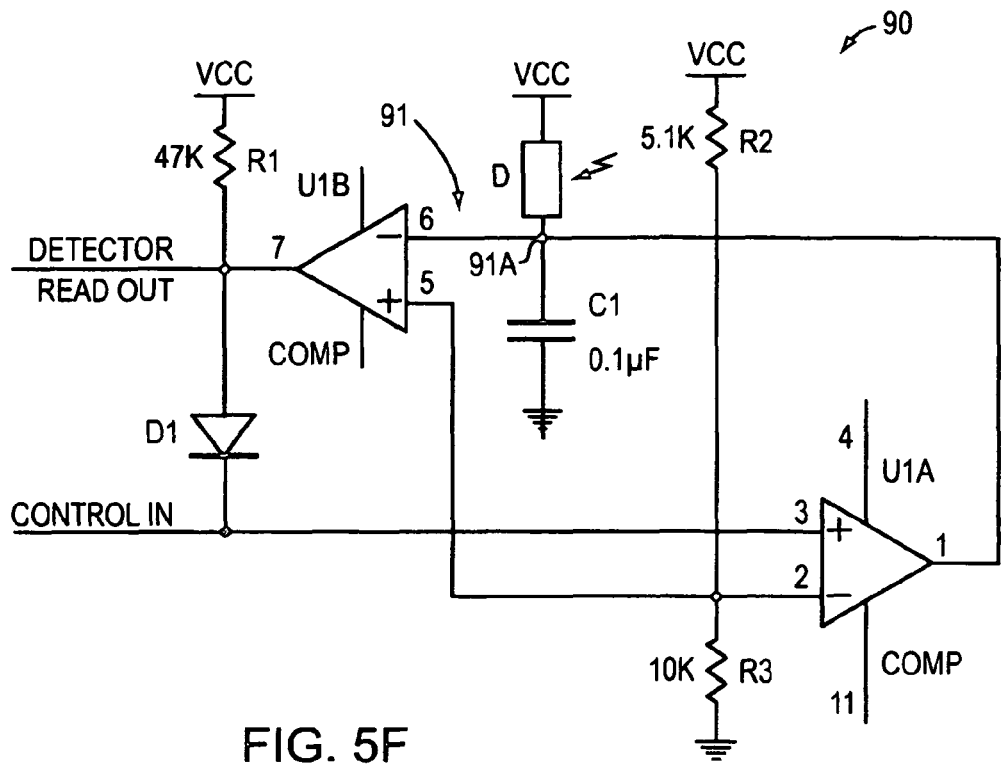

FIG. 5F illustrates schematically a detection circuit 90 used for the passive optical sensor 92 (FIG. 4). The passive optical sensor does not include a light source (no light emission occurs) and only includes a light detector that detects arriving ambient light. When compared to the active optical sensor (using IR light transmitter 52 and IR receiver 56 shown in FIG. 3), the passive sensor enables reduced power consumption since all power consumption related to the IR transmitter is eliminated. The light detector may be a photodiode, a photoresistor or some other optical element providing electrical output depending on the intensity or the wavelength of the received light. The light receiver is selected to be active in the range or 350 to 1,500 nanometers and preferably 400 to 1,000 nanometers, and even more preferably, 500 to 950 nanometers. Thus, the light detector is not sensitive to body heat emitted by a user located in front of a flusher.

The detection circuit 90, used by the passive sensor, enables a significant reduction in energy consumption. The circuit includes a detection element D (e.g., a photodiode or a photoresistor), two comparators (U1A and U1B) connected to provide a read-out from the detection element upon receipt of a high pulse. Preferably, the detection element is a photoresistor. The voltage $V_{cc}$ is +5 V (or +3V) received from the power source. Resistors $R_2$ and $R_3$ are voltage dividers between $V_{cc}$ and the ground. Diode $D_1$ is connected between the pulse input and output line to enable the readout of the capacitance at capacitor $C_1$ charged during the light detection.

Preferably, the photoresistor is designed to receive light of intensity in the range of 1 lux to 1000 lux, by appropriate design of optical lens 54 or the optical elements shown in PCT Publications WO2005/056938 and WO2004/061343, both of which are incorporated by reference. For example, an optical lens may include a photochromatic material or a variable size aperture. In general, the photoresistor can receive light of intensity in the range of 0.1 lux to 500 lux for suitable detection. The resistance of the photodiode is very large for low light intensity, and decreases (usually exponentially) with the increasing intensity.

Referring still to FIG. 5F, the default logic at CONTROL IN is "high". Comparator U1A output a "high" to node 252A. And DETECTOR READ OUT is logic "low". Microcontroller output logic 0 from CONTROL IN; upon receiving a "high" pulse at the input connection, comparator U1A receives the "high" pulse and provides the "high" pulse to node A. At this point, the corresponding capacitor charge is read out through comparator U1B to the output 7. The output pulse is a square wave having a duration that depends on the photocurrent that charged capacitor $C_1$ during the light detection time period. Thus, microcontroller 32 (FIG. 4) receives a signal that depends on the detected light. The CONTROL IN is kept "low" long enough to fully discharge C1. Then, CONTROL IN returns to "high." Comparator U1A also follows the input, node 91A starts to charge capacitor C1, and comparator U1B output will turn to "high". Microcontroller starts a timer when DETECTOR READ OUT turns to "high". When C1 (node A) voltage reach 2/3 Vcc, U1B output will turn to "low", stop timer. The timer value (or the pulse width from DETECTOR READ OUT) is depends on the photocurrent. This process is being repeated to measure the ambient light. The square wave has duration proportional to the photocurrent excited at the photo resistor. The detection signal is in a detection algorithm executed by the microcontroller.

By virtue of the elimination of the need to employ an energy-consuming IR light source used in the active optical sensor, the system can be configured so as to achieve a longer battery life (usually many years of operation without changing the batteries if no photovoltaic cell is used). Furthermore, the passive sensor enables a more accurate means of determining presence of a user, the user motion, and the direction of user's motion.

The preferred embodiment as it relates to which type of optical sensing element is to be used is dependent upon the following factors: The response time of a photoresistor is on the order or 20-50 milliseconds, whereby a photodiode is on the order of several microseconds, therefore the use of a photoresistor will require a significantly longer time form which impacts overall energy use.

Furthermore, the passive optical sensor can be used to determine light or dark in a facility and in turn alter the sensing frequency (as implemented in the faucet detection algorithm). That is, in a dark facility the sensing rate is reduced under the presumption that in such a modality the faucet or flusher will not be used. The reduction of sensing frequency further reduces the overall energy consumption, and thus this extends the battery life.

Figure 5G:
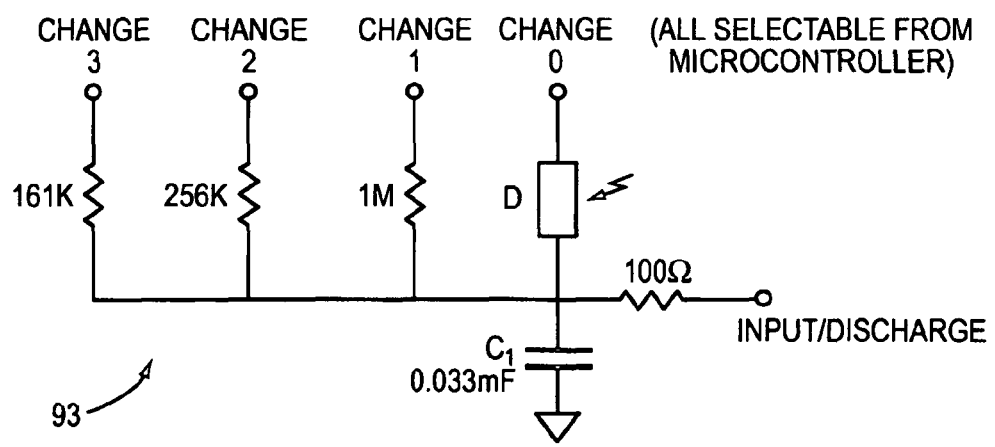

FIG. 5G provides a schematic diagram of an alternative detection circuit 93. This circuit may be used directly connected to the microcontroller, as describe below. This circuit may be included into circuit 90. In FIG. 5G, three resistors are connected in parallel with photodetector D. Providing VCC to CHARGE1, or CHARGE2, or CHARGE3 at different light condition, is equivalent to different parallel resistors connected to photodetector D. Thus, this system can adjust the resolution of DETECTOR READ OUT.

The microcontroller reads out optical data as follows: First, all charge pins are set to Hi-Z (just like no Vcc, no current goes to capacitor). Then, the input/discharge pin is set as output, and is set "low" so that capacitor $C_1$ discharges from this pin. Next, the discharge pin is charged as input. At this moment, the logic of this pin is "low". Then, the charge pin is set to "Hi." The microcontroller selects charge 0, or charge 0+charge X (X=1, 2, 3). Thus, the current goes from charge 0+chargeX to the capacitor, and at the same time the timer is started. The capacitor voltage will increase, when it reaches 2/3 Vcc (which is the microcontroller power supply, and it's also I/O output voltage). At this point the logic in input/discharge pin will turn from "low" to "high" and the timed is stopped. The timer value correspond to the charge time, which is depend on charge current (that goes through photodetector D, and through one or several parallel resistors). By selecting different parallel resistors and charge together with photocell, the timer resolution can be adjusted and the maximum charge time can be limited.

PCT publication WO 2005/056938, which is incorporated by reference, provides detailed description of the passive optical system. That PCT publication also describes various factors that affect operation and calibration of the passive optical system. The sensor environment is important since the detection depends on the ambient light conditions. That PCT publication also describes different detection algorithms for bathroom conditions when the ambient light in the facility changes from normal to bright, or from normal to dark, etc.

FIG. 6 is a circuit diagram of a capacitive sensing circuit. The circuit includes a Cypress microprocessor CY8C21634-24LFXI, which receives signal from one, two, or several capacitive sensors and communicates with the Freescale microcontroller 32 shown in FIG. 3 or FIG. 4. The capasitive sensors may be located on various surfaces of the flusher cover.

Figure 7:
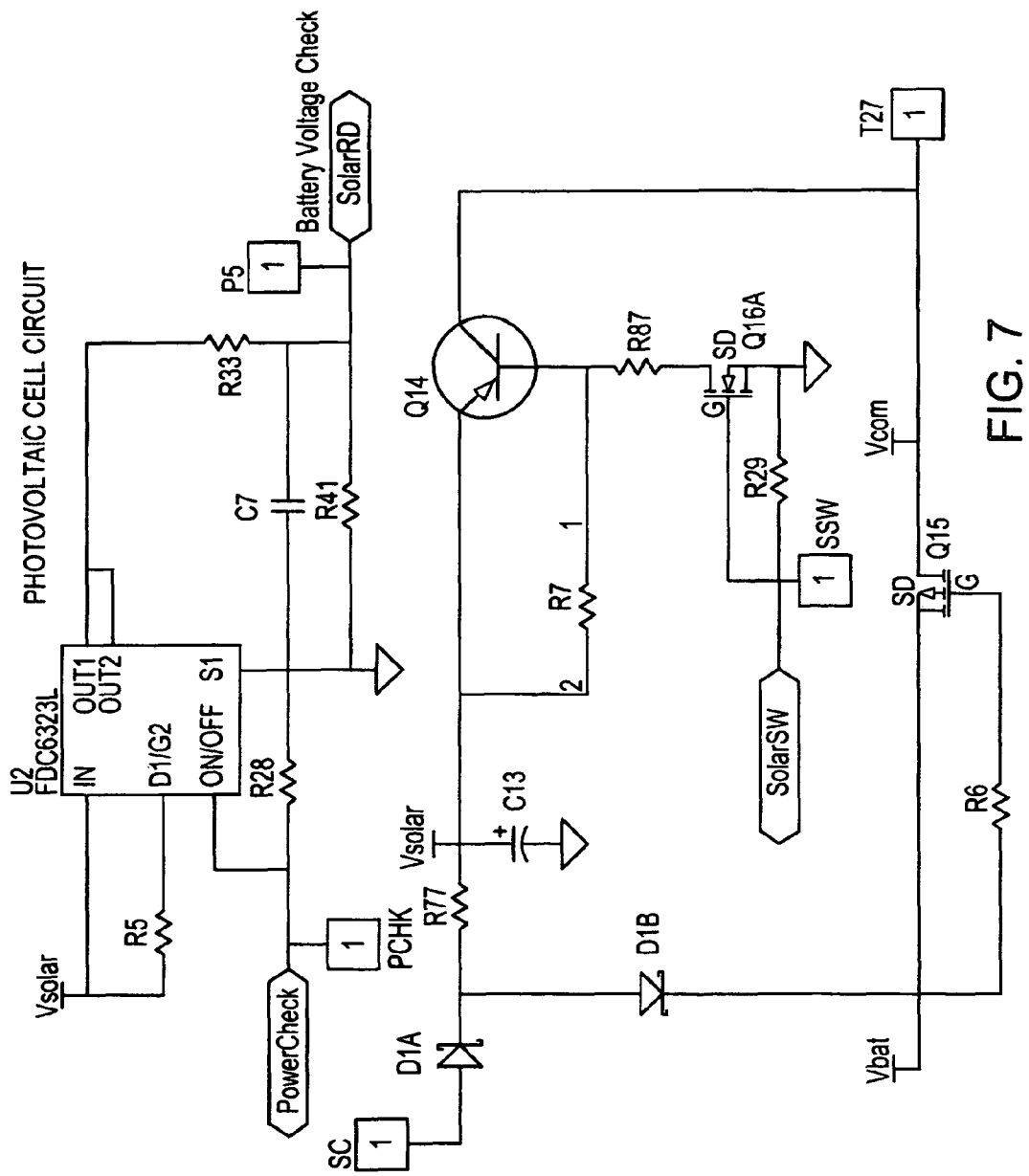
FIG. 7 is a circuit diagram used with a photovoltaic cell mounted on the automatic bathroom flusher.

FIG. 7 is a circuit diagram of a circuit connected to photovoltaic cell. Photovoltaic cell 240 provides electrical power at a voltage of up to 5 Volts, which is charging capacitor C13. The voltage value is also provided to the microcontroller, which assigns the highest priority to the power generated by the photovoltaic cell. Only if the cells voltage drops below 2.5 Volt (e.g., in a dark room), capacitor 33 is charged by the batteries. The solenoid driver uses approximately 6.2 Volts for latching the solenoid and approximately 3.6 V for unlatching the solenoid, as described below.

Figure 8B:
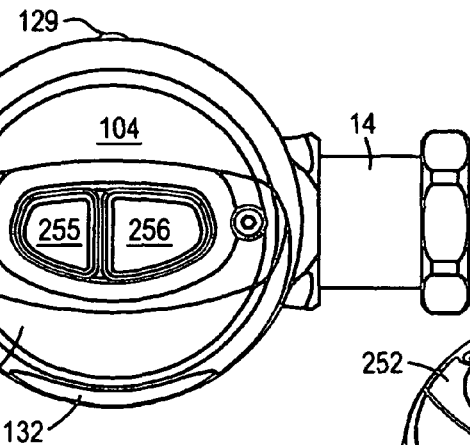
FIGS. 8A and 8B are a front view and a top view of the bathroom flusher shown in FIG. 8, respectively.
Figure 8:
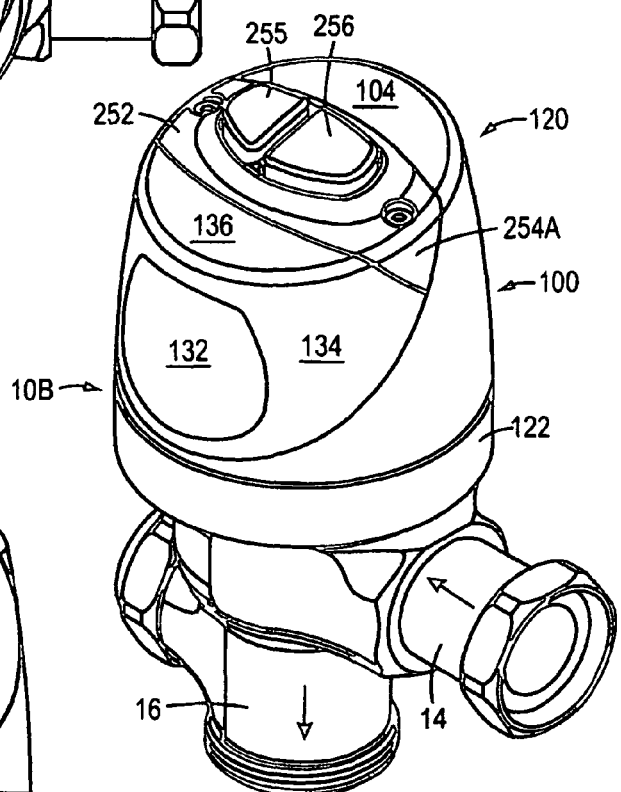
FIG. 8 is a perspective view of another embodiment the automatic bathroom flusher used for flushing a toilet or a urinal.
Figure 8A:
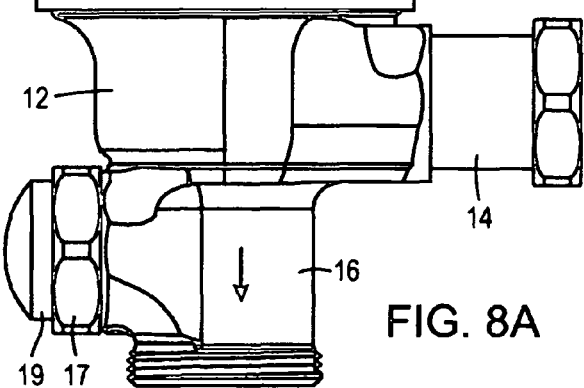

FIG. 8 is a perspective view of an automatic bathroom flusher for flushing toilets or urinals. An automatic bathroom flusher 10B includes a flusher body 12 coupled to a water supply line 14 and also coupled to a water output line 16 providing output to the connected toilet or urinal. Bathroom flusher body 12 is also coupled to a manual port 18. The manual flush valves may be converted to automatic flushers using the modules described below. In the automatic flusher design, manual port 18 is closed off using a cap 19 coupled to port 18 using a lock ring 17. FIGS. 8A and 8B are the respective front and top views of bathroom flusher 10 assembled for operation.

Figure 9:
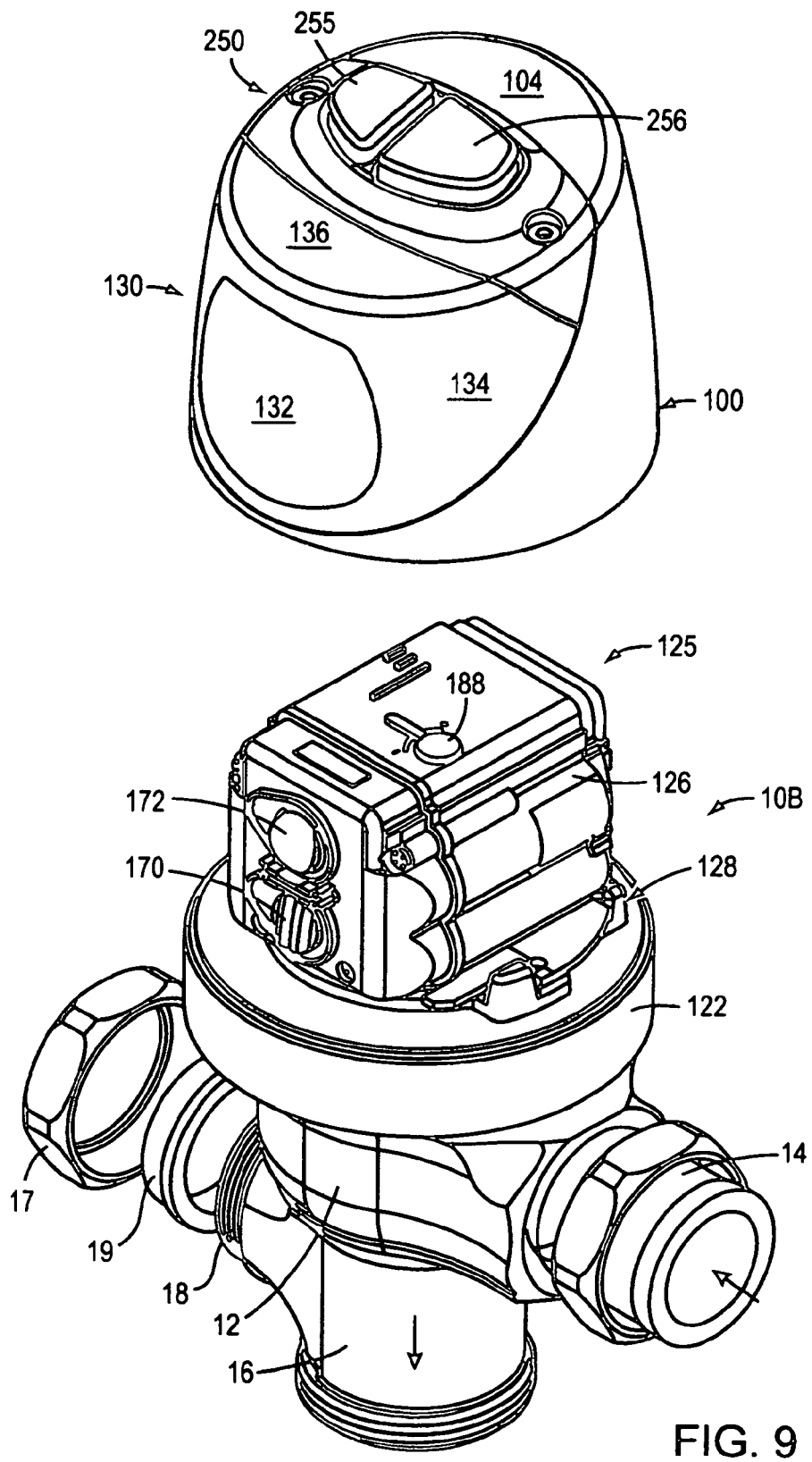
FIG. 9 is a perspective view of the bathroom flusher shown in FIG. 8, having a flusher cover removed.

Automatic bathroom flusher 10B also includes an external flusher cover enclosing electronic control module 125, shown in FIG. 9. The external flusher cover is preferably a dome-like outer cover specifically designed for protection and easy servicing of control module 125. The flusher cover also includes manual override buttons 255 and 256 used to override the flusher's sensor (e.g., an optical sensor, an ultrasonic sensor, a capacitive sensor, a heat sensor or a passive near infrared sensor).

Figure 10:
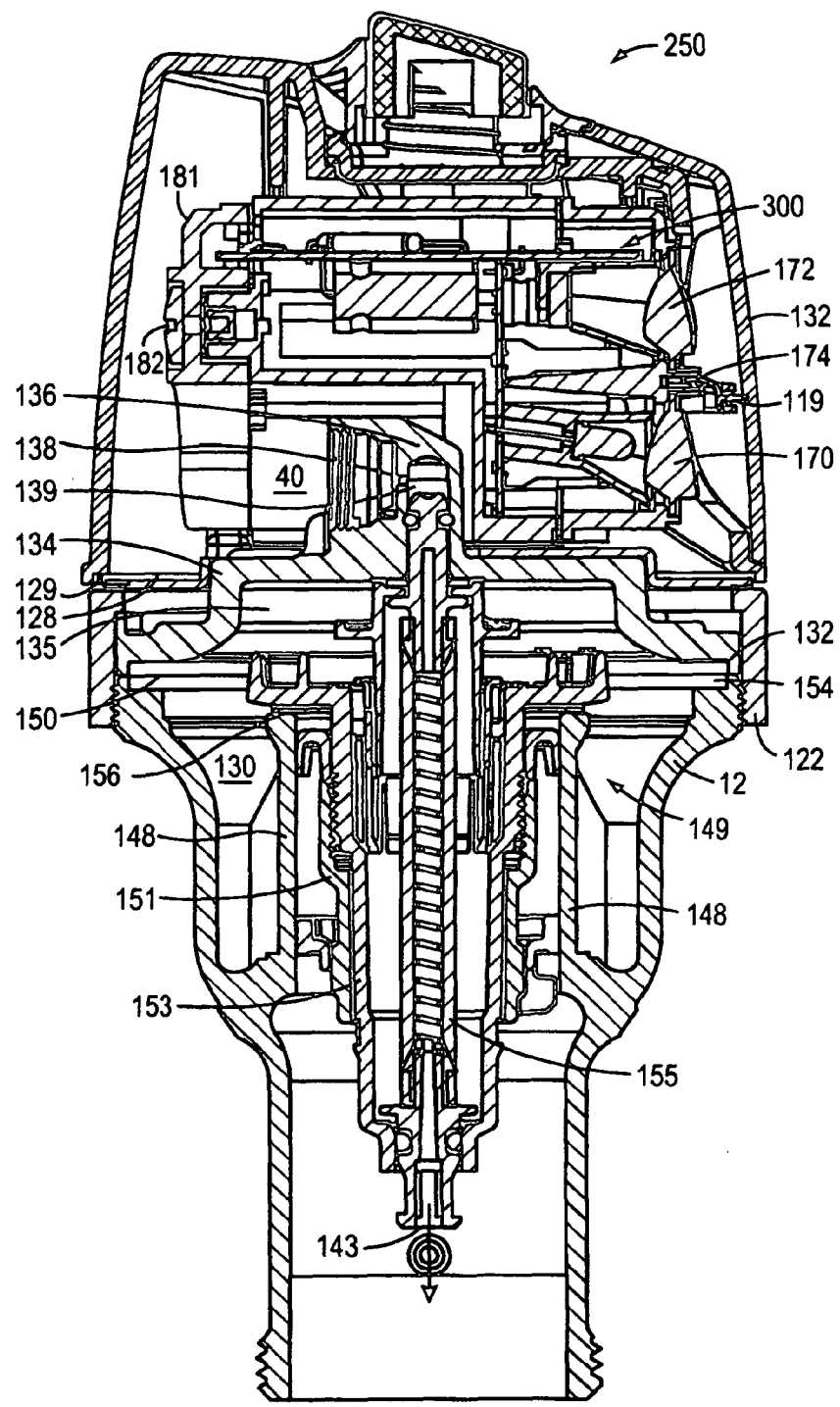
FIGS. 10 and 10A are cross-sectional views of the flusher mainly illustrating an electronic control module, a solenoid actuator and a flush mechanism located inside of the flusher cover.

As shown in FIGS. 8, 8A, 8B and 9, the flusher cover includes a main cover body 100, a front cover 130, and a top cover 250. The entire flusher cover is secured in place with respect to the flusher body using an attachment ring 122 connecting a pilot cap 134 to flusher body 12. As shown in FIG. 10, electronic control module 125 is positioned onto an alignment plate 128, which defines the module's position and orientation with respect to the front of the flusher. Electronic control module 125 includes electronic elements that control the entire operation of the flusher, shown in FIGS. 3 and 4, including a sensor and a controller for execution of a detection and flushing algorithm. The controller provides signals to a solenoid driver that in turn provides drive signals to a solenoid actuator 40 (FIG. 10). Solenoid actuator 40 controls the operation of the flush valve assembly that opens and closes water flow from input 14 to output 16.

Figure 10A:
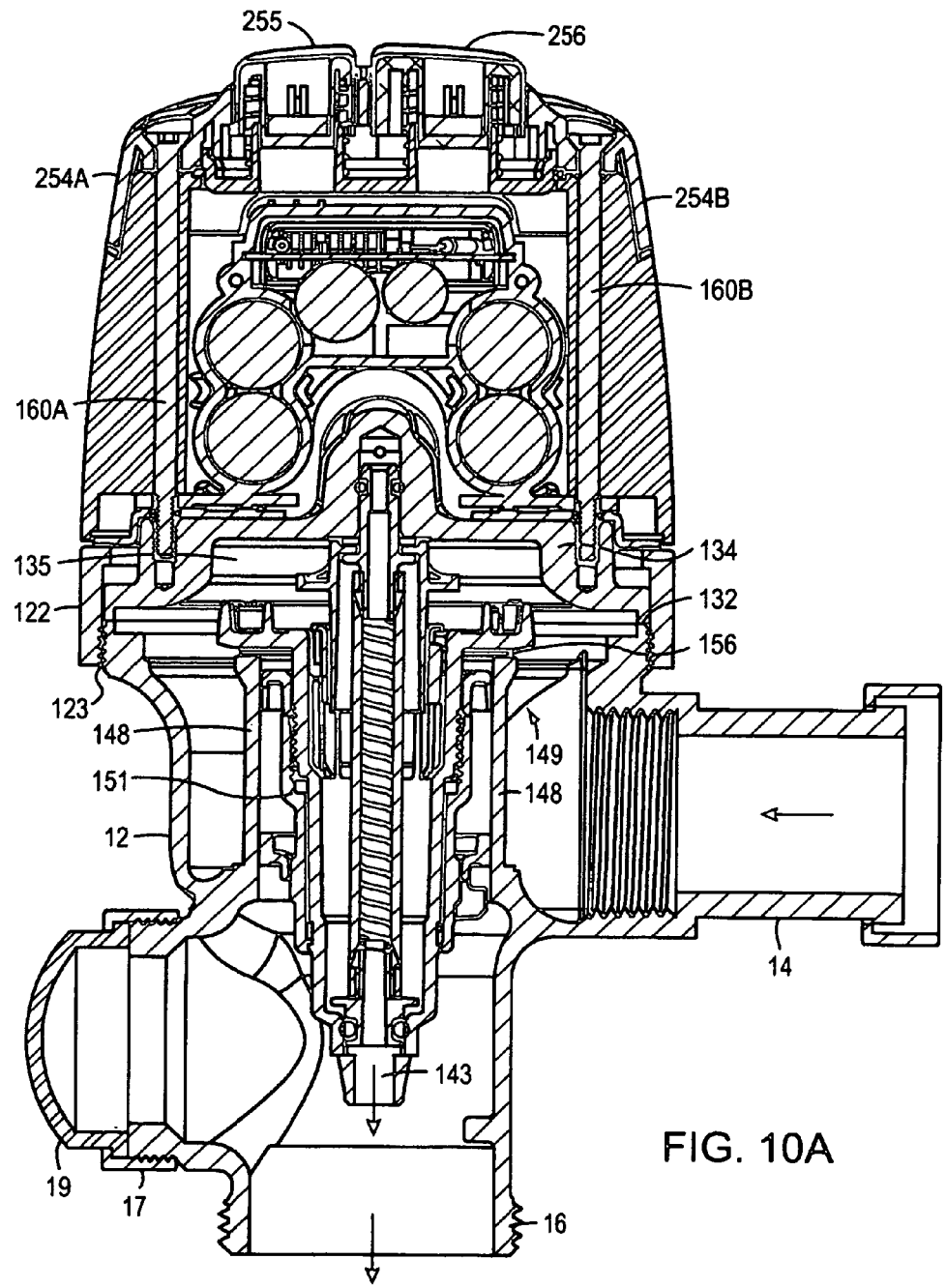

FIGS. 10 and 10A are cross-sectional views illustrating flusher 10B including electronic control module 125 and solenoid actuator 40, all located inside of the external cover. FIGS. 10 and 10A also partially illustrate the top part of flusher body 12 designed to receive the flush valve assembly including a flexible diaphragm 150. Electronic control module 125 includes a water tight housing 126 (FIG. 9), which is preferably a plastic housing, for enclosing batteries, the electronic circuitry and a sensor. Preferably, the sensor is an optical sensor that has a light source (i.e., a transmitter) and/or a light detector (i.e., a receiver) operating in the visible to infrared range. Alternatively, the sensor is an ultrasonic sensor or an infrared body heat detector.

Referring still to FIGS. 10 and 10A, the flushing assembly includes pressure cap (pilot chamber cap) 134, flexible diaphragm 150, and a pressure relief assembly coupled to solenoid actuator 40. Flexible diaphragm 150 separates an annular entrance chamber 130 from pilot chamber 135, both being located within valve body 12, wherein a bleed passage provides communication between the two chambers. The pressure relief assembly includes a piloting button 138 coupled to an input passage and an output passage 139 located inside the top part 136 of pilot cap 134.

As described in the PCT application PCT/US02/38758, which is incorporated by reference, piloting button 138 is screwed onto the distal part of actuator 40 to create a valve. Specifically, the plunger of actuator 40 acts onto the valve seat inside piloting button 138 to control water flow between the passages 139 and 143. This arrangement provides a reproducible and easily serviceable closure for this solenoid valve. Co-operatively designed with piloting button 138 and actuator 40, there are several O-rings that provide tight water seals and prevent pressurized water from entering the interior of the cover. The O-rings also seal piloting button 138 within the chamber inside the top part 136 and prevent any leakage through this chamber into the bore where actuator 40 is partially located. It is important to note that these seals are not under compression. The seat member precisely controls the stroke of the solenoid plunger as mentioned above. It is desirable to keep this stroke short to minimize the solenoid power requirements.

Referring also to FIG. 9, inside the cover, electronic control module 125 is positioned on alignment plate 128, which in turn is located in contact with pilot chamber cap 134. Plate 128 includes an opening designed to accommodate top part of pilot cap 134. Electronic control module 125 includes two circuit boards with control electronics (including preamplifiers and amplifiers for operating the above-mentioned optical sensor), a solenoid driver, and preferably four batteries, all of which are located inside plastic housing 126. The light source associated with electronic control module 125 is coupled to an output lens 170 providing light path for the emitted light. A receiver lens 172 focuses received light onto a light detector also located inside plastic housing 126. The operation of the light source and detector and the entire control electronics is described in the PCT application PCT/US02/38758. Another embodiment of the optical sensor is described in U.S. Pat. No. 6,212,697, which is incorporated by reference.

Referring still to FIGS. 10 and 10A, supply line 14 communicates with the entrance chamber defined by valve body 12 and a chamber wall 148 formed near the upper end of flush output 16. Flexible diaphragm 150 is seated on a main valve seat 156 formed by the mouth of flush output 16, and has a circularly-shaped outer edge 154 located in contact with the periphery of pilot chamber cap 134. Retaining ring 122 clamps pilot chamber cap 134 at its periphery 132 with respect to flusher body 12, wherein outer edge 154 of diaphragm 50 is also clamped between periphery 132 and flusher body 12.

In the open state, the water supply pressure is larger in the entrance chamber than water pressure in pilot chamber 35, thereby unseating the flexible diaphragm 50. When flexible diaphragm 150 is lifted off from seat 156, supply water flows from supply line 14, through the entrance chamber by valve seat 156 into flush conduit 16. In the closed state, the water pressure is the same in entrance chamber and in pilot chamber 135 since the pressure is equalized via the bleed hole in the diaphragm. The pressure equalization occurs when went passage 139 is closed by the plunger of solenoid actuator 40. Then, water pressure in the upper, pilot chamber 135 acts on a larger surface and thus exerts greater force on diaphragm 150 from above than the same pressure within the entrance chamber, which acts on a smaller, lower surface of diaphragm 150. Therefore, diaphragm 150 ordinarily remains seated on seat 156 (when the passage 139 is closed for some time and the pressure equalization occurs).

To flush the toilet, solenoid-operated actuator 40 relieves the pressure in pilot chamber 135 by permitting fluid flow between pilot entrance passage 37 and exit passage 143. The time it takes for the chamber to refill is determined by the stroke of the diaphragm. Furthermore, actuator 40 controls the pressure release time (i.e., time for venting pilot chamber 135), which in turn determines the time during which the flush valve is open for water to pass. Both actuator 40 and the stroke of the diaphragm assembly control the duration of the flush (for a selected size of the bleed passage) and thus, the volume of water passing through the flush valve. In many regions with a limited water supply, it is very important to closely control the volume of water that passes through the flush valve each time the flusher is operated. Various governments have passed different regulations defining what water flow is permitted through a flush valve in commercial washrooms. A novel design of the actuator and the control electronics can deliver a relatively precise amount of flush water, as described in PCT applications PCT/US02/38758 or PCT/US02/41576, both of which are incorporated by reference.

The design of actuator 40 and actuator button 38 is important for reproducible, long-term operation of flusher 10B. Actuator 40 may have its plunger directly acting onto the seat of actuator button 38, forming a non-isolated design where water comes in direct contact with the moving armature of the solenoid actuator. This embodiment is described in U.S. Pat. No. 6,293,516 or U.S. Pat. No. 6,305,662, both of which are incorporated by reference. Alternatively, actuator 40 may have its plunger enclosed by a membrane acting as a barrier for external water that does not come in direct contact with the armature (and the linearly movable armature is enclosed in armature fluid. In this isolated actuator embodiment, the membrane is forced onto the seat of actuator button 38, in the closed position. This isolated actuator, including button 38 is described in detail in PCT application PCT/US 01/51098, which is incorporated by reference.

In general, solenoid actuator 40 includes a bobbin having magnetically wound electrical windings, and an armature linearly movable within the bobbin. The latching versions of the actuator include a ferromagnetic pole piece magnetically coupled to a permanent magnet acting against an armature spring. The permanent magnet is arranged for latching the armature in the open state. The armature spring maintains the armature in the extended position (i.e., the closed position with the plunger preventing flow through passage 37). To flush the toilet, the microcontroller provides a control signal to a drive circuit that provides current to the solenoid windings of actuator 40. The drive current generates a magnetic field that tends to concentrate in a flux path in the ferromagnetic armature and the pole pieces as described in the PCT Application PCT/US01/51098. The latching actuator (i.e., bistable actuator) requires no current to keep the valve open.

In the non-latching versions, there is no permanent magnet to hold the armature in the open position, so a drive current must continue to flow if the pilot valve is to remain open (i.e., the drive current is needed to hold the plunger away from the pilot seat allowing flow through passage 37). The pilot valve can be closed again by simply removing the current drive. To close the pilot valve in the latching actuator, on the other hand, current must be driven through the windings in the reverse direction so that the resultant magnetic field counters the permanent-magnet field that the actuator experiences. This allows the armature spring to re-seat the plunger of actuator 40 in a position in which the spring force is again greater than the magnetic force. Then, the actuator will remain in the pilot-valve-closed position when current drive is thereafter removed.

Figure 9A:
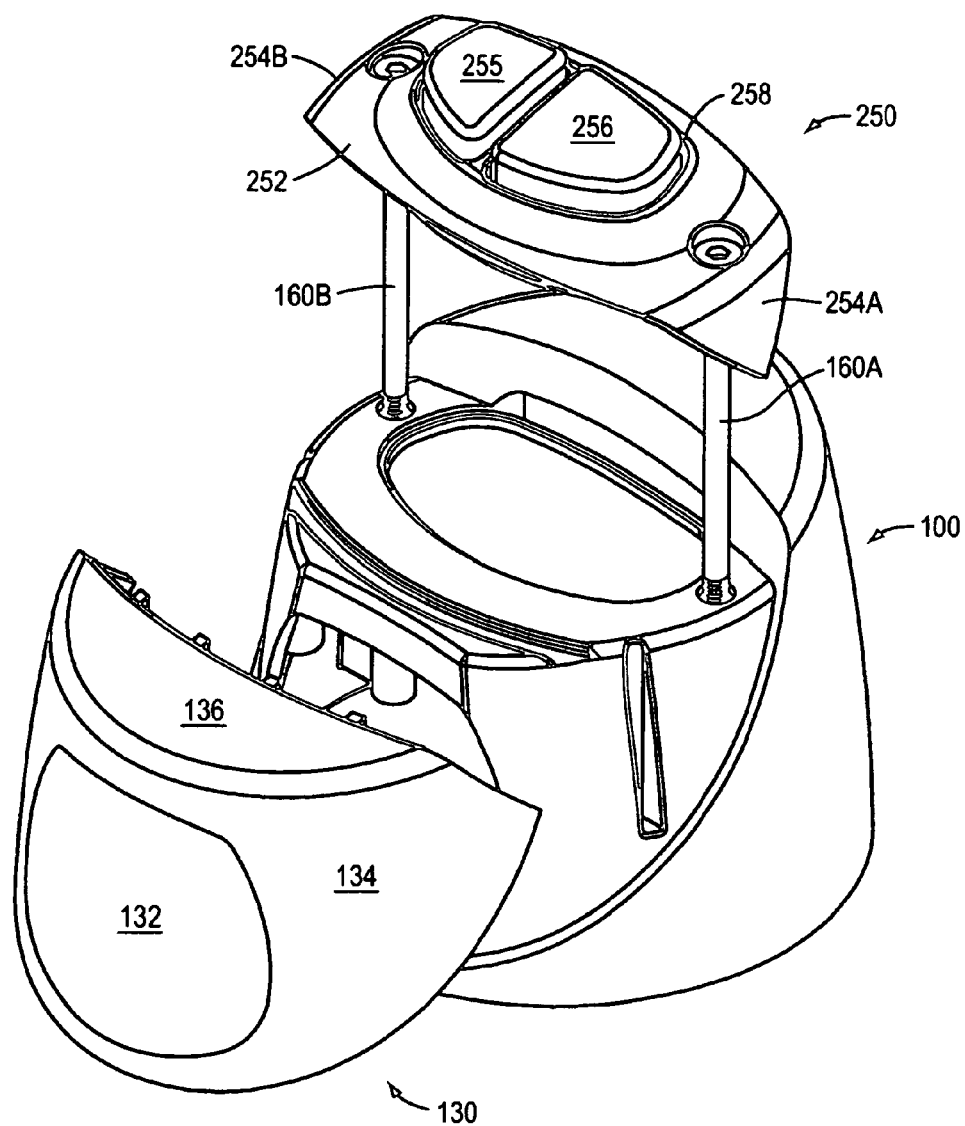
FIG. 9A is a perspective exploded view of the flusher cover shown in FIG. 9.

Referring again to FIG. 9A, the external cover is designed for optimal operation and easy servicing of automatic flusher 10. Main cover body 100 provides overall protection and rigidity. Front cover 130 and top cover 150 have complementary shapes with main body 100 to form a dome-like structure and to enable easy disassembly (as shown in FIG. 9A by the exploded view). The main body 100, front cover 130 and top cover 150 fit together like a simple three-dimensional puzzle. In a preferred embodiment, these elements have surfaces arranged to provide a tight water seal. As also shown in FIG. 2A, screws 160A and 160B hold in place top cover 150 by tightening against the respective cooperating threads 30A and 30B located in pilot cap 34. Screws 160A and 160B include respective heads 163A and 163B (FIG. 9B) optionally designed for a unique, custom made wrench (or a screw driver head) that prevents unauthorized removal. This arrangement holds in place and attaches together main cover 100 with front cover 130 and top cover 150, which are all coupled to the pilot chamber cover 134. This arrangement also holds control module 125 and plate 128 in place with respect to pilot cap 134, which in turn is attached to flusher body 12 by a retaining ring 122.

Referring to FIG. 9, main body 100 includes a side and rear surface (which has an approximately cylindrical shape), a top surface 104, and an elliptical abutting surface cooperatively arranged with the surface of front cover 130 shown in FIG. 9A. Main body 100 also includes an upper side abutting surface cooperatively arranged with the corresponding surface of top cover 150 shown in FIG. 9A. As also described in U.S. Pat. No. 7,188,822, main body 100 also includes holes cooperatively arranged with the respective screw guides for screws 160A and 160B extending from top cover 150 to the respective threaded holes in pilot cover 134 (FIG. 10A). To attach front cover 130 to main body 100, main body 100 includes two slots and cooperatively arranged with lip surfaces located on the inner side of front cover 130. The rectangular lip surfaces uniquely define the relative position of main body 100 and front cover 130 and provide relative rigidity.

Main body 100 includes a divider element 119 (FIG. 10A) dividing light sensor opening 120 into two parts. The outer side of divider 119 includes a light barrier, which prevents cross-talk between source lens 170 and receiver lens 172. The active optical sensor includes a light source that emits infrared radiation focused by lens 170 through optical window 132. If there is an object nearby, a portion of the emitted radiation is reflected back toward optical window 132. Lens 172 collects and provides a portion of the reflected radiation to the receiver. The receiver provides the corresponding signal to the microcontroller that controls the entire operation of the flush valve.

There is an alternative embodiment of the main body for the passive infrared sensor, which does not include a light source, but only an infrared detector through optical window 132. Since, in this embodiment, there is no light source, there is no need for divider element 119.

Importantly, the material of dome cover is selected to provide protection for electronic control module 125 and actuator 40. The cover is formed of a plastic that is durable and is highly resistant to the chemicals frequently used in washrooms for cleaning purposes. The materials are also highly impact resistant (depending on the type of installation, i.e., public or private) so as to resist attempts of vandalism. Furthermore, the flusher cover is designed to replace main cover body 100, front cover 130, or a top cover 250 in cases of vandalism without closing the water supply or removing electronic control module 125. Furthermore, electronic control module 125 may be replaced without closing the water supply.

Main body 100 can alternatively be made of a non-corrosive metal (instead of plastic), while front cover 130 or top cover 250 are still made of plastic. It has been found that polysulfone is a highly desirable plastic material for this purpose. Front cover 130 includes window 132 and can also be made of a polysulfone plastic that does not impede or interfere with the transmission of infrared signals from the sensor. Preferably, window 132 masks or obscures the interior elements in flush valve 10. Preferably, a pigment is added to the polysulfone so that approximately 70 percent of visible light at all wavelengths will pass through window 132 and approximately 30 percent will be impeded. A pigment made by Amoco bearing spec number BK1615 provides a dark (not quite-black), deep lavender window 132, which obscures the interior components, but yet permits transmission of a very substantial portion of light at the used wavelengths. Window 132 is usually made of the same material as other portions of front cover 130, but may be more highly polished in contrast with the somewhat matte finish of the remaining portions of front cover 130. In general, window 132 is made of material suitable for the selected type of the flusher sensor.

Alignment plate 128 includes two front alignment posts, two rear alignment posts, and two screw holes. Alignment plate 128 also includes a vent passage cooperatively designed with water passage 129 (FIGS. 8B and 10) located in the rear of main body 100. In the case of an unlikely malfunction, there may be a water leak, which could create water flow into the flusher cover. Water passage 129 provides a water outlet from inside to outside of the flusher cover. Water passage 129 prevents water accumulation inside the flusher cover and thus prevents flooding and possible damage to electronic module 125. Water passage 129, however, does not allow significant water flow from outside to the inside of the flusher cover (e.g., from the top or the side of cover 20 during cleaning). This is achieved by the shaped surface of the alignment plate and passage 129. According to another embodiment, the flusher cover 20 is designed to withstand high pressure cleaning, while still providing vent passage 129.

Importantly, the flusher cover is designed to service automatic flusher 10B without disconnecting the water supply provided via input line 14, or removing retaining ring 122. Top cover 250 can be removed by loosening screws 160A and 160B and lifting top cover 150, as shown in FIG. 9A. Upon lifting top cover 150, front cover 130 may be removed by a sliding upward motion facilitated by the grooves in main body 100. Furthermore, upon removing screws 160A and 160B, the entire cover can be lifted and electronic control module 125 can be accessed. This enables servicing or replacing electronic control module 125 while actuator 40 still remains in place and provides a seal to the external water supply. For example, the batteries may be replaced by removing a screw 182 and a back cover 181 (FIG. 10) to slide the batteries out of body 126. After the batteries are replaced, cover 181 is attached back and screw 182 is tightened. Thus, the batteries may be replaced by untrained personnel without any need to call a plumber and closing the external water supply.

Figure 9B:
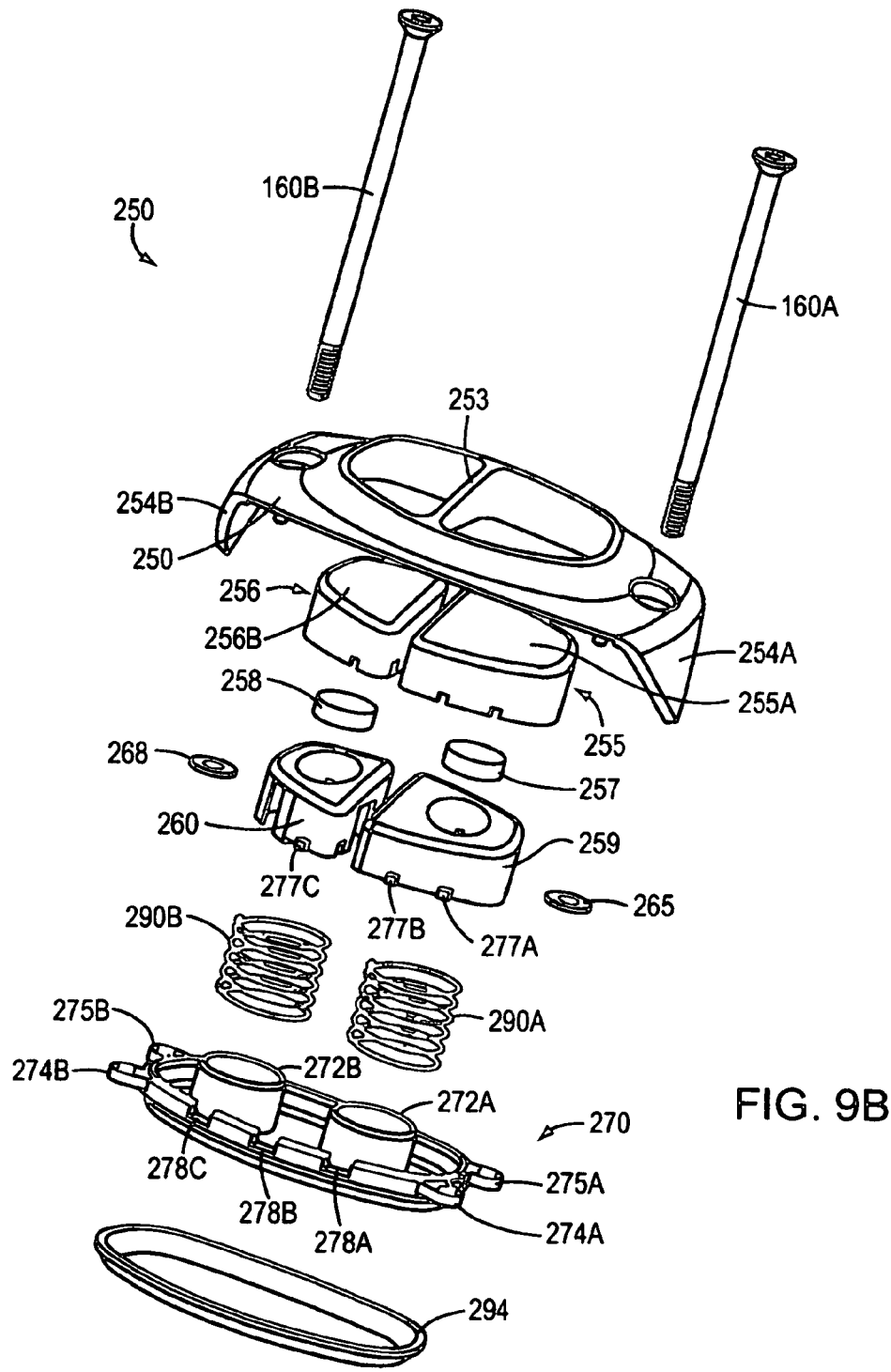
FIG. 9B is a perspective exploded view of the top cover of the flusher shown in FIG. 9A.
Figure 9D:
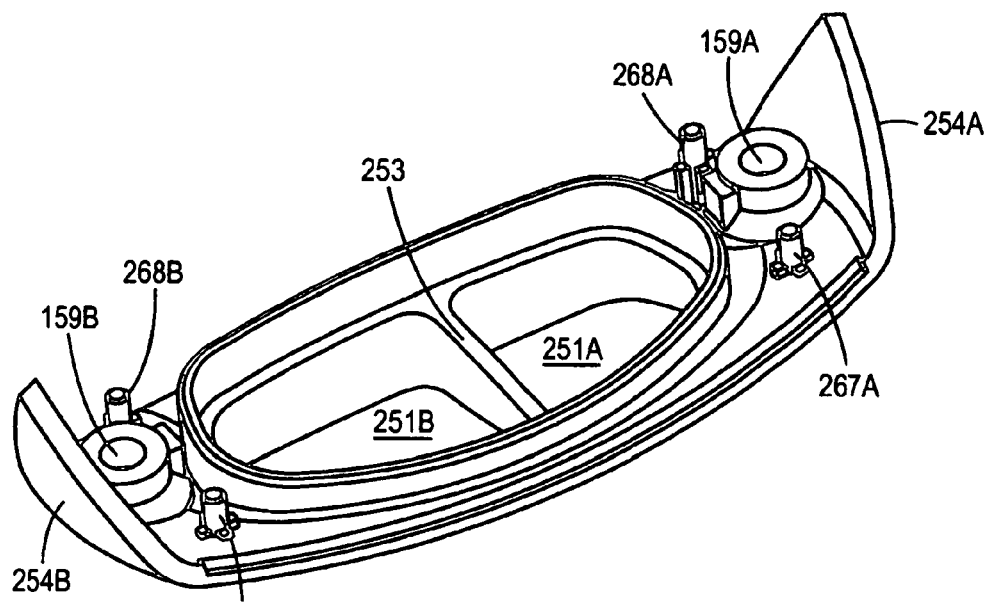
FIGS. 9C and 9D are perspective top and bottom views of the top cover of the flusher shown in FIG. 9A.
Figure 9C:
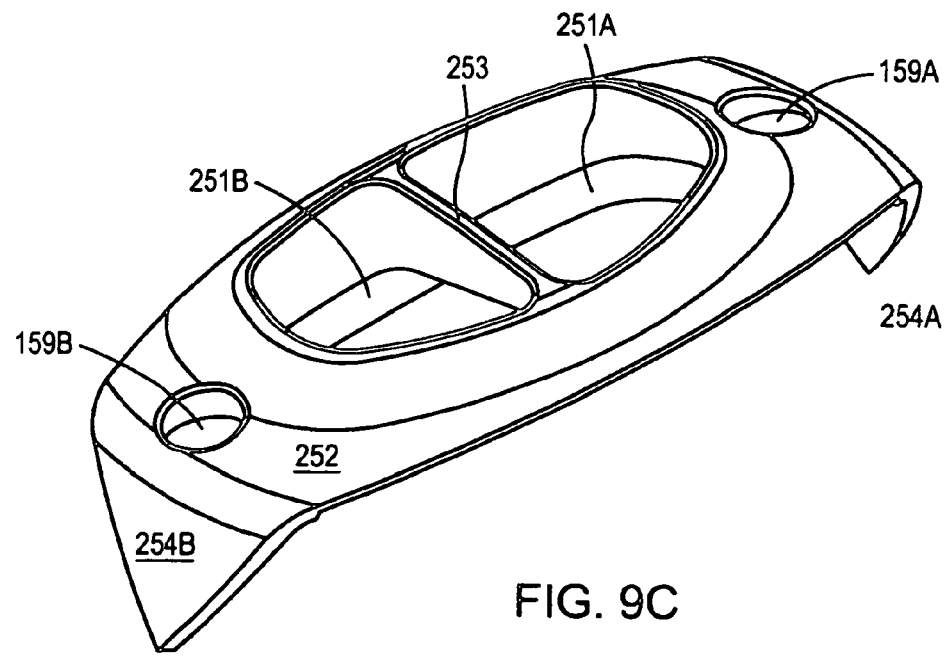

Referring also to FIGS. 9A, 9B and 9C, top cover 250 includes a curved dome-like top surface 258 cooperatively arranged with a button retainer 270 (FIG. 9A) and buttons 255 and 256. Top cover 250 also includes side surfaces 254A and 254B, which are functionally important for lifting top cover 150 (after loosening screws 160A and 160B) without any tools. Top cover includes the two buttons, which include button caps 255 and 256, magnets 257 and 258, button bodies 259 and 260, and springs 290A and 290B. These elements are constructed to ride with respect to bottom retainer 270. The control module includes two reed switches cooperatively arranged with magnets 257 and 258. Displacement of any one of buttons 255 or 256 displaces the corresponding magnet 257 or 258, which is arranged to be registered by the corresponding reed switch 346A and 346B, shown in FIG. 11. That is, each reed switch is a sensor sensing depression (or activation) of the flush button.

Bottom retainer 270 includes spring guides 272A and 272B for receiving springs 290A and 290b, which are in contact with the respective button body 259 and button body 260. Button body 259 includes protrusions 277A and 277B cooperatively designed with recessed surfaces 278A and 278B, respectively. Button body 260 includes a protrusion 277C cooperatively designed with a recessed surface 278C. Bottom retainer 270 also includes attachments openings 274A, 274B, 275A, and 275B cooperatively designed with attachment posts 267A, 267B, 268A, and 268B, shown in FIG. 9D. The mating of attachments openings 274A, 274B, 275A, and 275B with the corresponding attachment posts 267A, 267B, 268A, and 268B enables connection of the bottom retainer 270 to the horizontal surface 252 of top cover 250, while holding in place springs 290A, 290B, button bodies 259, 260, magnets 257, 258, and button caps 255, 256, respectively. This connection may be a snap connection, or a glued connection, or a heat welded connection of an ultrasonically welded connection. A rubber cap 294 provides a water seal. Recessed surfaces 278A, 278B, and 278C of bottom retainer 270 are designed as drain openings. Rubber washers 265 and 266 are used for screws 160A and 160B, respectively. Top cover 250 includes a separator 253 for partially guiding buttons 255 and 256. Top cover 250 also includes screw guides 159A and 159B, each having a side guide for guiding bottom retainer 270.

Importantly, the external cover is designed to adjust the sensitivity of the optical sensor while keeping optical window 132 in place. Specifically, after removing screws 160A and 160B the top cover 250 may be removed by holding side surfaces 254A and 254B. The side surfaces 254A and 254B are designed and arranged for easy removal by fingers of untrained personnel without any need of using a specialized tool. After lifting top cover 150, the top opening in main body 100 provides an access port to an adjustment screw 90 (FIG. 3). Adjustment screw 90 is coupled to an element on a circuit board 92.

A person adjusting the sensitivity of the optical sensor removes top cover 250 and also removes a seal cover 188 located on the top of controller housing 126. Below seal cover 188, there is the head of a screw that can be turned in the positive or negative direction to increase or decrease sensitivity of the optical sensor while maintaining front cover 130 and optical window 132 in place. Specifically, according to a preferred embodiment, this screw adjusts the resistance value of a current limiting resistor that is connected to the light source. By turning in the positive direction the resistance decreases and the light source receives a higher drive current to increase the emitted light intensity. Thus, the sensitivity of the optical sensor (or an infrared sensor or an ultrasonic sensor) is adjusted under the actual conditions of operation. After the adjustment, seal cover 188 is pushed back onto housing 126 to provide a seal, and top cover 250 is again attached to main cover 100 using screws 160A and 160B.

The above-described electronic control module is designed for easy and time-efficient conversion of manual flush valves (such as ROYAL® flush valves). The entire conversion process takes only few minutes. After the water supply is closed, the manual handle is removed, and lock ring 17 with cover 19 is placed onto manual port 18. Then, the original top cover is removed from the manual flusher body. Depending on the model of the manual flusher, the flush valve assembly, including the flexible diaphragm, may also be replaced with diaphragm 150 (and the flushing insert for venting the pilot chamber). Then, the entire cover, including electronic control module 125 attached to pilot cap 134 are screwed onto the body 12 using retaining ring 122 acting on threads 123.

As described above, the batteries in control module 125 may be replaced without closing the external water supply. Furthermore, the entire control module 125 may be removed and replaced without closing the external water supply. The removed control module 125 can be sent to the factory for refurbishing, which can even be done by untrained personnel. Furthermore, after closing the external water supply, actuator 40 with piloting button 38 may be unscrewed from pilot cap 134. A new actuator and piloting button may be screwed in.

The design of actuator 40 and piloting button 138 provide a reproducible geometry for the plunger-seat arrangement. Thus, this design provides a reliable and easily serviceable pilot valve.

Figure 11:
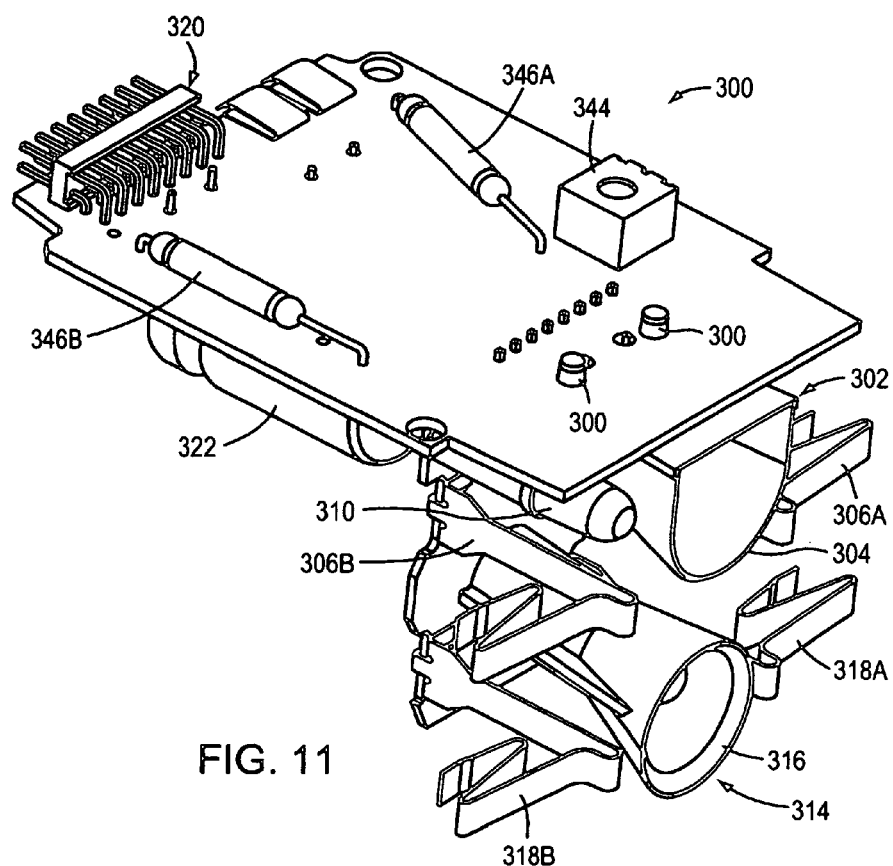
FIG. 11 is a perspective, partially exploded view of a circuit board located inside the electronic control module shown in FIG. 9.

FIG. 11 is a perspective, partially exploded view of a circuit board 300 located inside the electronic control module shown in FIG. 2. Circuit board 300 includes a receiver shroud 302, a emitter shroud 314, battery clips, a visible LED 310, a jumper connector 320, a capacitor 322, and reed switches 346A and 346B located to detect movement of buttons 255 and 256, respectively. Receiver shroud 302 includes a receiver housing 304 designed for receiving a lens located in front of a diode detector (not shown). Emitter shroud 314 includes a conical transmitter housing having a chamfer surface 316 for receiving a lens located in front of an IR emitter (e.g., an IR diode). The diode detector detects IR light reflected from a target after an emission for an IR source. Visible LED provides visible signals to a user regarding a state of the system (e.g., a bad battery state). Capacitor 322 is used to provide power to the actuator for latching or unlatching, and thus controlling the water flush, as shown in the circuit diagram shown in FIG. 5C. Reed switches 346A and 346B register movements of magnets 257 or 258. Jumper connector 320 receives a jumper switch for selecting different setting of the system.

The jumper switch is used to select a particular mode such as the urinal mode or the toilet stall mode. The jumper switch is also used to select one of several possible flushes for a short flush, a long flush, or an increased volume cleaning flush. For example, in one setting, the large flush volume is 1.6 gallon per flush and the small flush volume is 1.1 gallon per flush. In another setting, the large flush volume is 1.28 gallon per flush, and the small flush volume is 0.8 gallon per flush. The cleaning flush may be 10% or 20% or larger than the large volume flush, depending on the settings.

Circuit board 300 also includes a trimpot 344 for adjusting the detection sensitivity as described above. Circuit board 300 also includes alignment posts 300A and 300B for assembly purposes. Circuit board 300 also includes battery clips 306A, 306B, 318A, and 318B for placing batteries, and solenoid contacts for connecting solenoid actuator 40, shown in FIG. 10.

Figure 12:
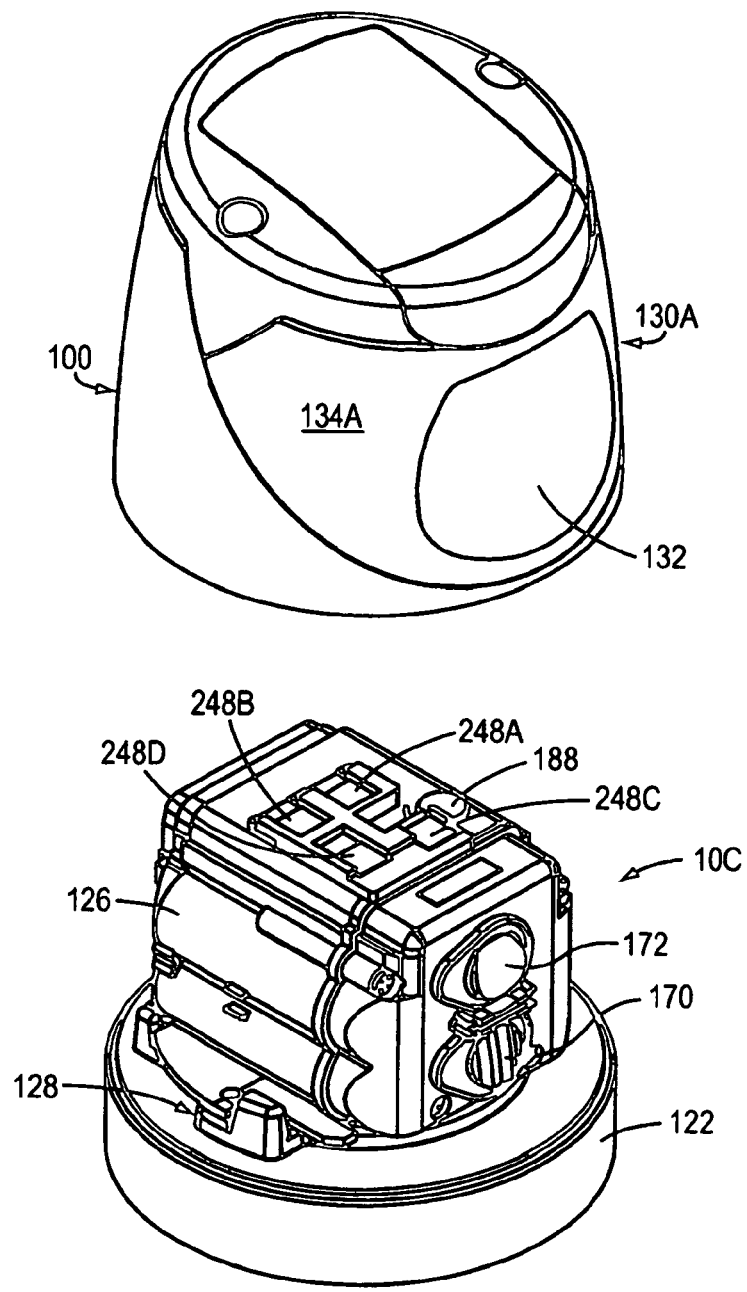
FIG. 12 is a perspective view of another embodiment the automatic bathroom flusher having a photovoltaic cell, wherein this perspective view has the flusher cover removed.
Figure 13:
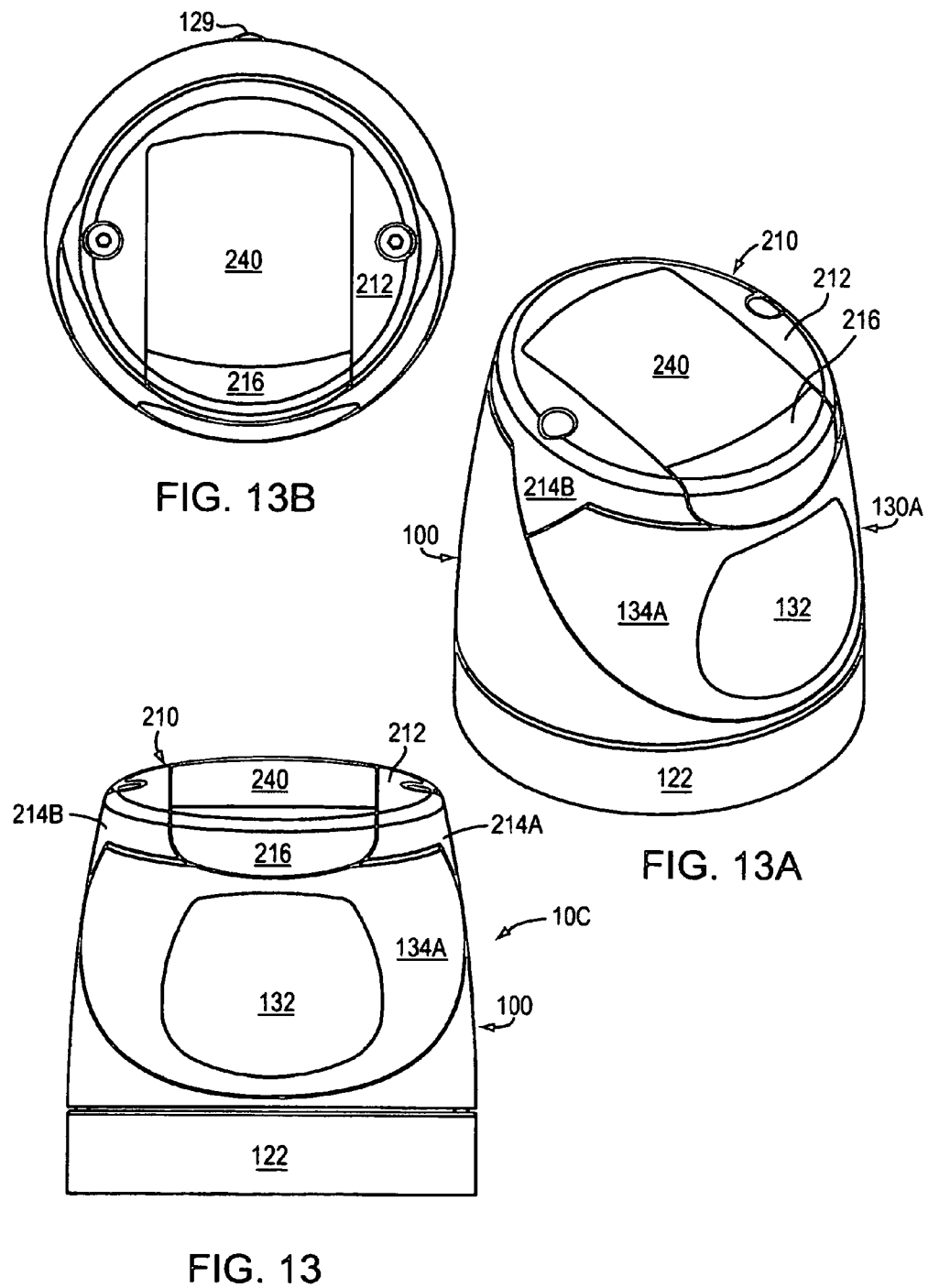

FIG. 12 is a perspective view of another embodiment an automatic bathroom flusher having a photovoltaic cell 240. Similarly as shown in FIGS. 2 and 9, the automatic bathroom flusher includes the flusher body coupled to a water supply line and also coupled to a water output line providing output to a connected toilet or urinal. FIGS. 13, 13A, and 13B are a front view, a perspective view and a top view of the flusher cover shown in FIG. 12, respectively. The automatic bathroom flusher includes an external flusher cover 20A (FIG. 12) for enclosing the electronic control module. External flusher cover 20A is preferably a dome-like outer cover specifically designed for protection and easy servicing of the control module. Flusher cover 20A also includes photovoltaic cell 240 and a manual override button 216. Photovoltaic cell 240 provides electrical to the bathroom flusher and manual override button 216 is used to override the flusher's sensor and activate a manual flush.

As shown in FIGS. 13, 13A and 13B, flusher cover 20A includes a main cover body 100, a front cover 130A, and a top cover 210. The entire flusher cover 20A is secured in place with respect to the flusher body using an attachment ring 22 connecting a pilot cap 34 to flusher body 12, similarly as shown in FIG. 10 or 10A. The electronic control module is positioned onto an alignment plate 28 (FIG. 12), which defines the module's position and orientation with respect to the front of the flusher. The electronic control module encloses the electronic elements that control the entire operation of the flusher, including a sensor and a microcontroller. The microcontroller executes several detection and flushing algorithms.

Figure 14:
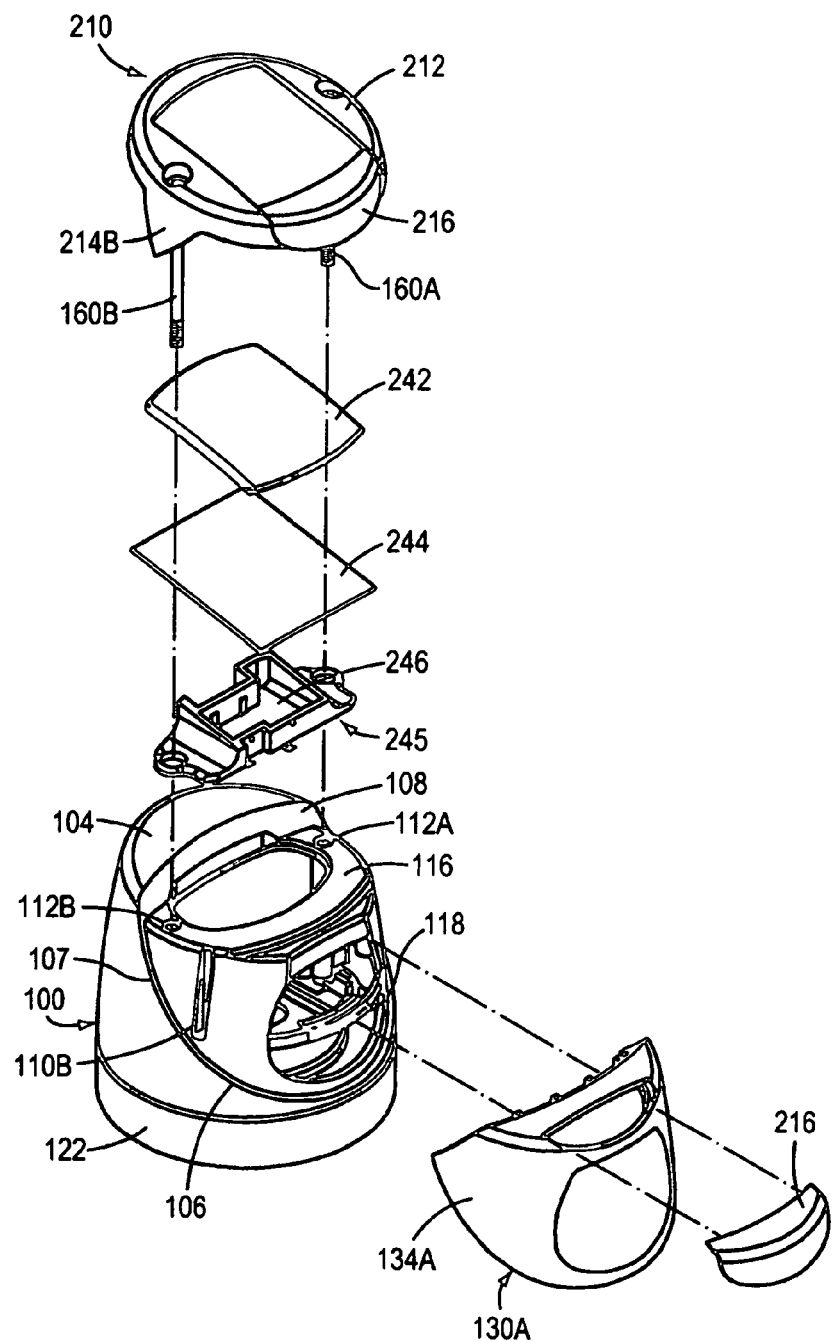
FIG. 14 is a perspective exploded view of the flusher cover shown in FIG. 12.
Figure 14B:
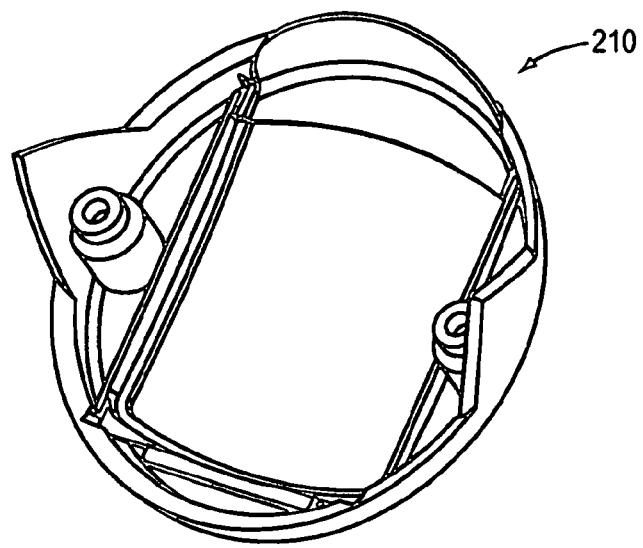
FIGS. 14A and 14B are perspective views of the top cover of the flusher shown in FIG. 12.
Figure 14A:
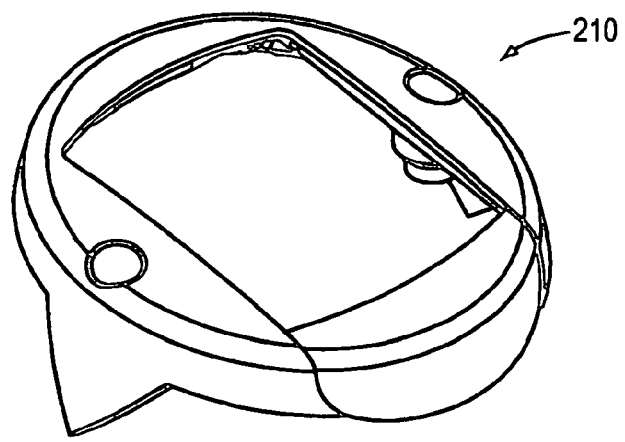

Referring to FIGS. 13, 13A and 13B, all cover elements, i.e., main cover body 100, front cover 130A, and top cover 210 have complementary shapes fitting together so that the flusher cover forms a dome-like structure. This structure enables easy disassembly (as shown in FIG. 14 by the exploded view). Preferably, main body 100, front cover 130A, and top cover 210 fit together like a simple three-dimensional puzzle. These elements have surfaces arranged to provide a tight water seal. Top cover 210 has an opening for mounting photovoltaic cell 240.

Figure 14D:
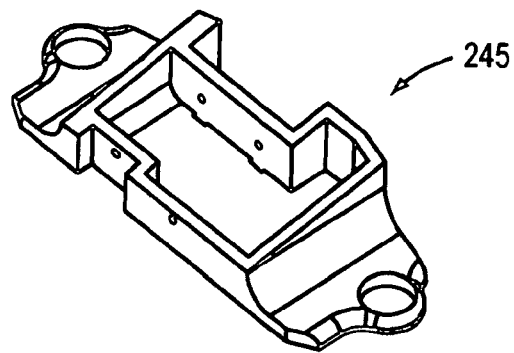
FIGS. 14C and 14D are perspective views of a receptacle for electronics for the photovoltaic cell.
Figure 14C:
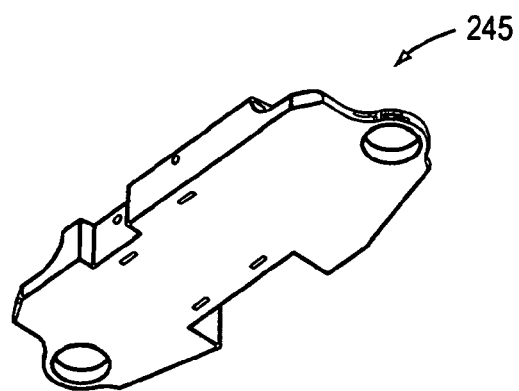

As also shown in FIG. 14, screws 160A and 160B hold in place top cover 210 by tightening against the respective cooperating threads 30A and 30B located in pilot cap 34, as shown in FIG. 3A. Screws 160A and 160B include respective heads 163A and 163B (FIG. 3A). This arrangement holds in place and attaches together main cover 100 with front cover 130A and top cover 210, which are all coupled to the pilot chamber cover 34. This arrangement restrains in place photovoltaic cell 240, which includes a cover 242, a photovoltaic array 244, and a receptacle 245 (shown in detail in FIGS. 14C and 14D) for enclosing electronics associated with array 244. This arrangement also holds control module 25 and alignment plate 28 in place with respect to pilot cap 34, which in turn is attached to flusher body 12 by a retaining ring 22 (as shown in FIG. 3A).

Referring to FIGS. 12 and 14, electronic control module 25 includes two circuit boards with control electronics (shown in FIGS. 33, 33A, and 33B), a solenoid driver, and the batteries, all of which are located inside plastic housing 26 similarly as shown in FIG. 10. The light source associated with electronic control module 25 is coupled to an output lens 70 providing light path for the emitted light. A receiver lens 72 focuses received light onto a light detector also located inside plastic housing 26. Photovoltaic cell 240 is mounted above receptacle 245, which includes an opening 246 for the electronics associated with photovoltaic cell 240. This embodiment may use much smaller batteries, which may also be rechargeable. The use of some batteries is preferred but not required since they may be replaced by another storage element. As shown in FIG. 12, the control module includes contacts 248A, 248B, 248C, and 248D providing electrical connection to the cell electronics shown in FIG. 34.

Photovoltaic cell 240 converts the energy of ambient light in the bathroom into electrical energy. As is known in the art, upon irradiation the cell generates charge carriers (i.e., electrons and holes) in a light-absorbing material using a p-n junction, and the photovoltaic cell separates these charge carriers to a conductive contact. Preferably, photovoltaic cell 240 is Sanyo AM-1815 "Amorton" with a photovoltaic layer made of amorphous silicon suitable for indoor applications. This cell has a size of 58.1 mm×48.6 mm and glass thickness 1.1 mm and operates at optimized 3.0 V and 42.0 µA. Preferably, the photovoltaic cell is sensitive to the visible light wavelengths ranging from approximately 400 nm to 700 nm.

Alternatively, photovoltaic cells using crystalline silicon, polycrystalline silicon, or microcrystalline silicon may be used. The photovoltaic layer may be made of cadmium telluride, copper indium selenide sulfide. Alternatively, instead of a traditional p-n junction, the cell may be a photo-electrochemical cell, a polymer cell, a nanocrystal cell, or a dye-sensitized cell. Alternatively, the cell may include polymers with nanoparticles can be mixed together to make a single multi-spectrum layer and such layers are then stacked. Such cell converts different types of light is first, then another layer for the light that passes and last is an infra-red spectrum layer for the cell.

Figure 15:
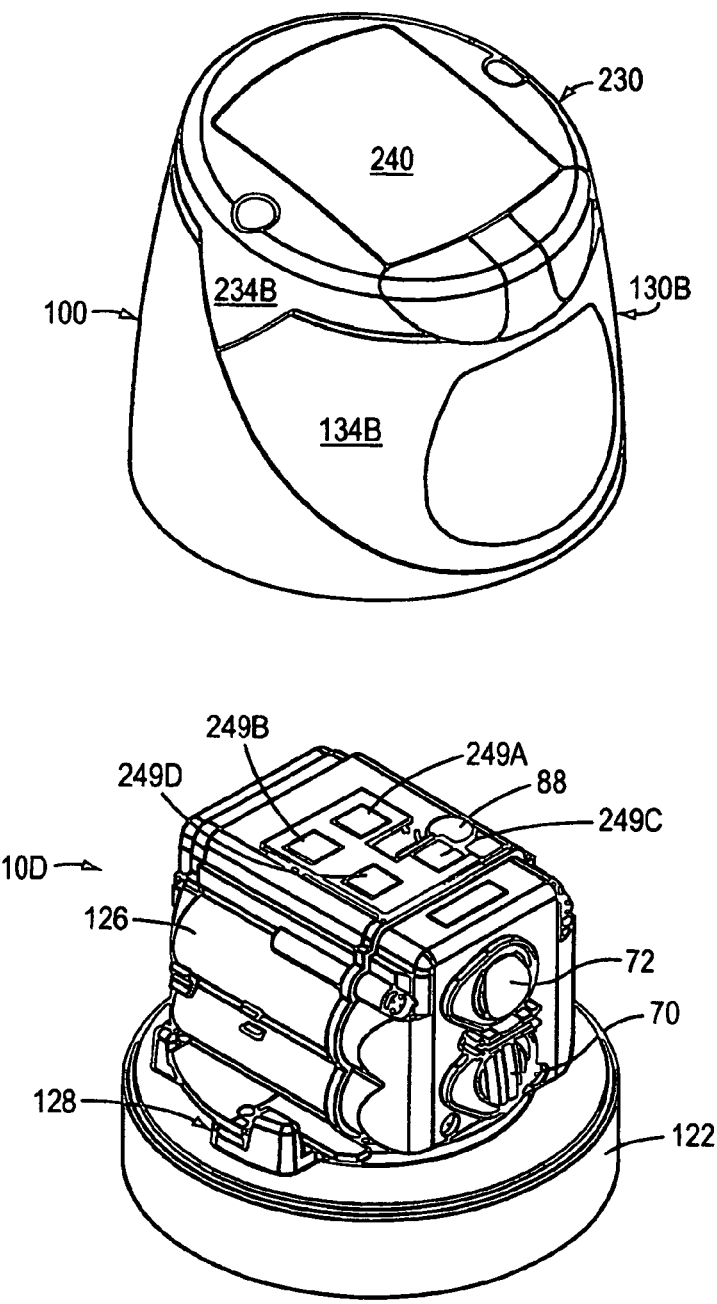
FIG. 15 is a perspective view of another embodiment the automatic bathroom flusher having a photovoltaic cell, wherein this perspective view has the flusher cover removed.
Figure 16:
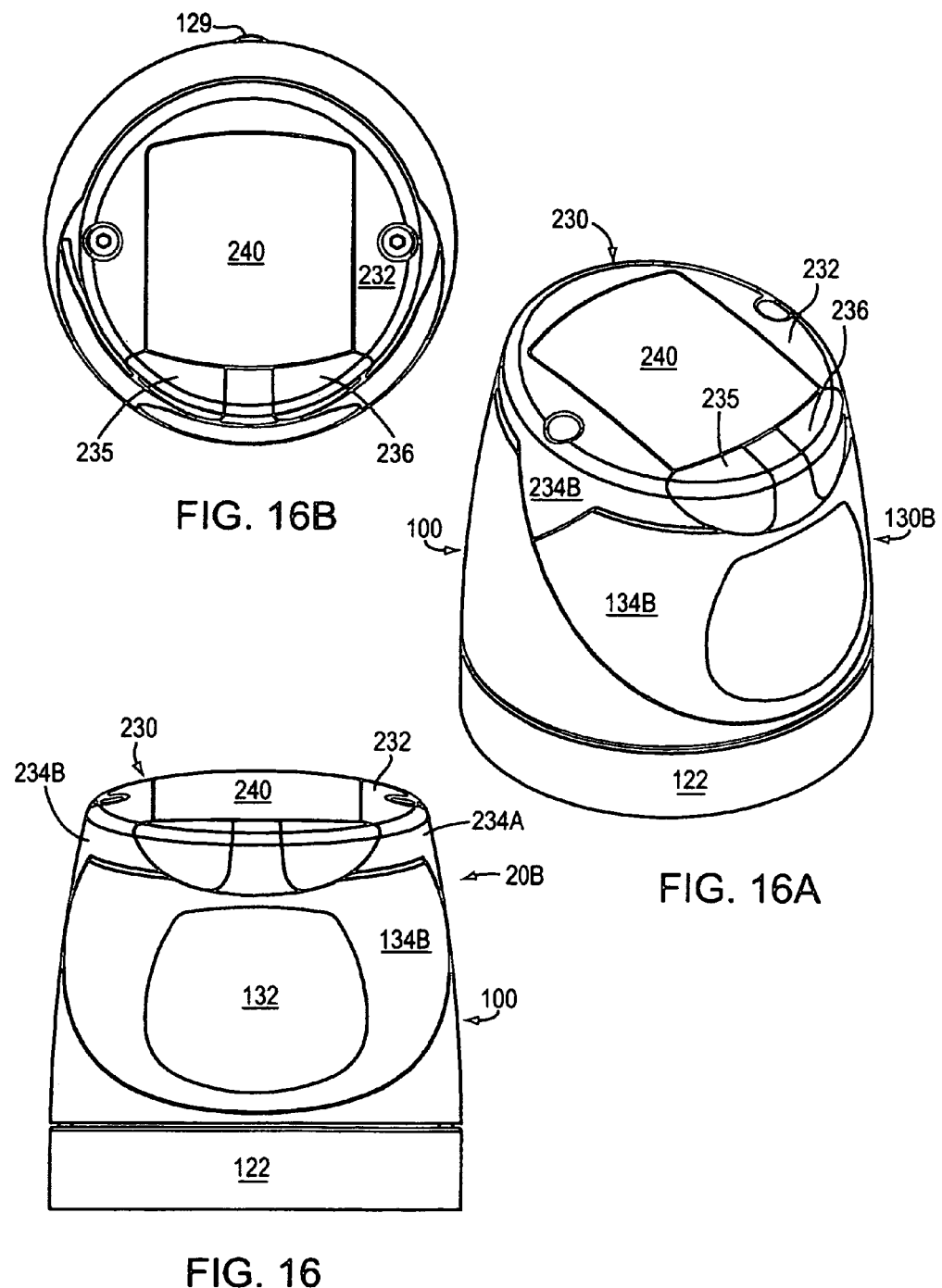

FIG. 15 is a perspective view of another embodiment the automatic bathroom flusher having a photovoltaic cell 240 and two manual override buttons 235 and 236. FIGS. 16, 16A, and 16B are a front view, a perspective view and a top view of the flusher cover shown in FIG. 15, respectively. Flusher cover 20B includes a main cover body 100, a front cover 130B, and a top cover 230. The entire flusher cover 20B is secured in place with respect to the flusher body using an attachment ring 22 connecting a pilot cap 34 to flusher body 12 (shown in FIG. 10 or 10A). The electronic control module is positioned onto an alignment plate 28, which defines the module's position and orientation with respect to the front of the flusher. The electronic control module includes contact pads 249A, 249B, 249C, and 249D located on the top surface. The electronic control module of this embodiment is similar as described above.

Figure 17:
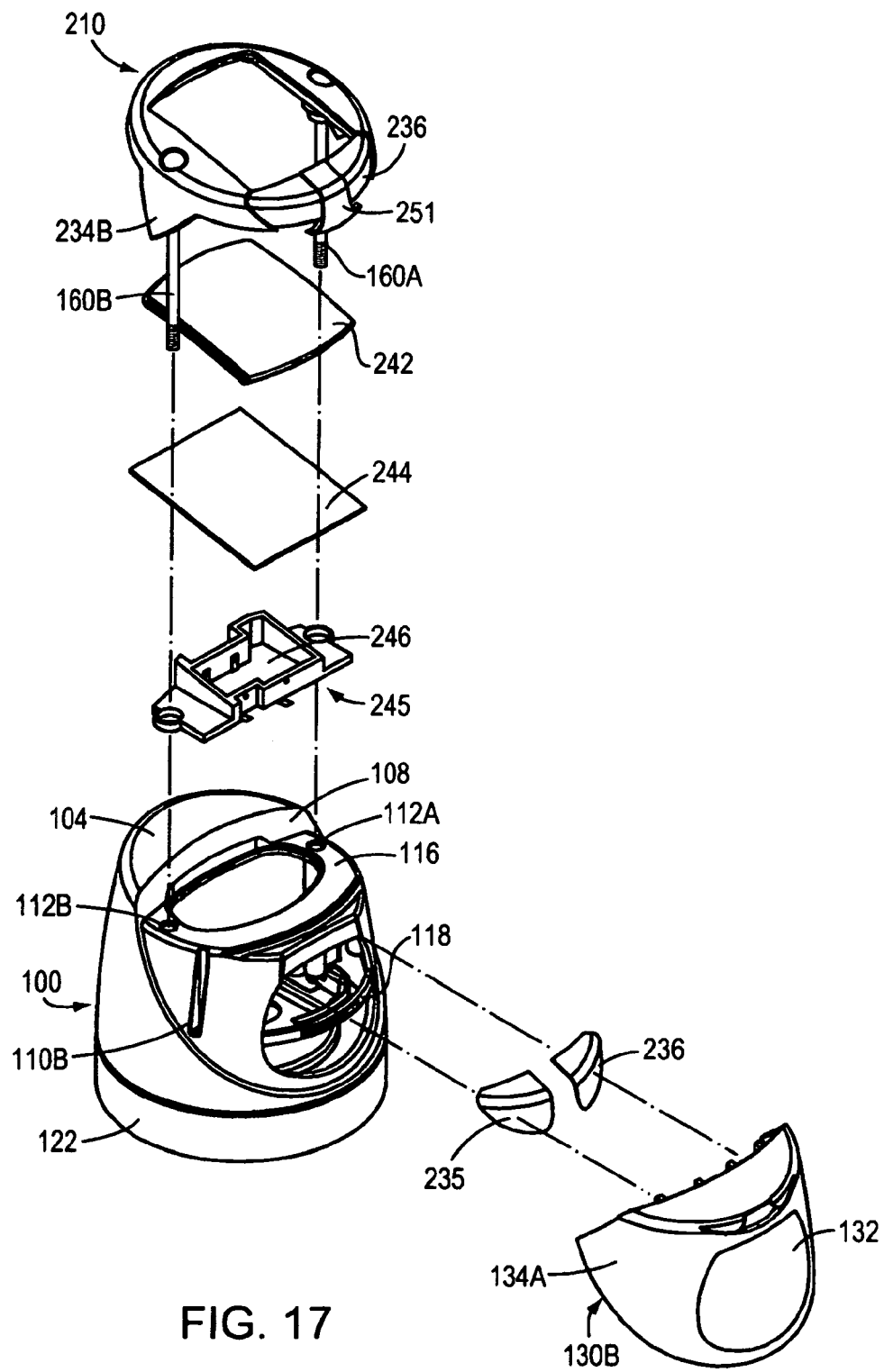
FIG. 17 is a perspective exploded view of the flusher cover shown in FIG. 15.
Figure 17B:
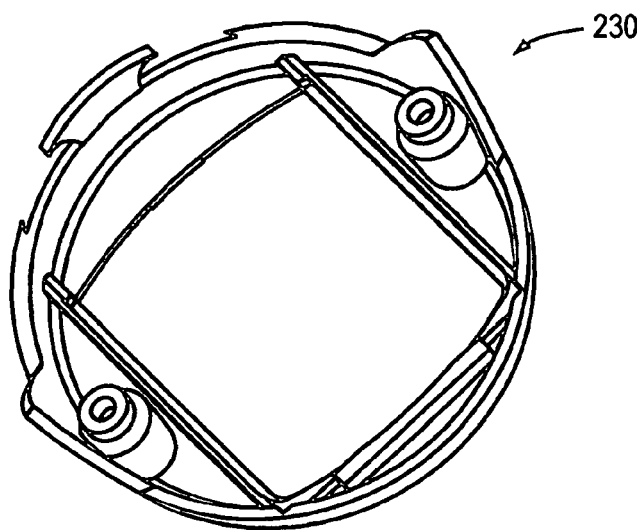
FIGS. 17A and 17B are perspective views of the top cover of the flusher shown in FIG. 15.
Figure 17A:
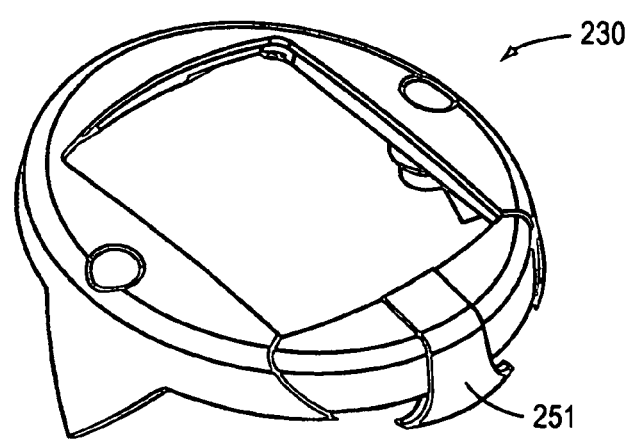

FIG. 17 is a perspective exploded view of the flusher cover shown in FIG. 15. FIGS. 17A and 17B are perspective views of top cover 230 designed to accommodate photovoltaic cell 240 and two manual override buttons 235 and 236. Smaller button 235 is used to initiate a short water flush, and larger button 236 is used to initiate a longer water flush. Flusher cover 20B is designed to protect control module 25 in case of water leaks as described above. Main cover body 100 includes water passage 128 (FIG. 4A) cooperatively designed with vent passage 210 (FIG. 7) for venting water from inside flusher cover 20B in case of a water leak.

Figure 18:
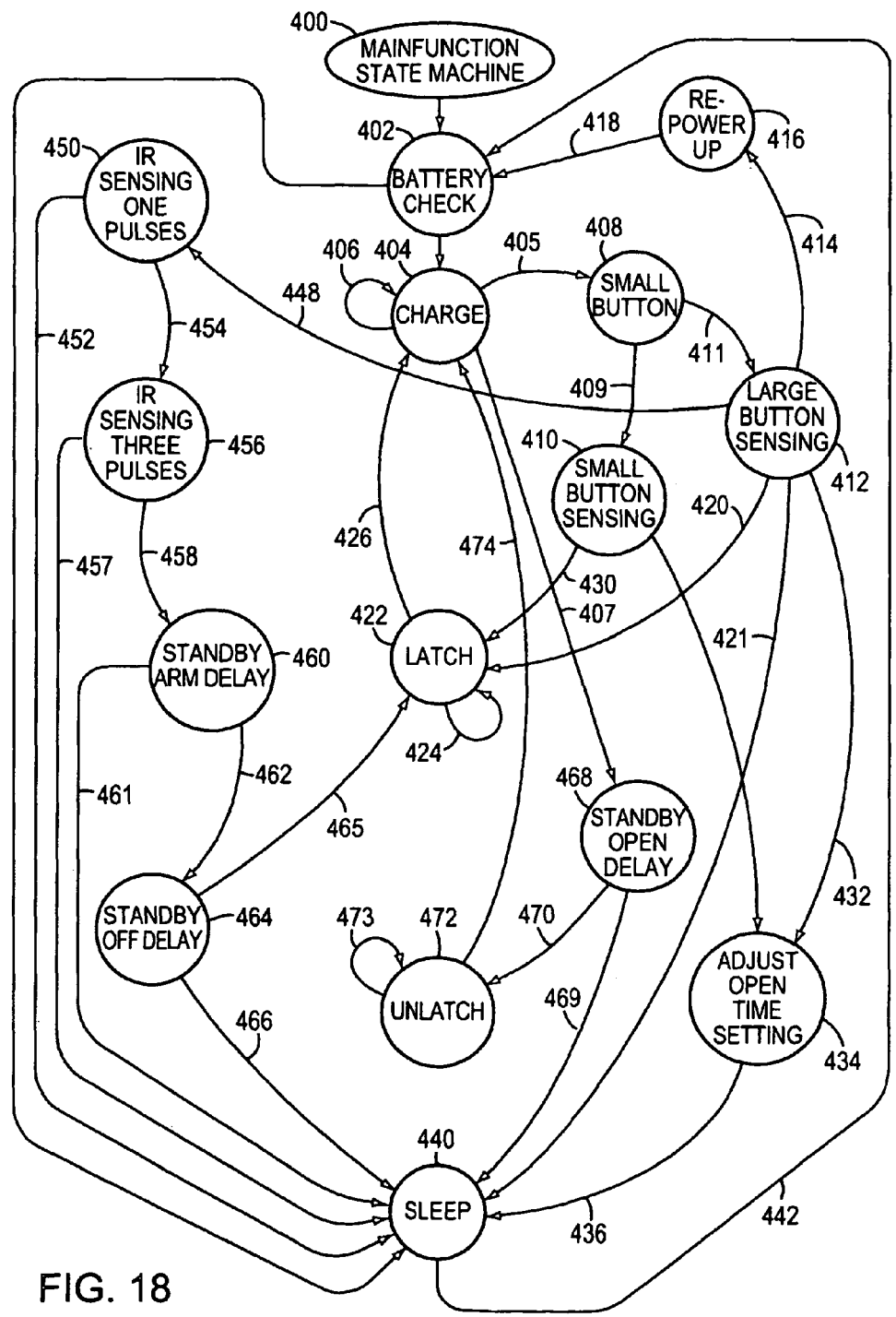
FIG. 18 illustrates the flusher's operation and the individual states.

FIG. 18 shows the flusher's software, which includes the following states: A battery check state 402, a charge state 404, a small button state 408, a small button sensing state 410, a large button sensing state 412, a re-power up state 416, a latch state 422, adjust open time setting state 434, a sleep state 440, an IR sensing state (one pulse) 450, an IR sensing state (three pulses) 456, a standby arm delay state 460, a standby off delay state 464, and a sleep state 440.

To save batteries, the microprocessor periodically wakes up from the sleep state during a time base wakeup (transition 442). The wake up of the microcontroller is 3.9 msec., 250 msec., or 1 sec depending on the algorithm. In battery check state 402, if no voltage on the battery is detected, or battery voltage is less than 4.2V during a 10-minute powerup, the microprocessor goes to sleep state 440. Alternatively, the microprocessor enters charge state 404. During the next time-based interrupt, wake up (transition 442), the microprocessor starts with battery check 402. In the charge state, the system capacitor 322 is being charged to provide power for controlling the solenoid actuator 40.

Next, if the capacitor voltage is at least 6 V, the microprocessor transitions to small button state 408 (transition 405). The small button is used by a user to activate a short flush (i.e., a small water volume flush). The large button is used by a user to activate a long flush (i.e., a large water volume flush). The system transitions to small button sensing state 410 (transition 409), and if small button is depressed by a user the corresponding reed switch receives a signal. If small button is not depressed by a user, the system transitions to large button sensing state 412 (transition 411). In large button sensing state 412, if large button is depressed and sensed for more than 350 msec, the microprocessor transitions to latch state 422 (transition 420).

In large button sensing state 412, if large button and small button are both pressed more than 10 sec, the microprocessor transitions to adjust open time setting state 434 (transition 432), then continues via path 436 to sleep state 440. If the large button is pressed for more than 30 sec, then the microprocessor transitions to sleep state 440 (transition 421); this is used during shipping to preserve battery power. In this state, each wake-up only scans the large button to determine if shipping/storage strip 155 is still in place for shipping and storage purposes.

In large button sensing state 412, if no large button is pressed, or large button is pressed from last manual active, or reaches max continual manual active, or battery charge is less than 4.0V, or the delay is not over 5 sec from last active, then the microprocessor transitions from large button sensing state 412 via a transition 448 to IR sensing state 450. If in IR sensing state 450 a target is found, the microprocessor transitions to IR sensing state 456 (transition 454), and if in IR sensing state 456 a valid target is found, the microprocessor transitions to standby arm delay state 460 (transition 458). From state 450 or state 456, if no target is found, the microprocessor transitions to sleep state 440.

In standby arm delay state 460, if the microprocessor does not reach target active time, than it transitions to sleep state 440. Alternatively, if the target moves in more than 8 sec or 12 sec after manual active, then microprocessor transitions to standby off delay state 464 (transition 462). The standby off delay state 464 leads to the automatic flush activation. The microprocessor initiates automatic flush actuation, that is, initiates actuator latch 422, if the target moves out for 2 seconds in a bathroom stall or moves out for 1 sec in the urinal mode. If the target is still in, or didn't reach off time, or the battery voltage is below 4 V or over max low battery, then the microprocessor transitions to sleep state 440 (transition 466).

The microprocessor remains in latch state 422 for 7.5 msec. From latch state 422, the microprocessor transitions to charge state 404 (transition 426) and then to standby open delay state 468 (transition 407) and then to unlatch state upon reaching the open valve timer. The microprocessor remains in unlatch state 472 unlatching for 7.5 msec. The microprocessor transitions then to charge state 404 (transition 474) and then to standby open delay state 468 (transition 407) and then to sleep state 440 via transition 469. This way the capacitor remains fully charged. Then, again the microprocessor periodically wakes up from sleep state 440 and transitions to battery check state 402 via time base wakeup transition 442. Capacitor 322 maintains voltage of at least 6V.

Depending on the embodiment, the flusher includes one or several photovoltaic cells for producing voltage that is proportional to the amount of light that it receives. When system 30 or 30A powers up and starts operation the system this voltage and continuously monitors the voltage thereafter. At first time power up, if there is no voltage from the photovoltaic cell, this means dark environment and therefore the unit marks the time and count for a predetermined amount of time. It the time is long enough, such as hours and days, and there is no target detected within the same period of time then the flusher system is powered up but no body is using the bathroom (i.e., the lights are turned off) and therefore the system goes into a power saving mode. In this mode, the system scans for target at a much slower frequency to conserve battery power. The system may also shut down or slow down other functions such as scanning the override buttons, battery voltage, etc.

If there is no voltage from the photovoltaic cell, but yet the system acquires a valid target then the system indicates an error (that is, the photovoltaic cell is broken or malfunctioning or the connections and/or the circuit that relates to photovoltaic cell is broken.) In such case the system can disable all or some of the functionalities related to the photovoltaic cell. These functionalities are monitoring light or dark conditions of the environment, target shadow detection, power generation, etc.

After the first time power up, the system monitors the photovoltaic cell function normally. In such case the module would monitor the photovoltaic cell voltage continuously (in normal operation mode). In cases, where the output voltage is sufficient, the system uses the corresponding energy for flushing, or stores the in a rechargeable device for later use. The rechargeable device may be a capacitor or a rechargeable cell/battery. If the photovoltaic cell voltage does not provide sufficient power for operation, there may be a condition where the target is casting shadow on the photovoltaic cell. In such case, the system uses the low voltage information as a supplement to the target detection algorithm, whereby prior to the condition the flusher may be in slow operation mode. In this mode of operation, the system conserves energy. Each target is detected using the detection algorithms (for the active or passive sensor) and the photovoltaic information provides a supplemental data.

If the system detects valid targets using the active or passive sensor algorithm, and yet the photovoltaic cell voltage is low or zero over several detection cycles, an error condition is indicated. In such case, the system deems the photovoltaic cell broken and ignores functionalities related to the photovoltaic cell, using just the battery power.

FIGS. 19, 19A, 19B, 19C, 19D, 19E and 19F show the overall algorithm executed by the controller. The algorithms are downloaded to the microprocessor. Alternatively, the microprocessor functionality could be implemented in the form of dedicated logic circuitry.

The microprocessor executes a main algorithm 500 repeatedly. Periodically the microprocessor wakes up (step 502). In step 506, if the power is on RAM is cleared and initialization is performed (step 508). If the power is off, and the microprocessor is externally reset (step 510), the system performs initialization, sets time-base interrupt rate according to current flag, and sets the interrupt rate according to current situation (520). Then, all interrupts are enabled (step 526). If there is un-use interrupt re-power up (step 512), emergency initialization is performed, including reset of unused interrupt and re-power-up flag (step 522). Alternatively, if there is an A/D error re-powerup (step 514), then the microprocessor performs emergency initialization reset ND error re-powerup flag (step 524). Alternatively, if microprocessor is running out re-powerup (step 516), then the microprocessor executes emergency initialization reset running out re-powerup flag (step 526). Then, all interrupts are enabled (step 528).

Figure 19:
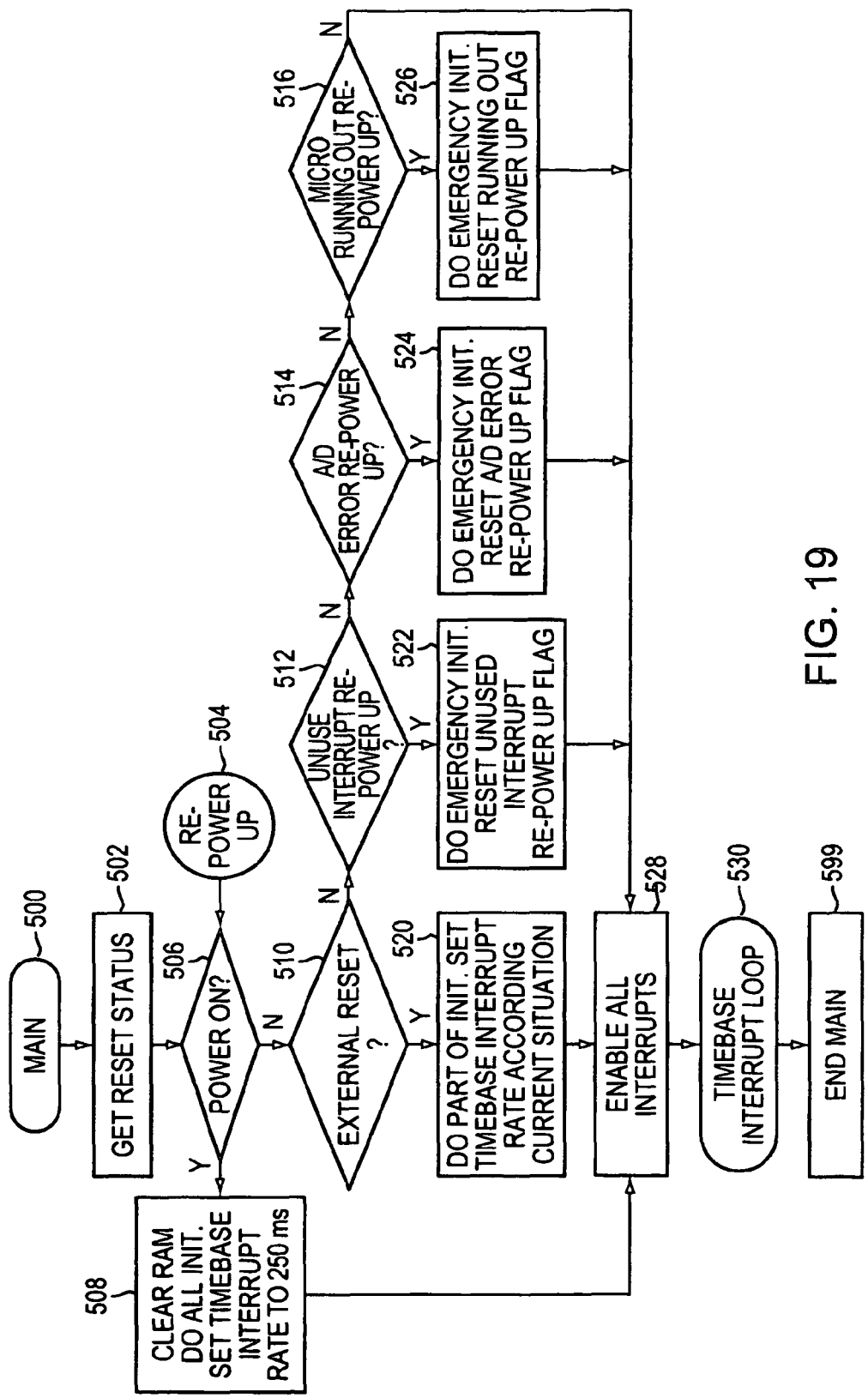
FIGS. 19, 19A, 19B, 19C, 19D, 19E and 19F show the overall algorithm executed by a microcontroller.
Figure 19A:
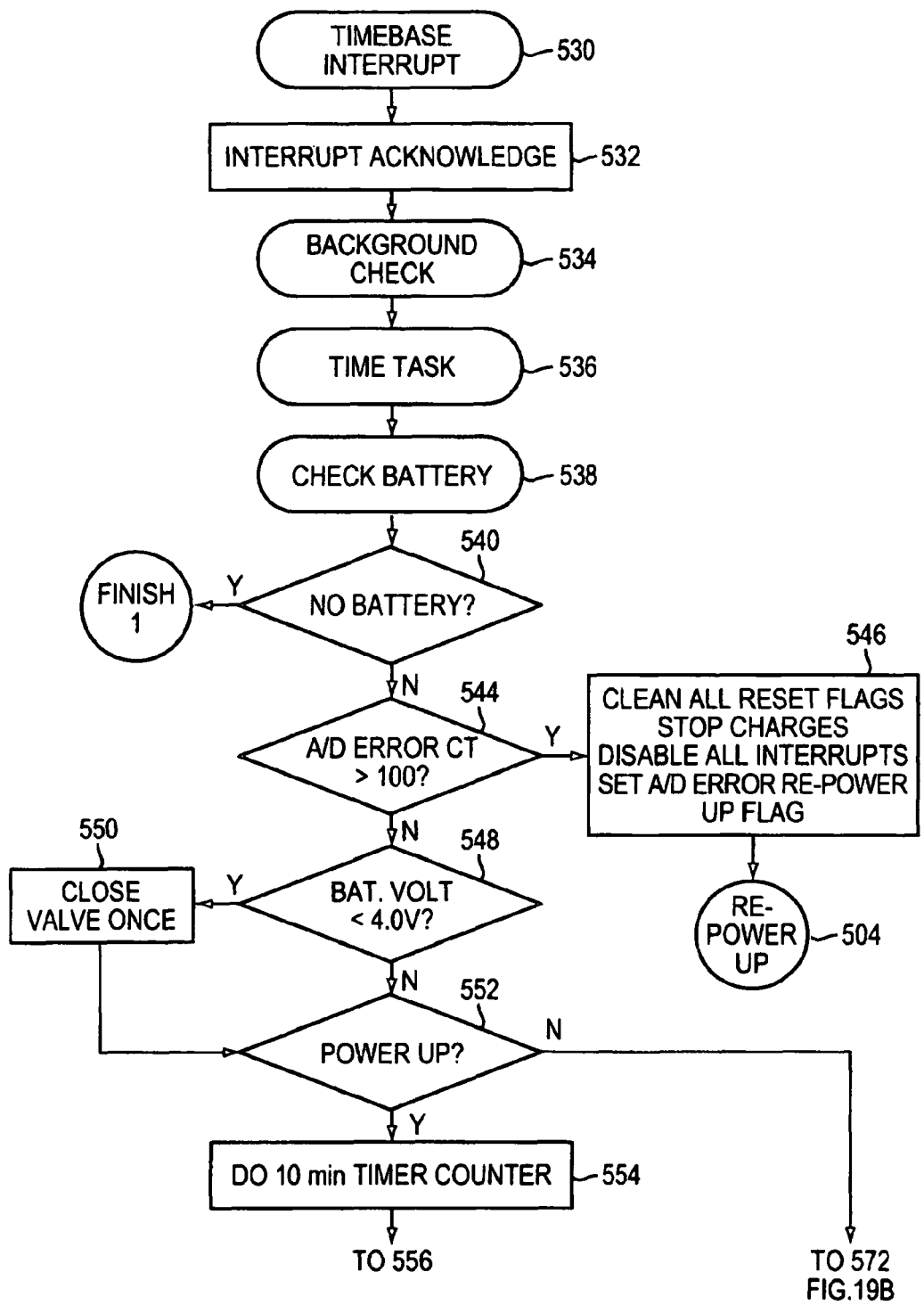
Figure 19B:
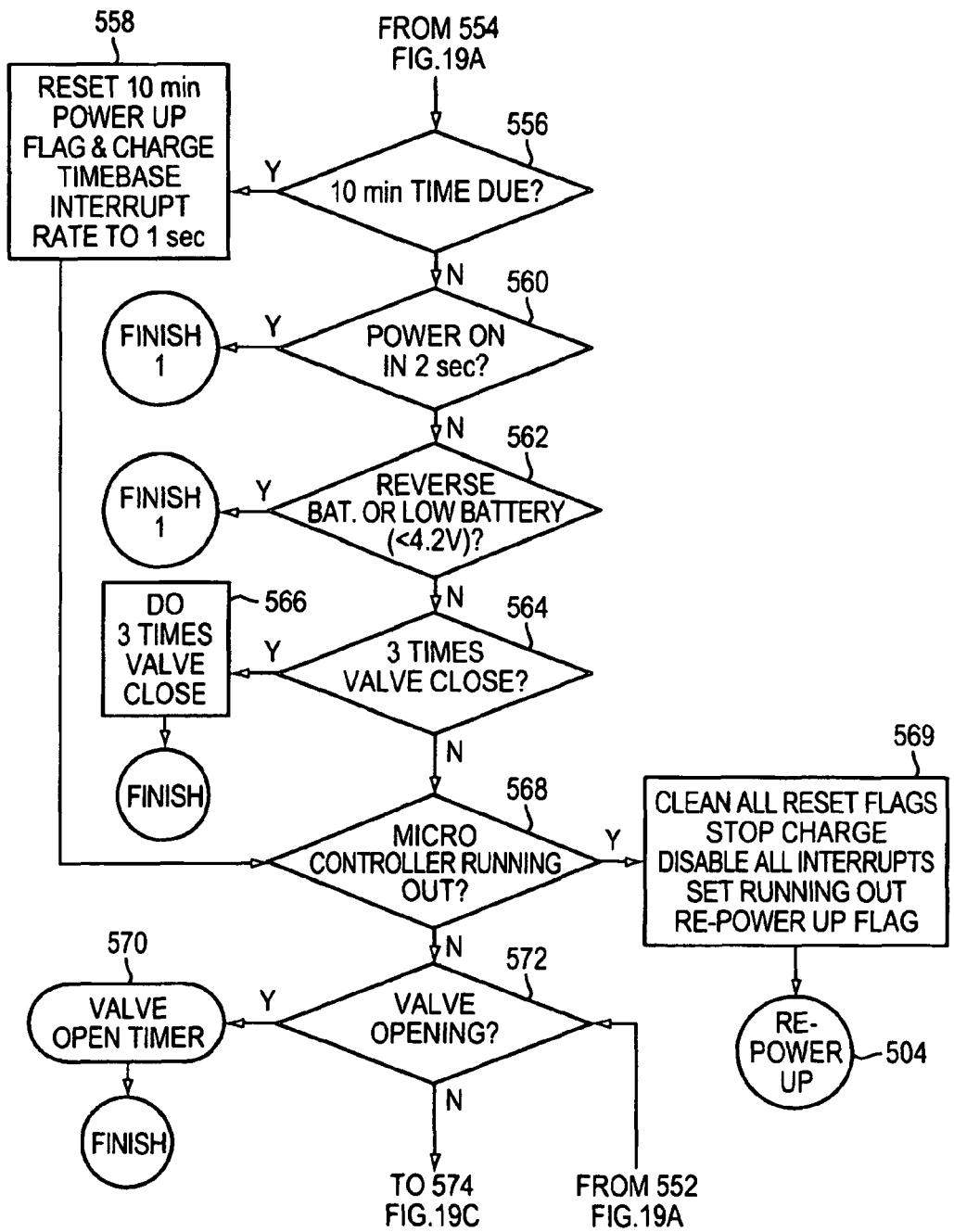

Referring the FIG. 19A, the microcontroller executes a time base interrupt loop 530. Time base interrupt subroutine 530 includes a background clock subroutine 534 (shown in FIG. 20), a time task subroutine 536 (shown in FIG. 21), and a check battery subroutine 538 (shown in FIG. 22). In step 540, if no sufficient battery power is detected, the algorithm terminates. Alternatively, if ND error count is larger than 100 (step 544). Then the microcontroller clears and resets all flags, stop charges, disables all interrupts, sets an A/D error re-powerup flag (step 546) and re-powers up (step 504).

In step 544, alternatively, if battery voltage is less than 4.0 V (step 548) then close valve (step 550) and go to step 552. If battery voltage is larger than 4.0 V, and powerup is executed (step 552), then 10 min timer counter is set (step 554). Alternatively, the system goes from step 552 to step 572.

Figure 23:
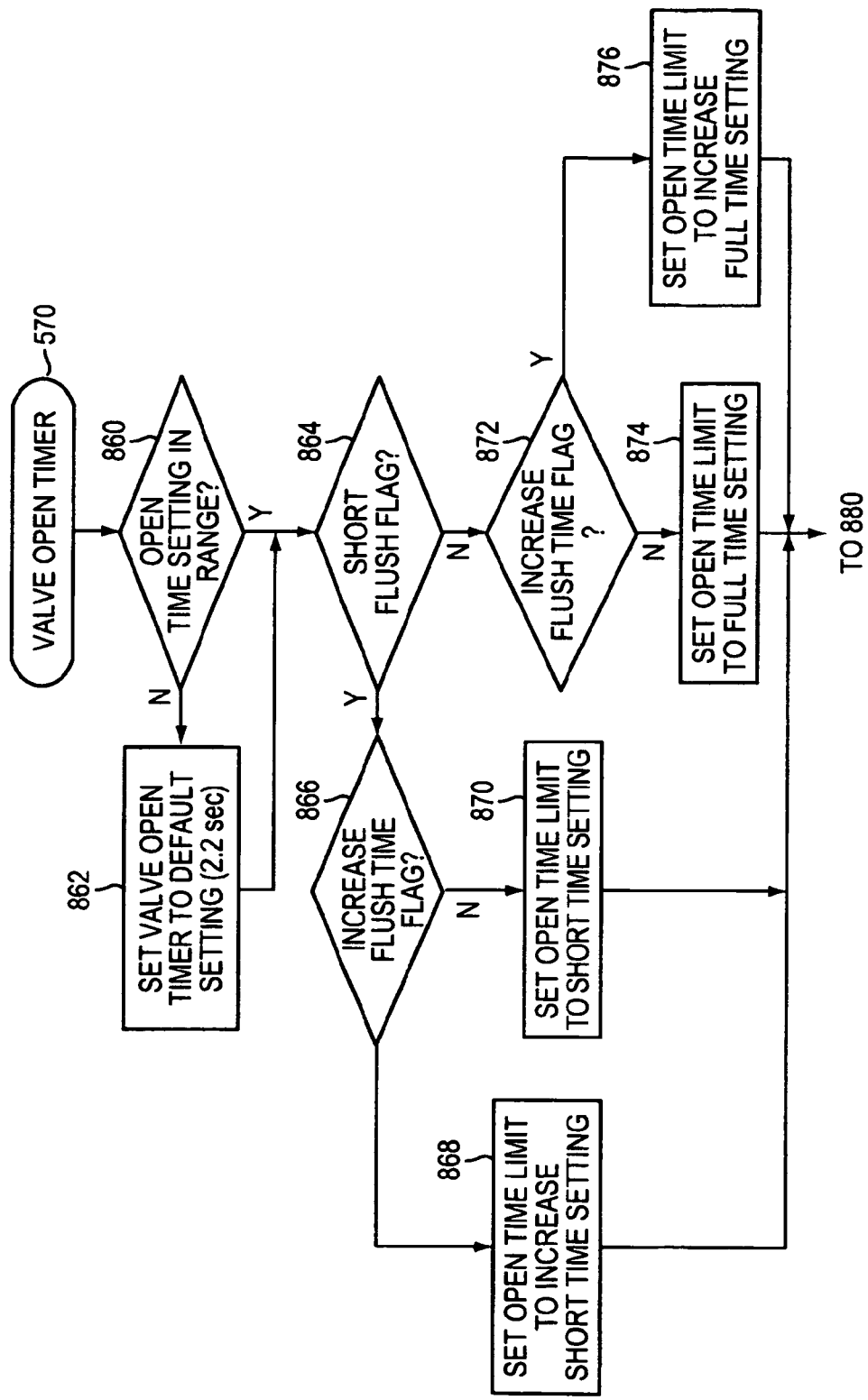
FIGS. 23 and 23A show an open valve timer subroutine for controlling the flushers actuator.
Figure 23A:
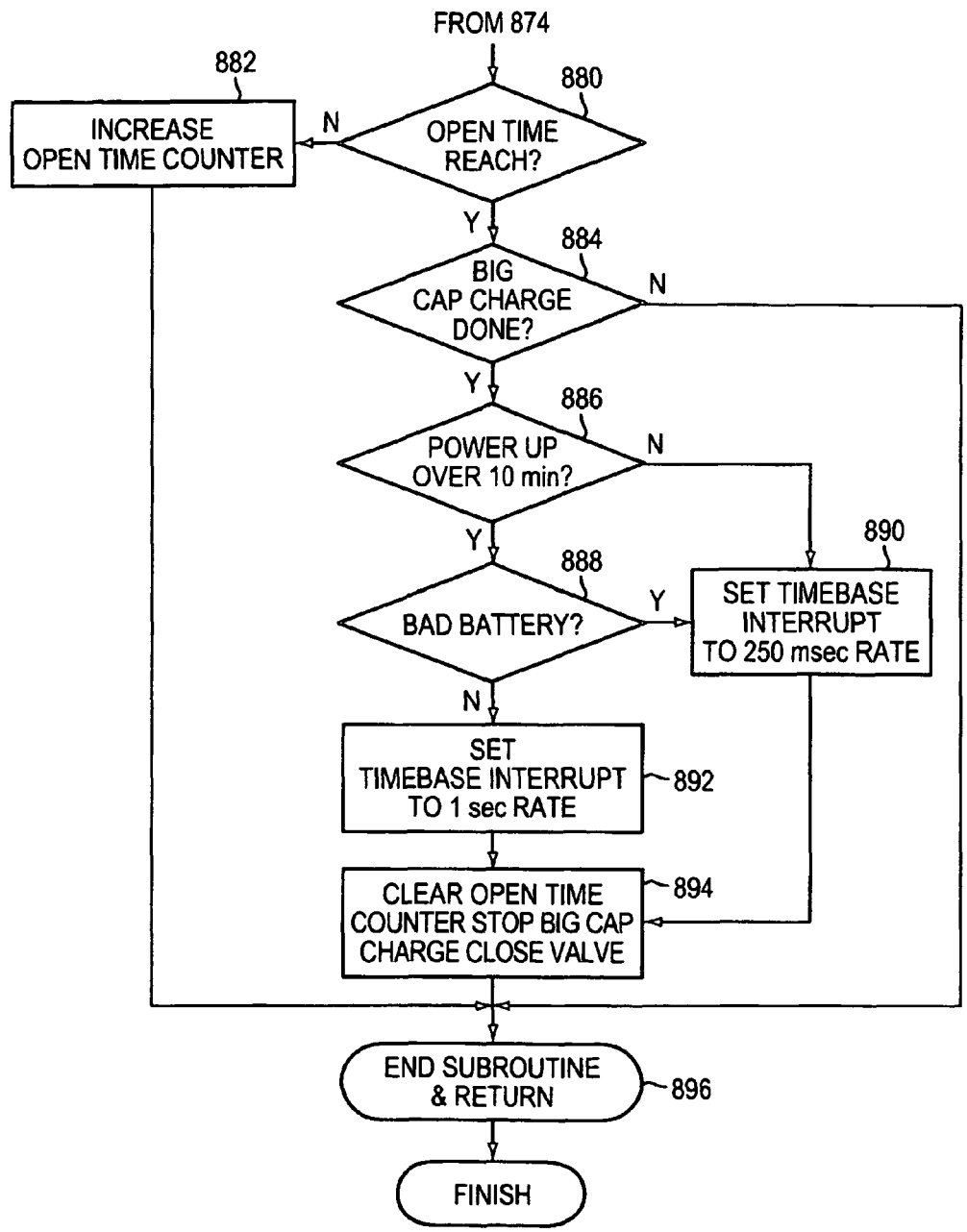

In step 572, the microcontroller decides about valve opening. If the valve opening is to be performed, the microcontroller executes a valve open timer subroutine 570, shown in FIGS. 23 and 23A. This subroutine sets the flush time for a short flush, a long flush, or a cleaning flush providing increased water volume (compared to the long flush).

Figure 19C:
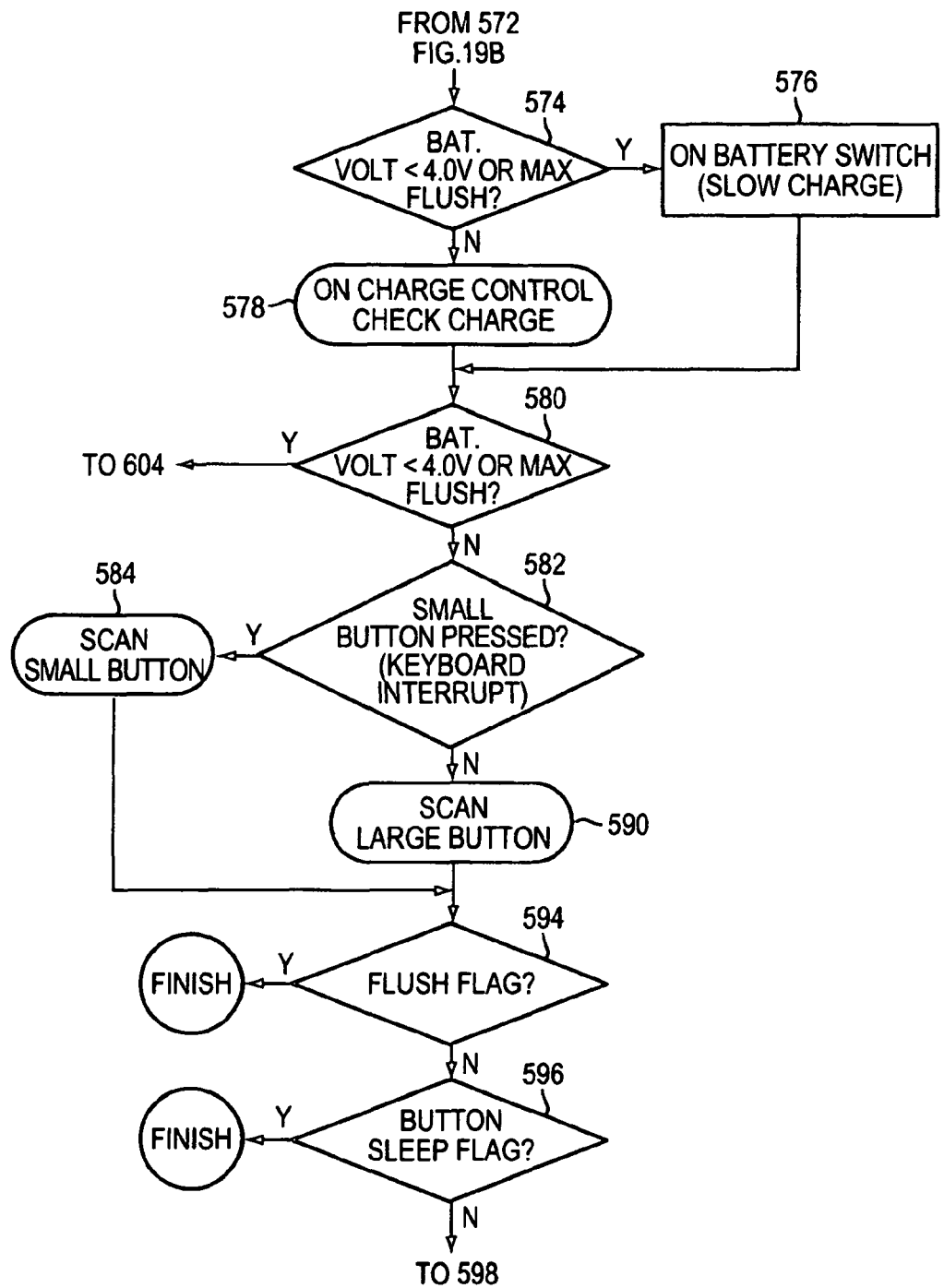
Figure 19D:
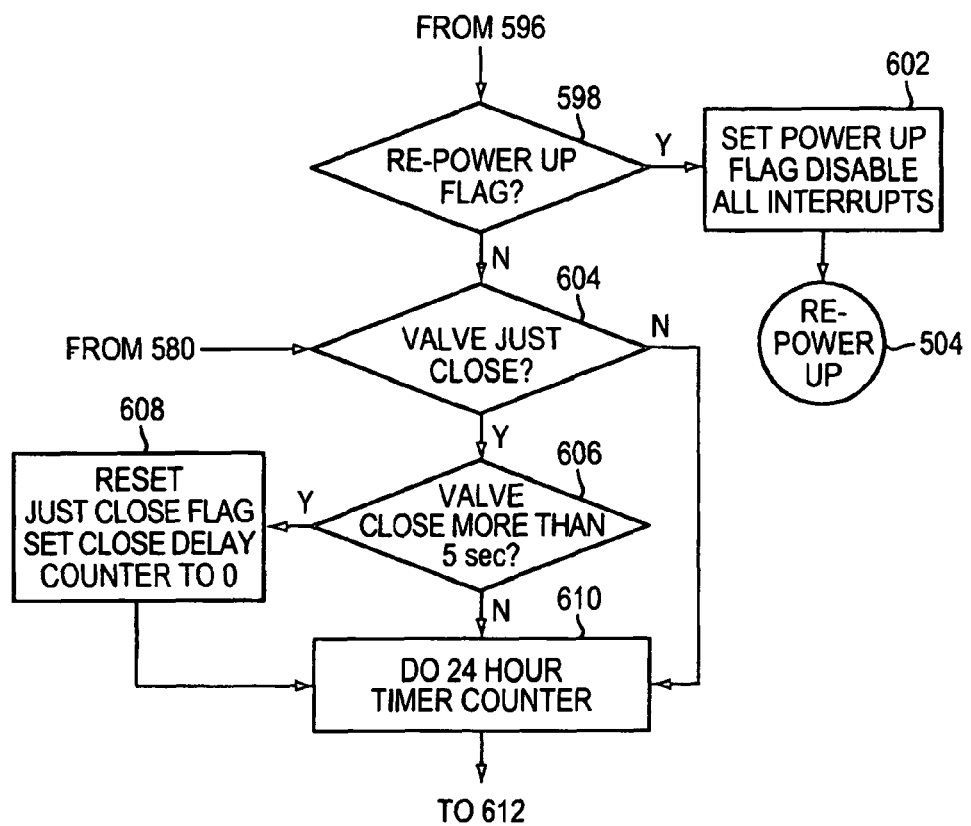
Figure 24A:
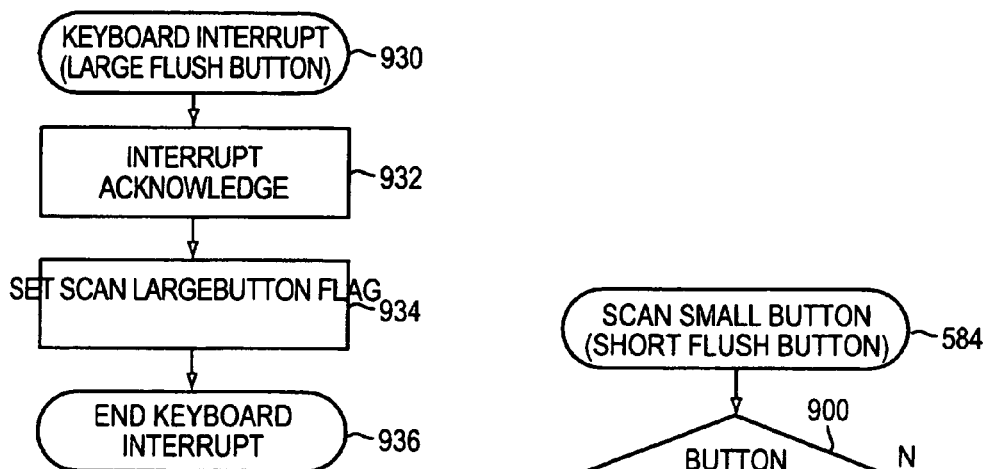
FIG. 24A shown a keyboard interrupt subroutine for interrupting the algorithm.
Figure 24:
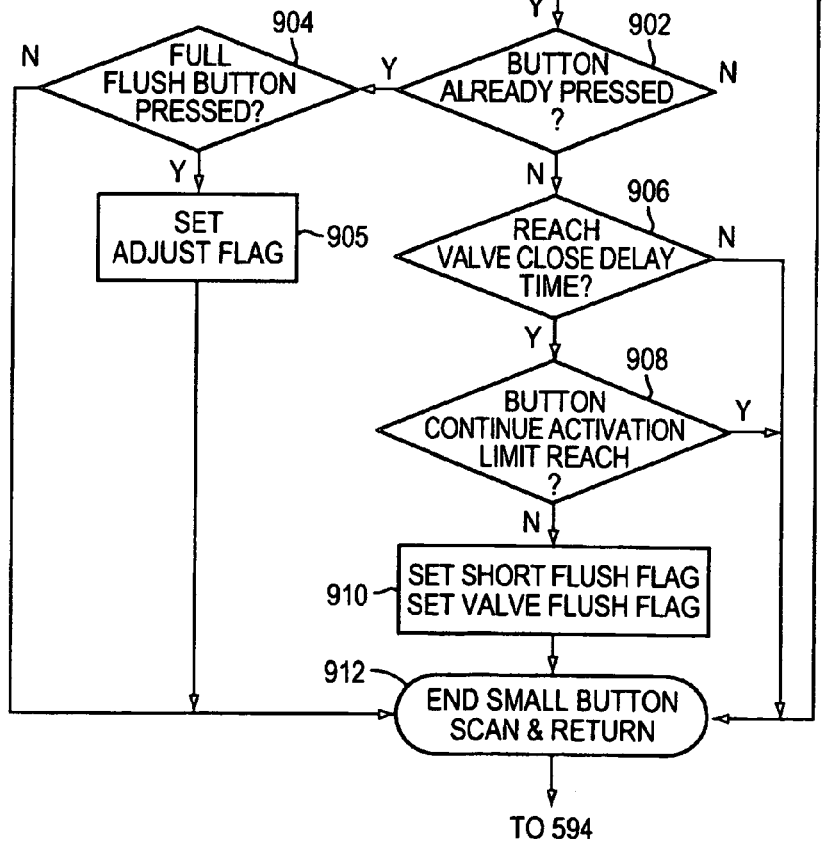
FIG. 24 shows a subroutine for detecting a position of a small button used for a manual water flush having a low volume.
Figure 25:
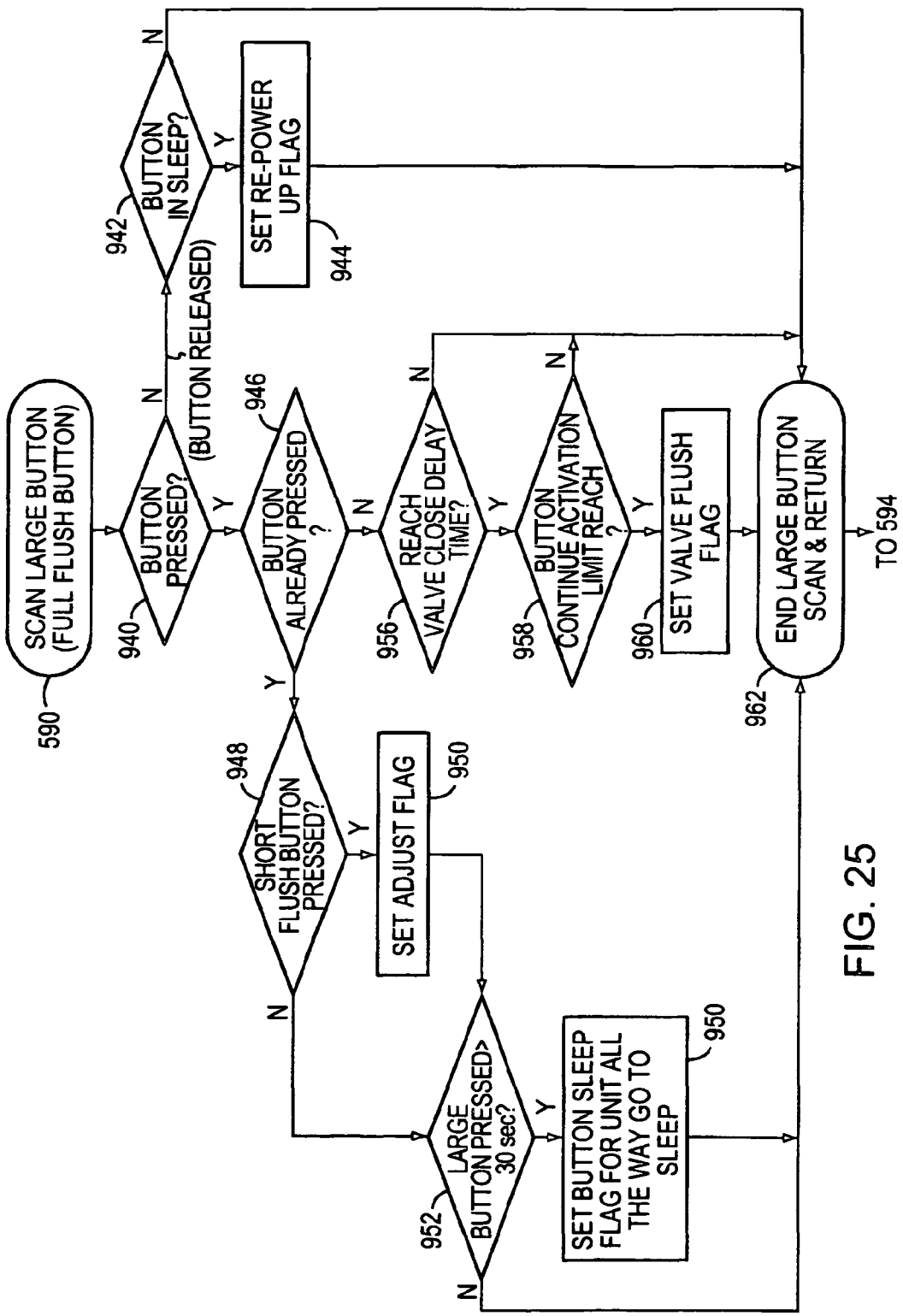
FIG. 25 shows a subroutine for detecting a position of a large button used for a manual water flush having a large volume.
Figure 31:
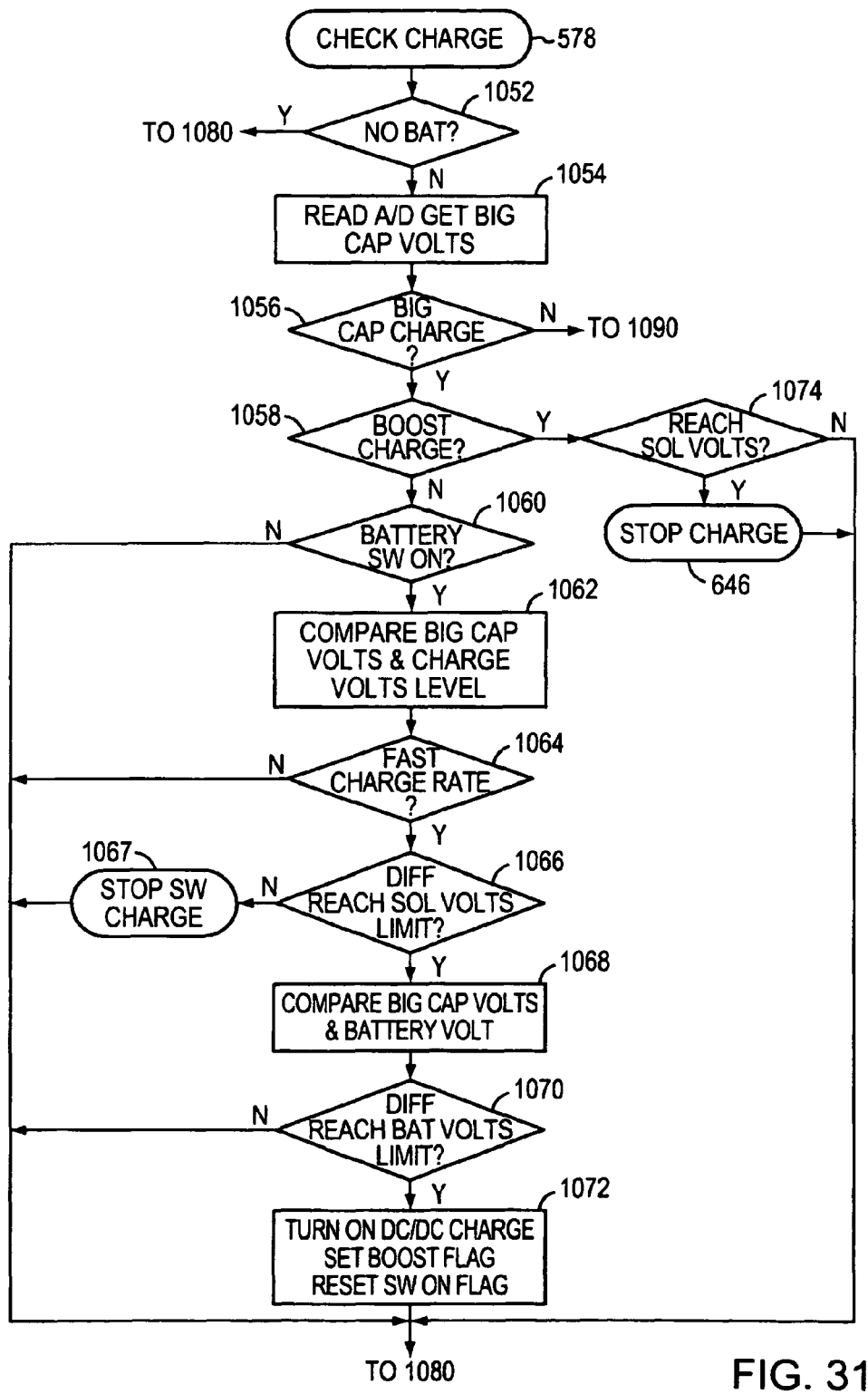
FIGS. 31, 31A and 31B show a subroutine for checking and controlling the capacitor charging process.
Figure 31A:
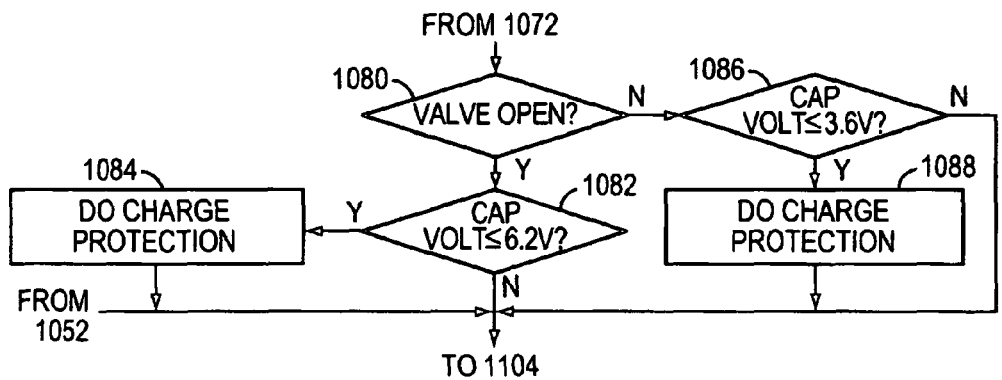
Figure 31B:
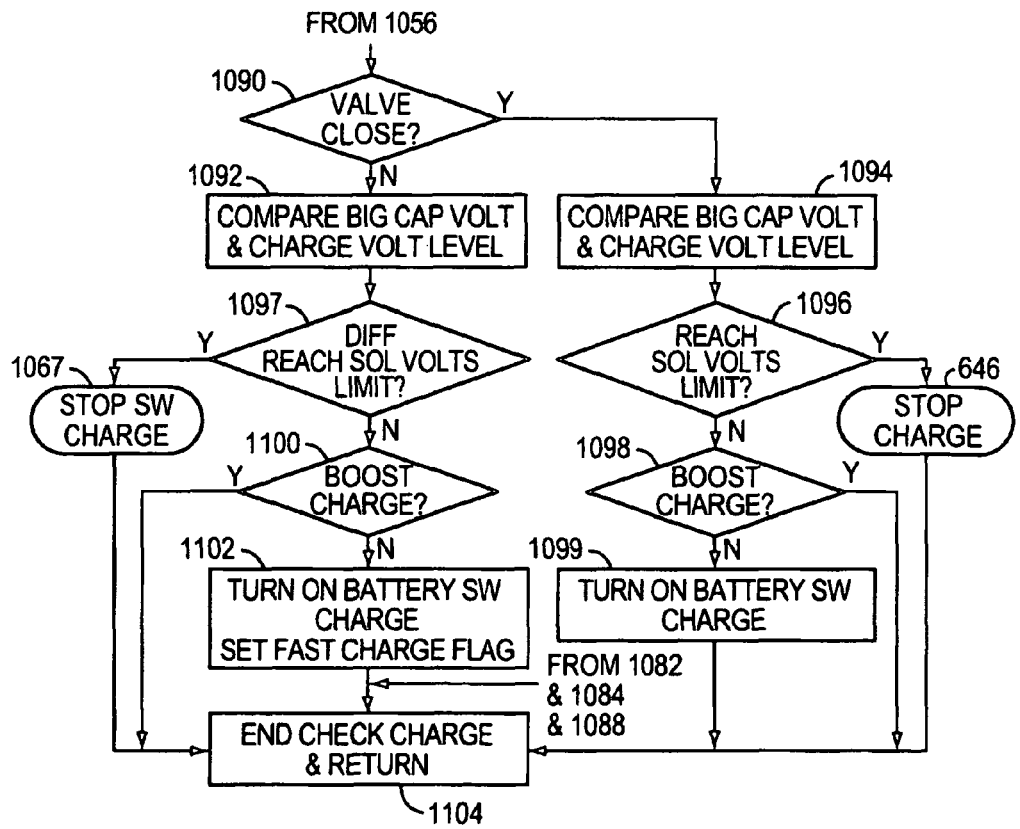

Referring to FIG. 19C, in step 574, if battery voltage is less than 4.0 V or max flush, than perform slow charge (step 576). Alternatively, the microcontroller executes a check charge subroutine 578, shown in FIGS. 31, 31A, and 31B. In step 580, if battery voltage is less than 4.0V, or max flush, then the microcontroller goes to valve close (step 604), which corresponds to the unlatch state 472 in FIG. 18. Alternatively, the microcontroller scans small button (step 582), and if small button pressed to execute scan small button subroutine 584 (shown in FIG. 24), corresponding to state 410. Alternatively, the microcontroller executes a scan large button subroutine 590, shown in FIG. 25.

If scan small button subroutine 584, or a scan large button subroutine 590 detect flush activation (step 594), a flush is executed. This flush has the time duration depending on the button depressed by a user. Alternatively, the sleep flag is checked (step 598) and the system is re-powered (steps 598, 602 and 504). If the valve was just closed (step 604), the microcontroller executes step 606. Pursuant to each latch and unlatch state, capacitor 322 is charged as shown by transitions 426 and 474.

Figure 19E:
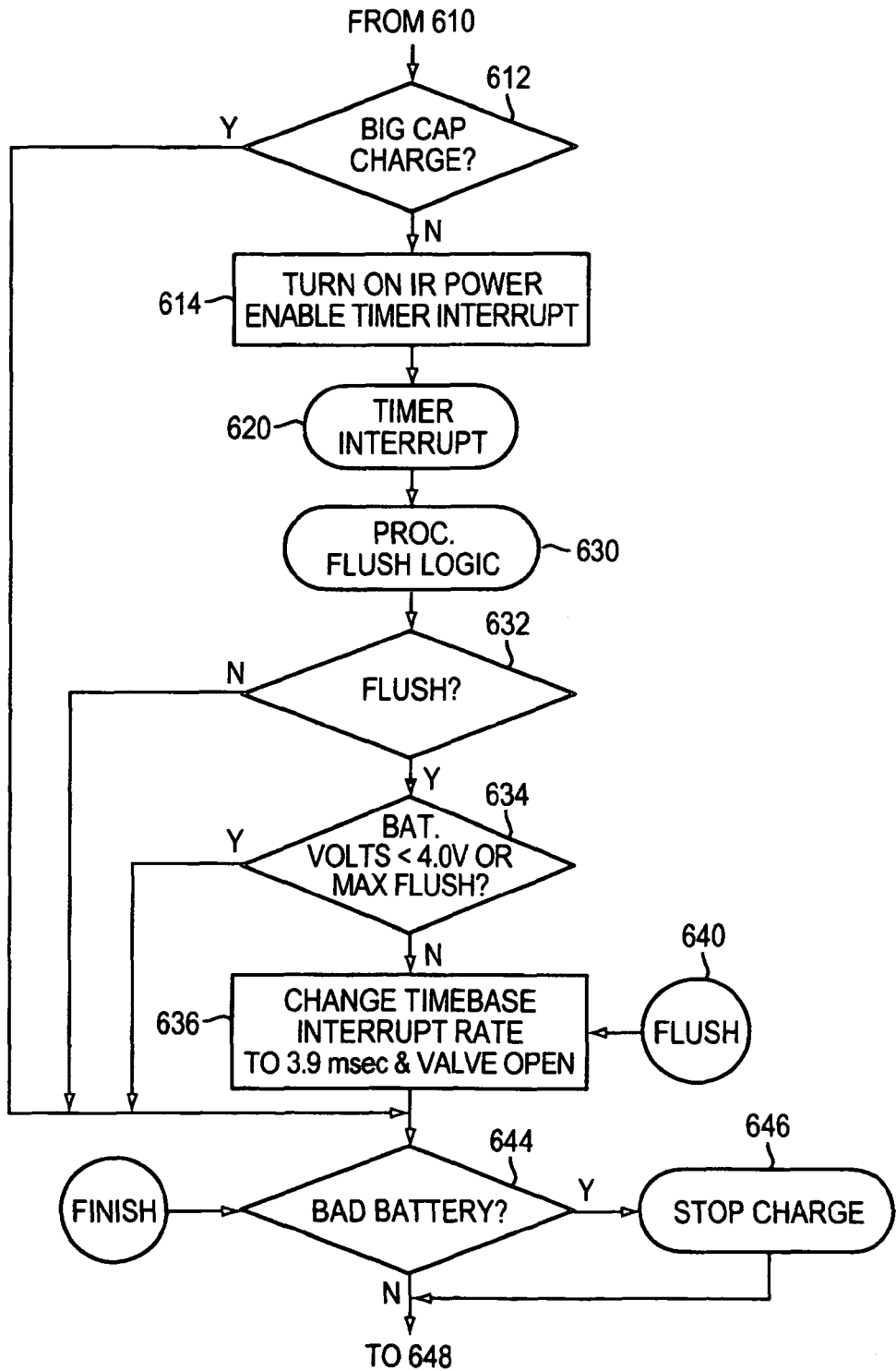
Figure 26A:
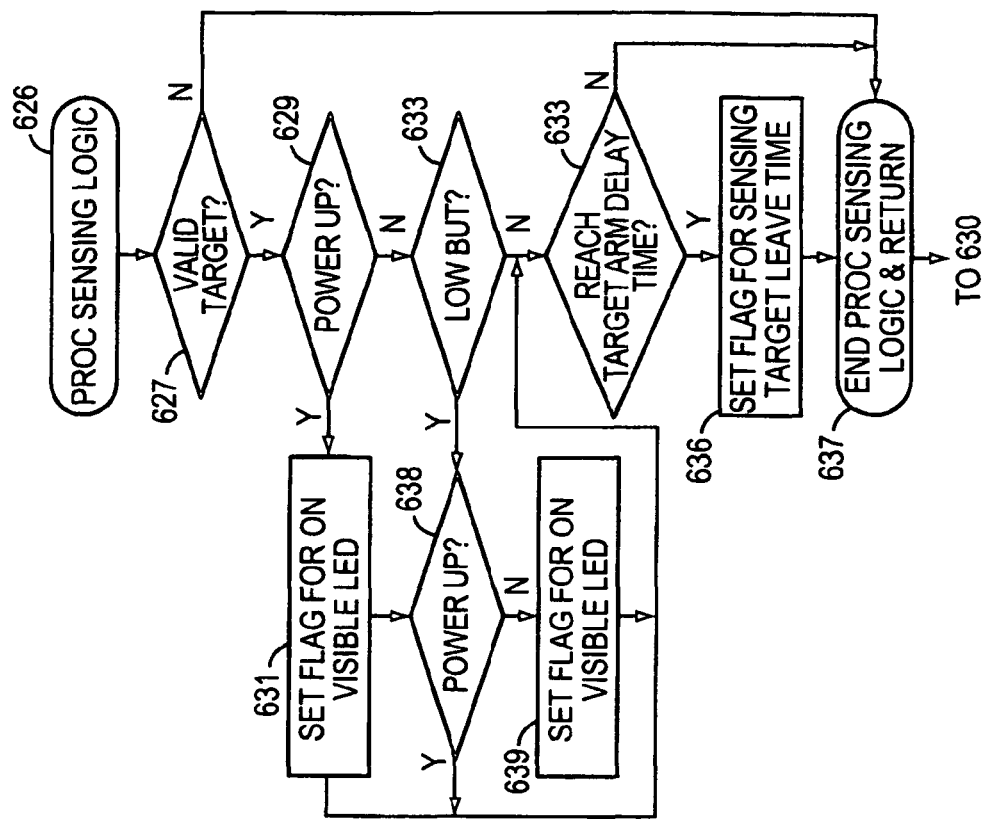
FIG. 26A shows a proc sensing logic subroutine that is included in the timer interrupt subroutine shown in FIG. 26.
Figure 26:
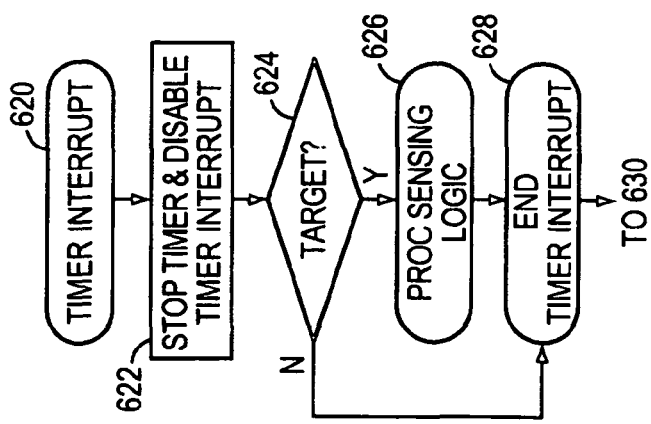
FIG. 26 shows a timer interrupt subroutine, which includes IR target detection.

Referring to FIG. 19E, pursuant to step 612, if no capacitor charge is performed (i.e., no flush due to button activation), the microcontroller activates IR power (step 614) and executes a timer interrupt subroutine 620, shown in FIG. 26.

Referring to FIGS. 26 and 26A, the microcontroller executes a timer interrupt subroutine 620. It stops and disables timer interrupts (step 622) and performs IR target detection, as shown by states 450 and 456 in FIG. 18. If a valid target is detected, the microcontroller executes a process sensing logic subroutine 626, as shown in FIG. 26A.

Figure 19F:
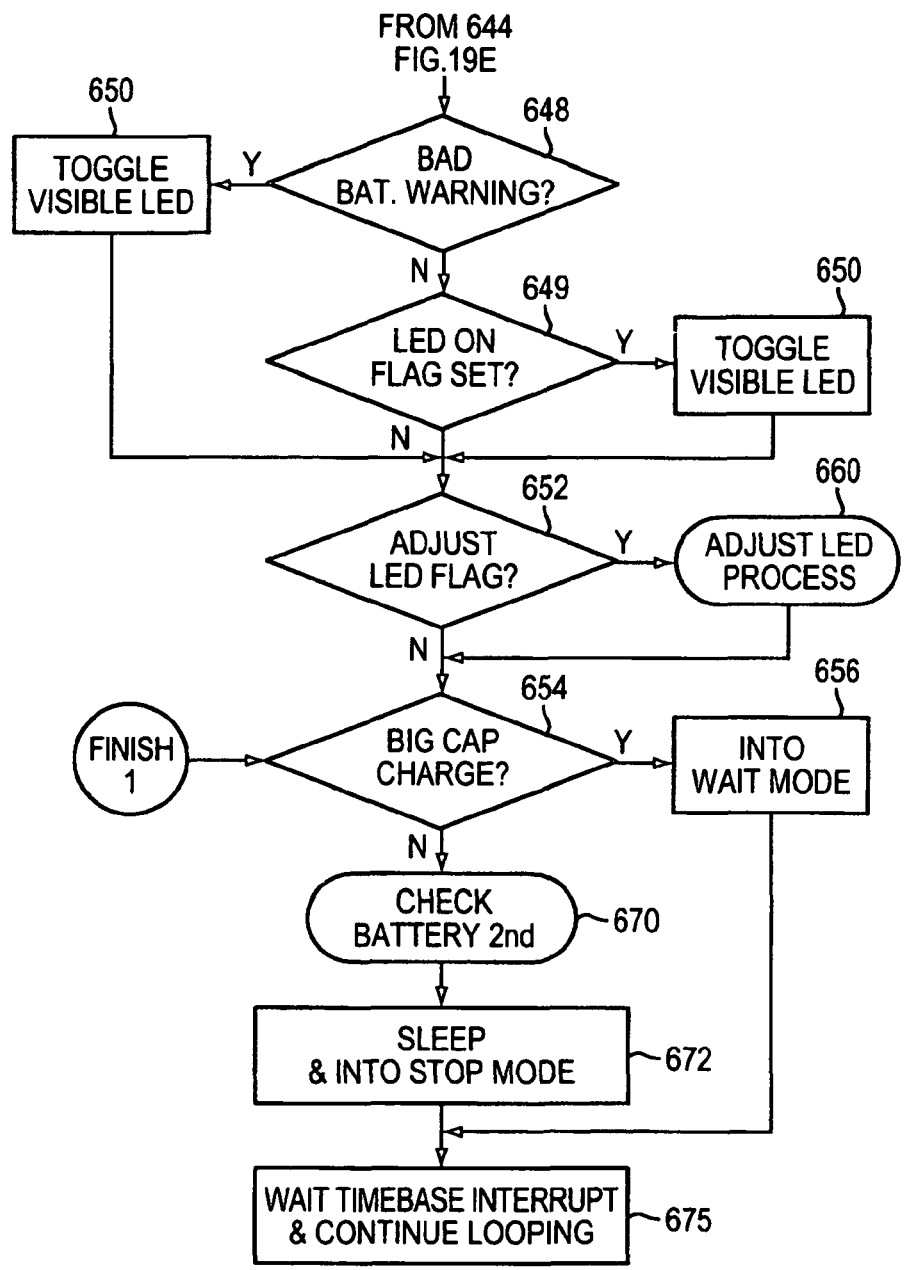
Figure 21:
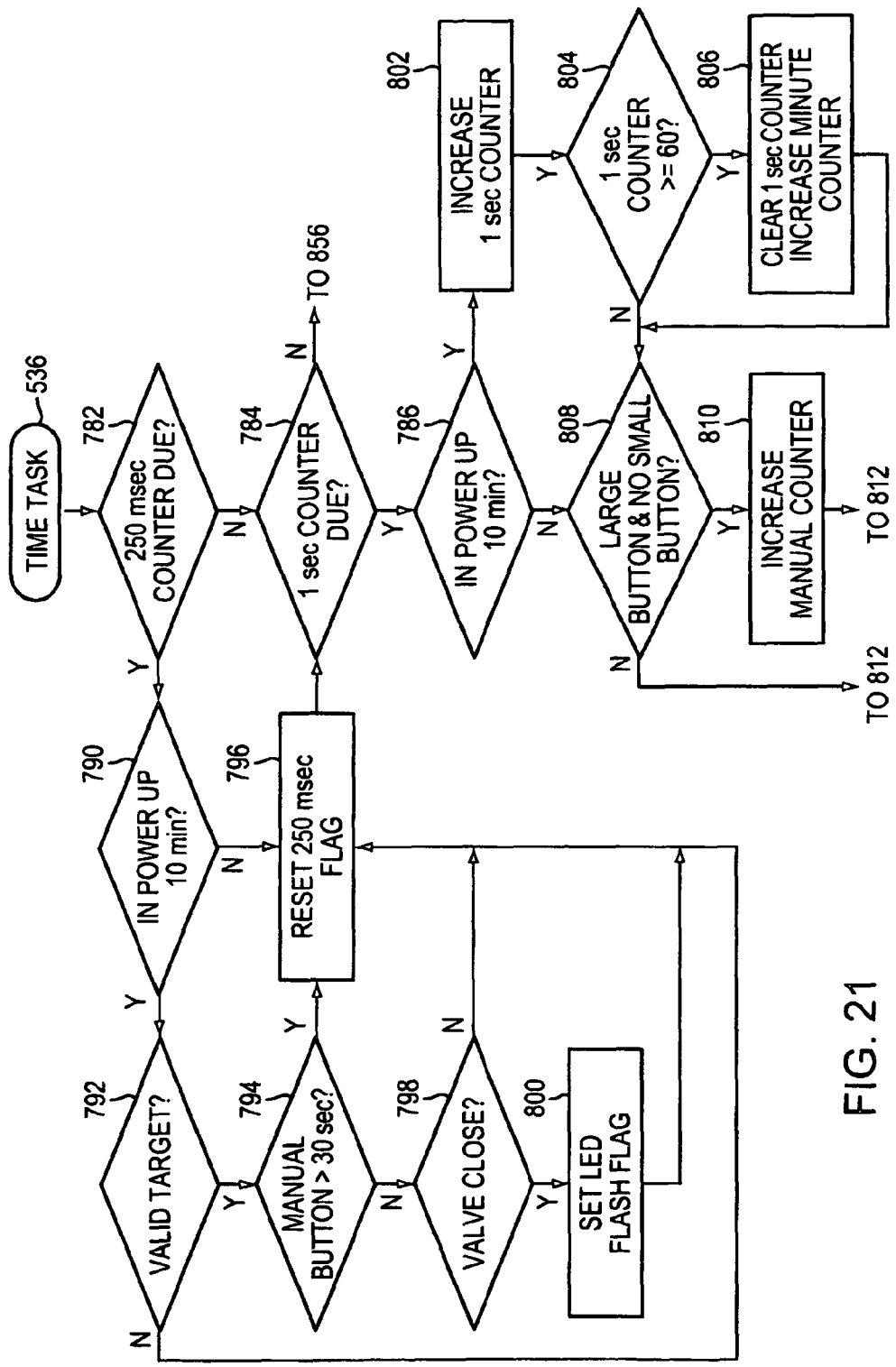
FIGS. 21, 21A and 21B show an internal timing tracking subroutine that manages time-sharing for the microcontroller.
Figures 22, 22A:
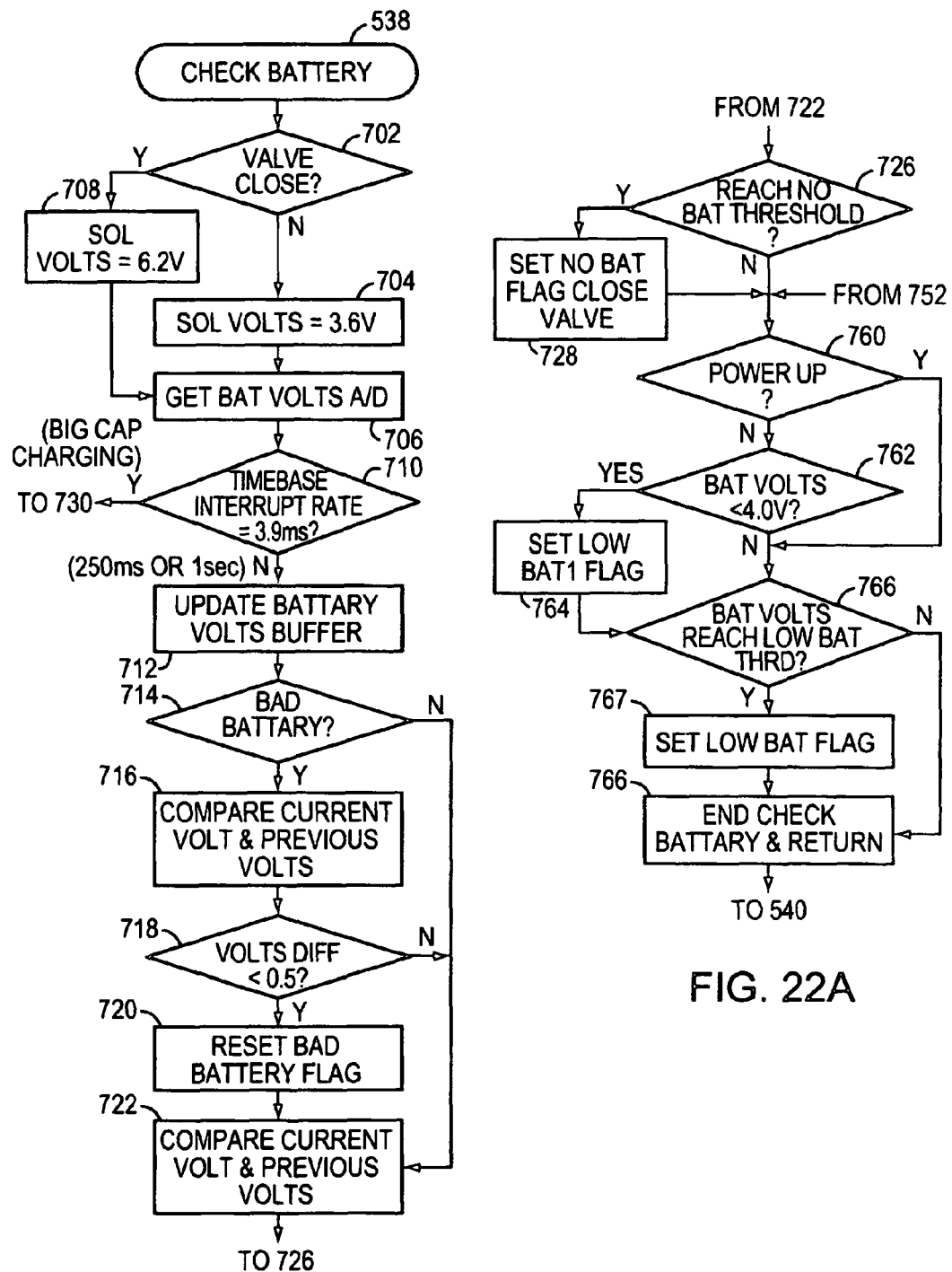
FIGS. 22, 22A and 22B show a battery power management subroutine for monitoring a battery voltage.
Figure 22B:
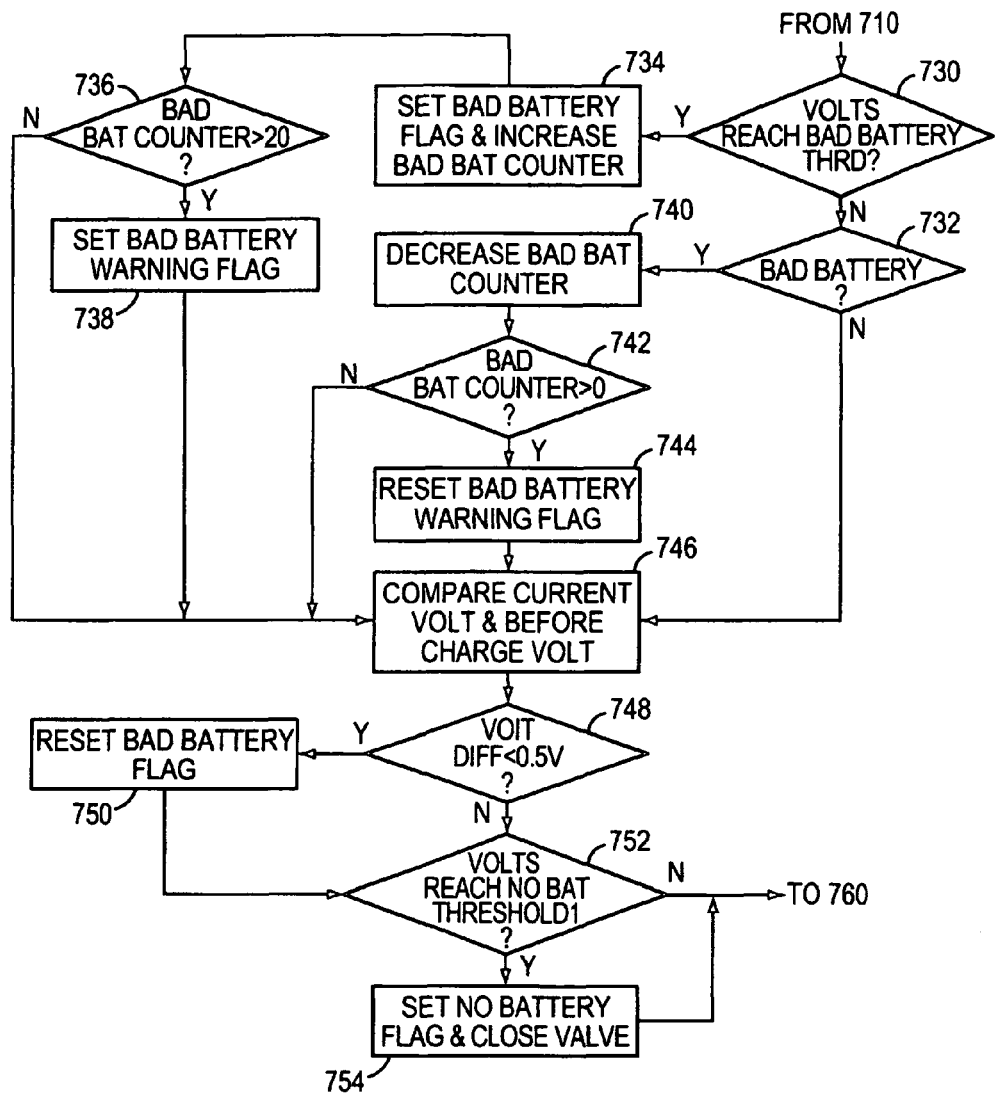
Figure 27:
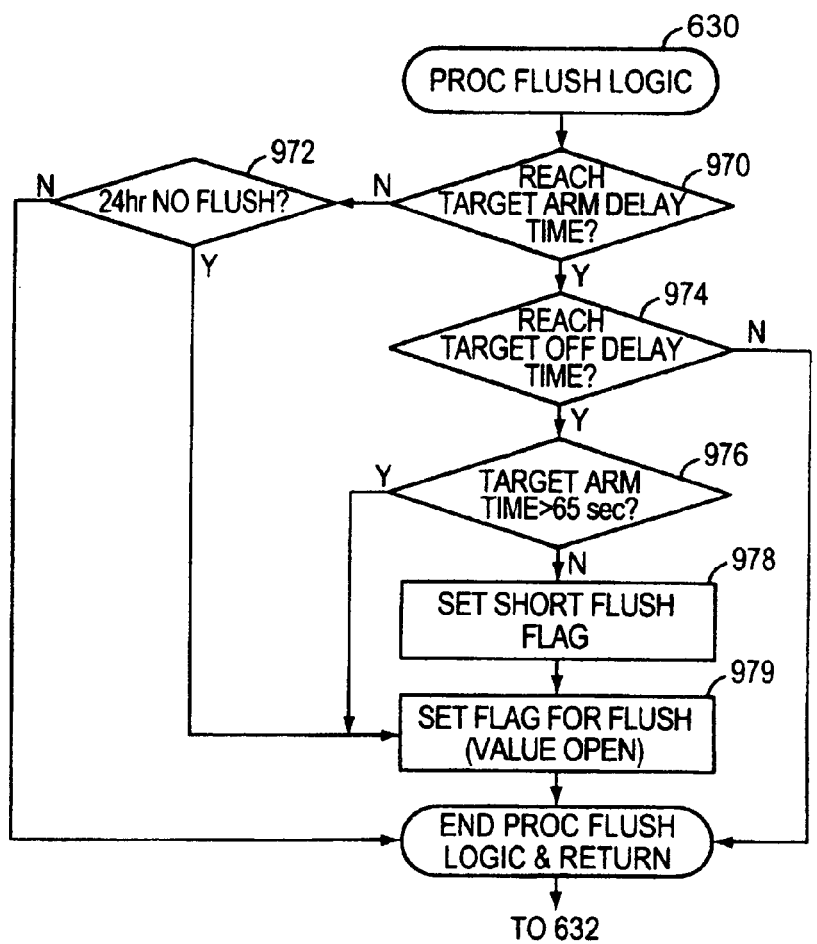
FIG. 27 shows a proc flush logic subroutine used for automatically flushing after IR detection of a target.
Figure 28:
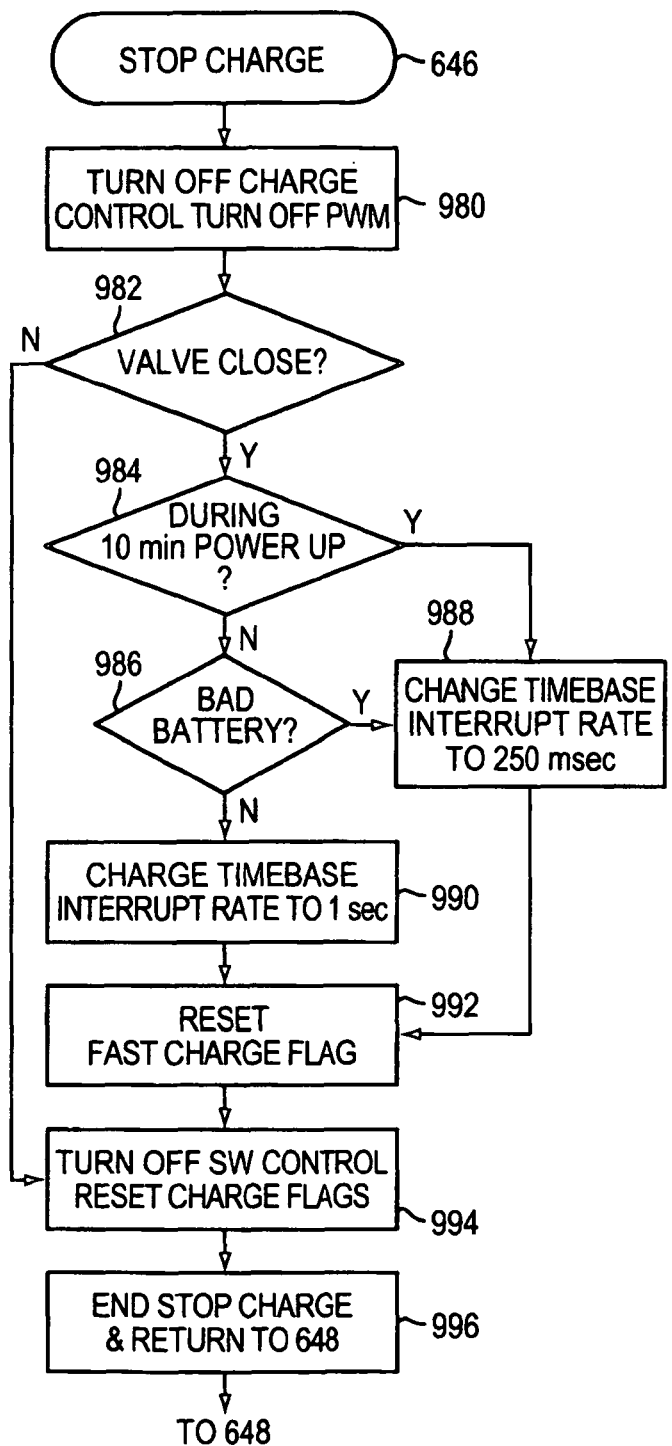
FIG. 28 shows a stop charge subroutine used for controlling a capacitor charging process.
Figure 29:
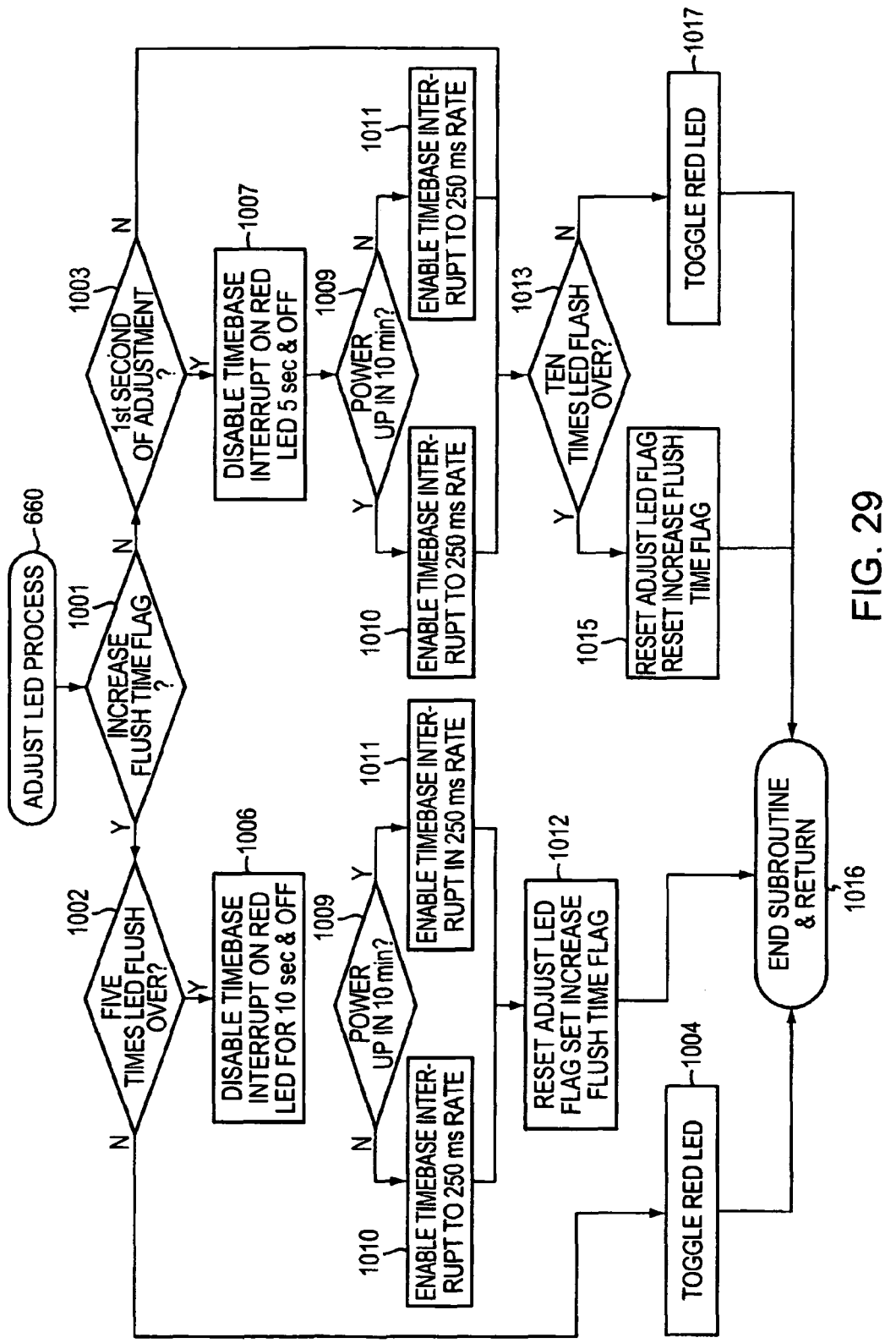
FIG. 29 shows an adjust LED subroutine.
Figure 30:
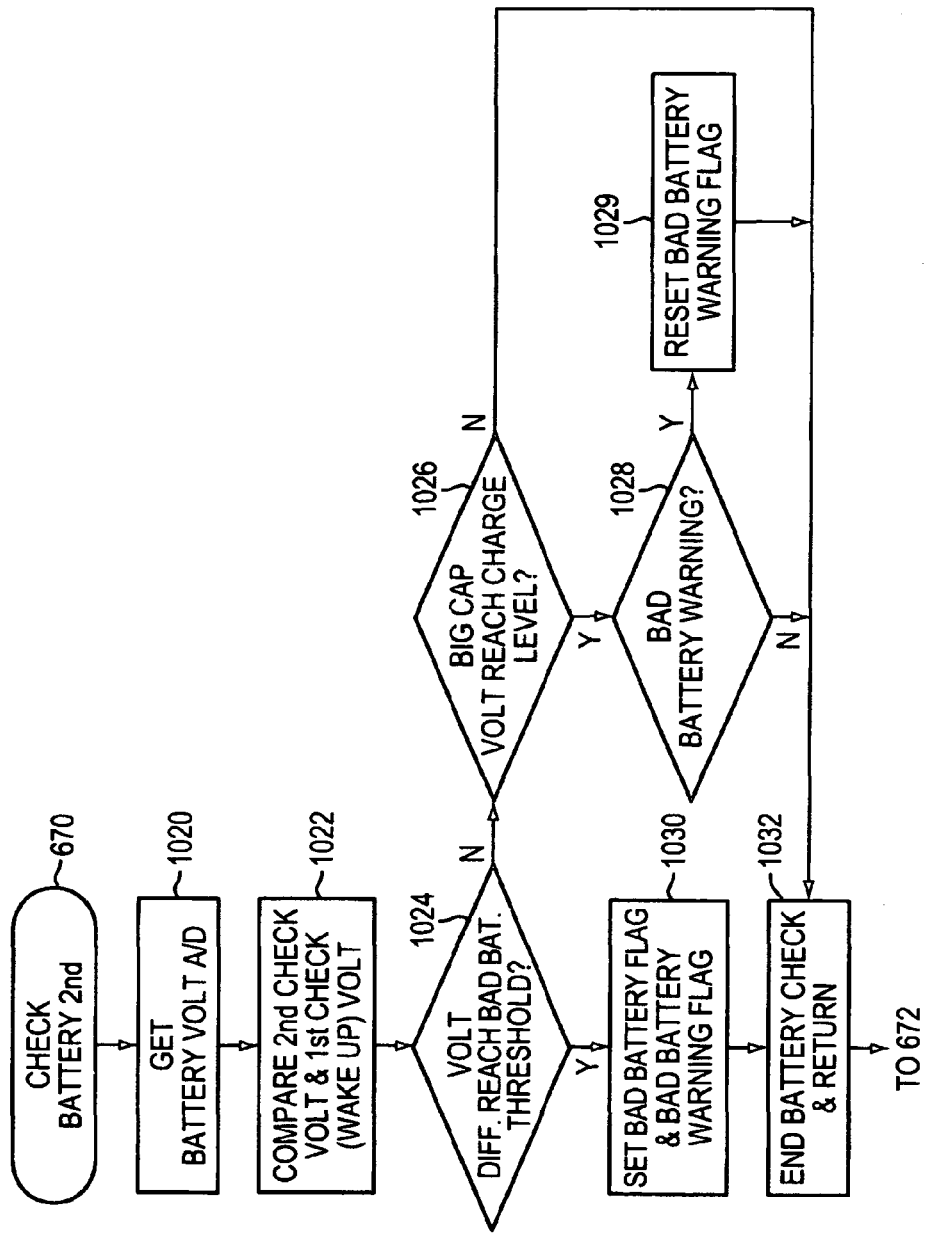
FIG. 30 shows a battery power management subroutine for monitoring battery voltage.

Referring to FIGS. 13E and 21, next, the microcontroller executes a process flush logic subroutine 630, shown in FIG. 27, and depicted by states 460 and 464 in FIG. 18. Prior to each flush, the time base interrupt rate is changed to 3.9 msec for a fasted response (step 636). Pursuant to each latch, a boost capacitor charge is executed. In step 644, if the battery is bad, the microcontroller executes a stop charge subroutine 646, shown in FIG. 28. Next, LED indication is provided to a user by executing an adjust LED process subroutine 660, shown in FIG. 29. Referring to FIG. 19F, in step 654, if the capacitor is being charged, the microcontroller enters into a wait mode (step 656). Alternatively, the microcontroller executes a check battery subroutine 670, shown in FIG. 30. The entire time base interrupt cycle is executed again.

Figure 20:
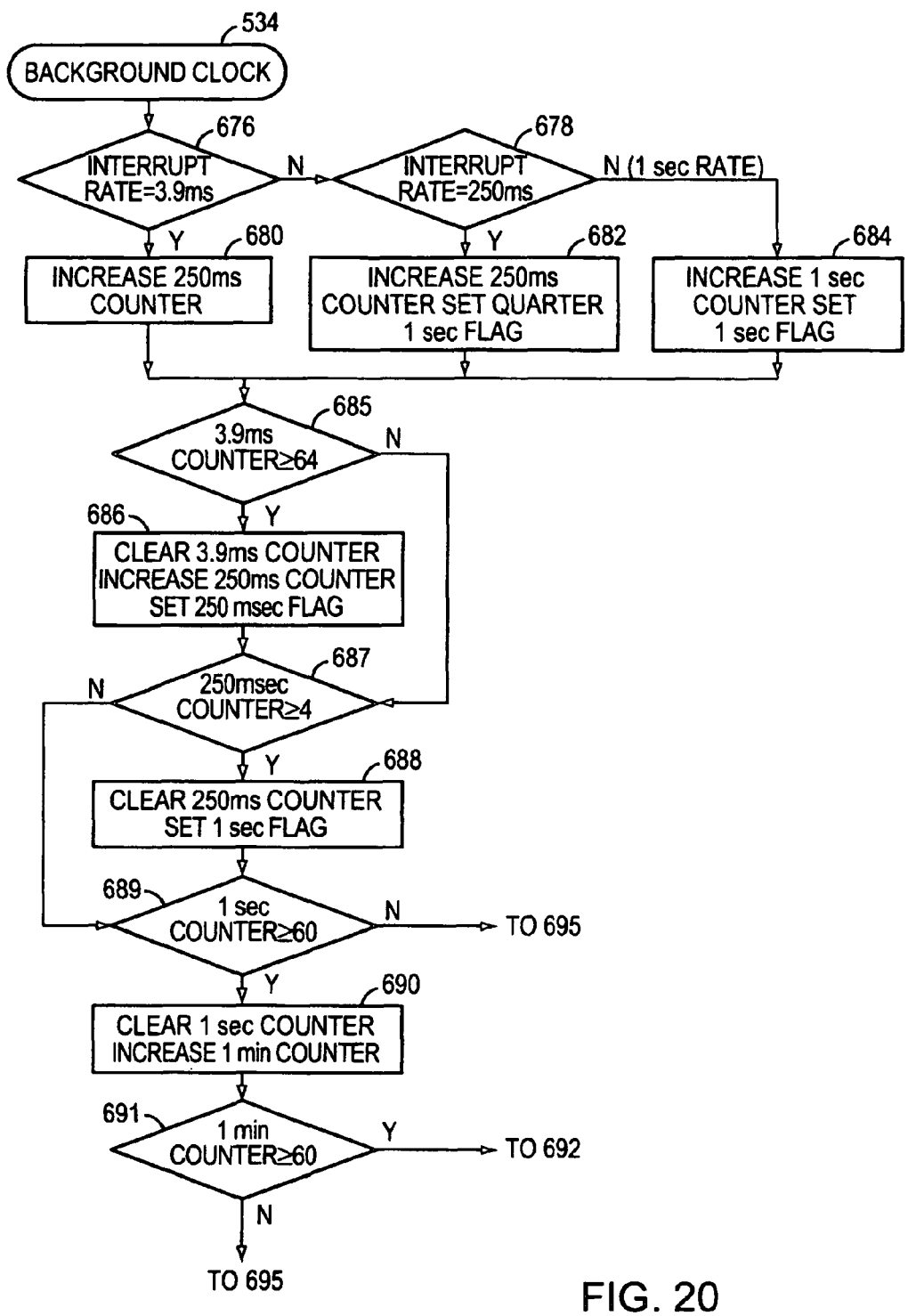
FIGS. 20 and 20A show the microcontroller timing control including individual counters used.
Figure 20A:
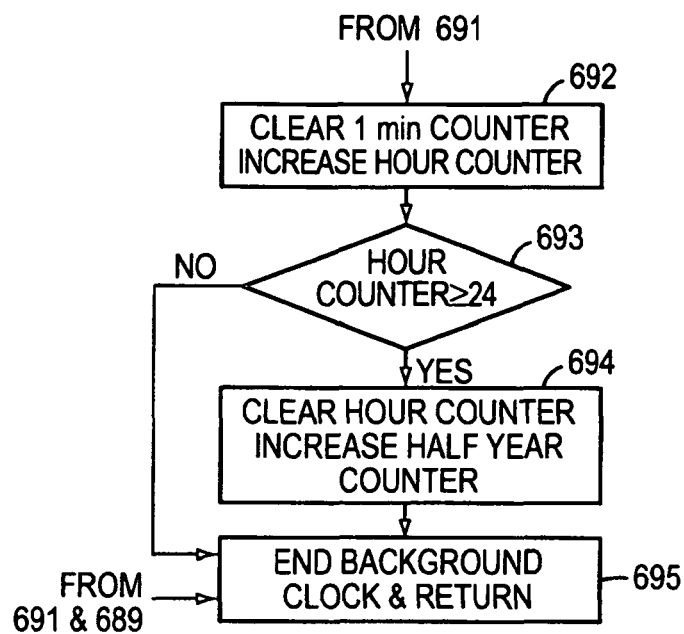

FIGS. 20 and 20A show an internal software clock for the microcontroller timing control. In the background clock algorithm, the 3.9 msec counter is used for timing the big capacitor charging period to count solenoid latch and unlatch interval, otherwise the 250 msec counter is use or the interrupt rate. The 1 sec counter is used for user timing tracking. The microcontroller power management this way optimizes the power usage. The 1-minute counter, the 1-hour counter, and the half-year counter are internal calendar counters.

Figure 21A:
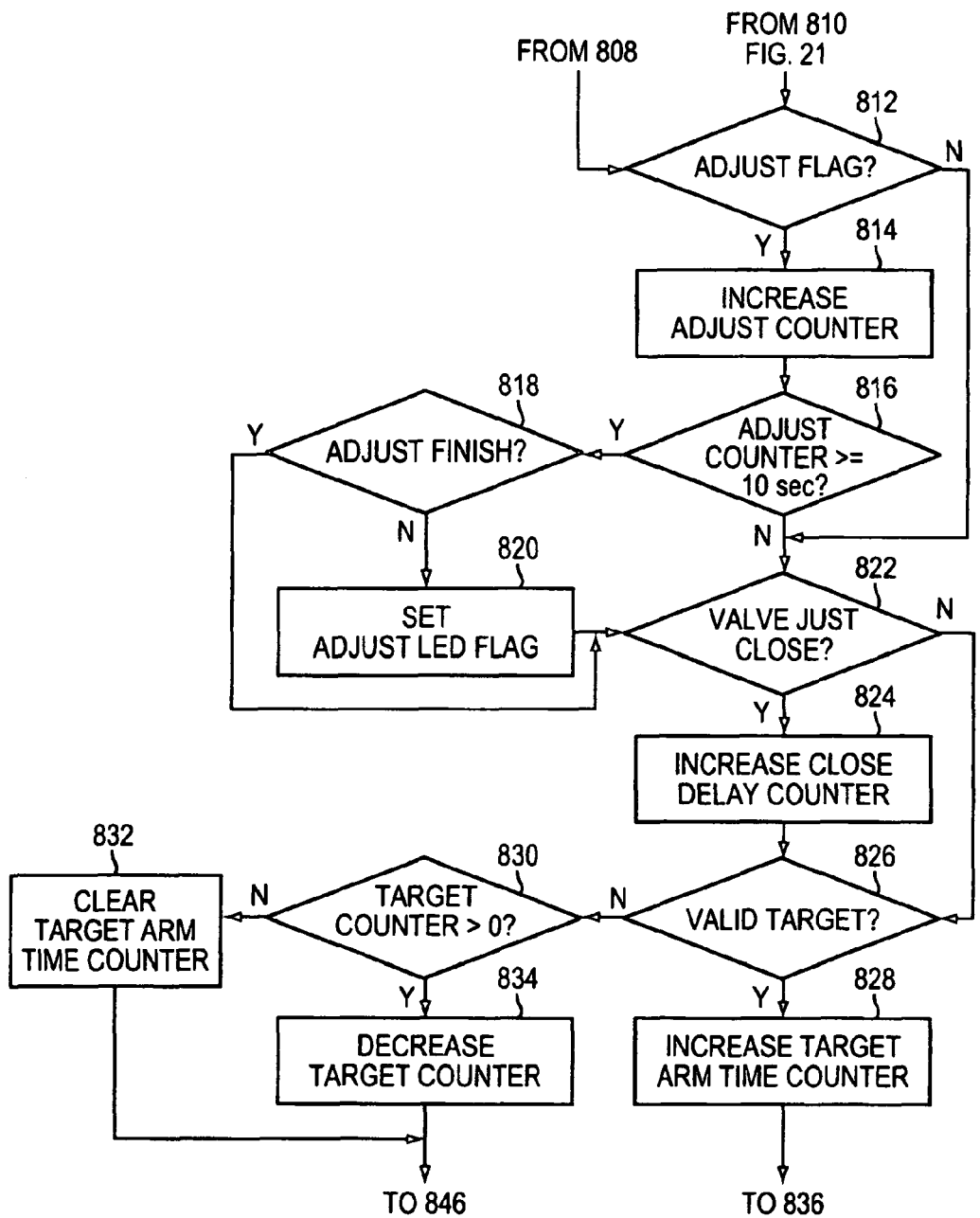
Figure 21B:
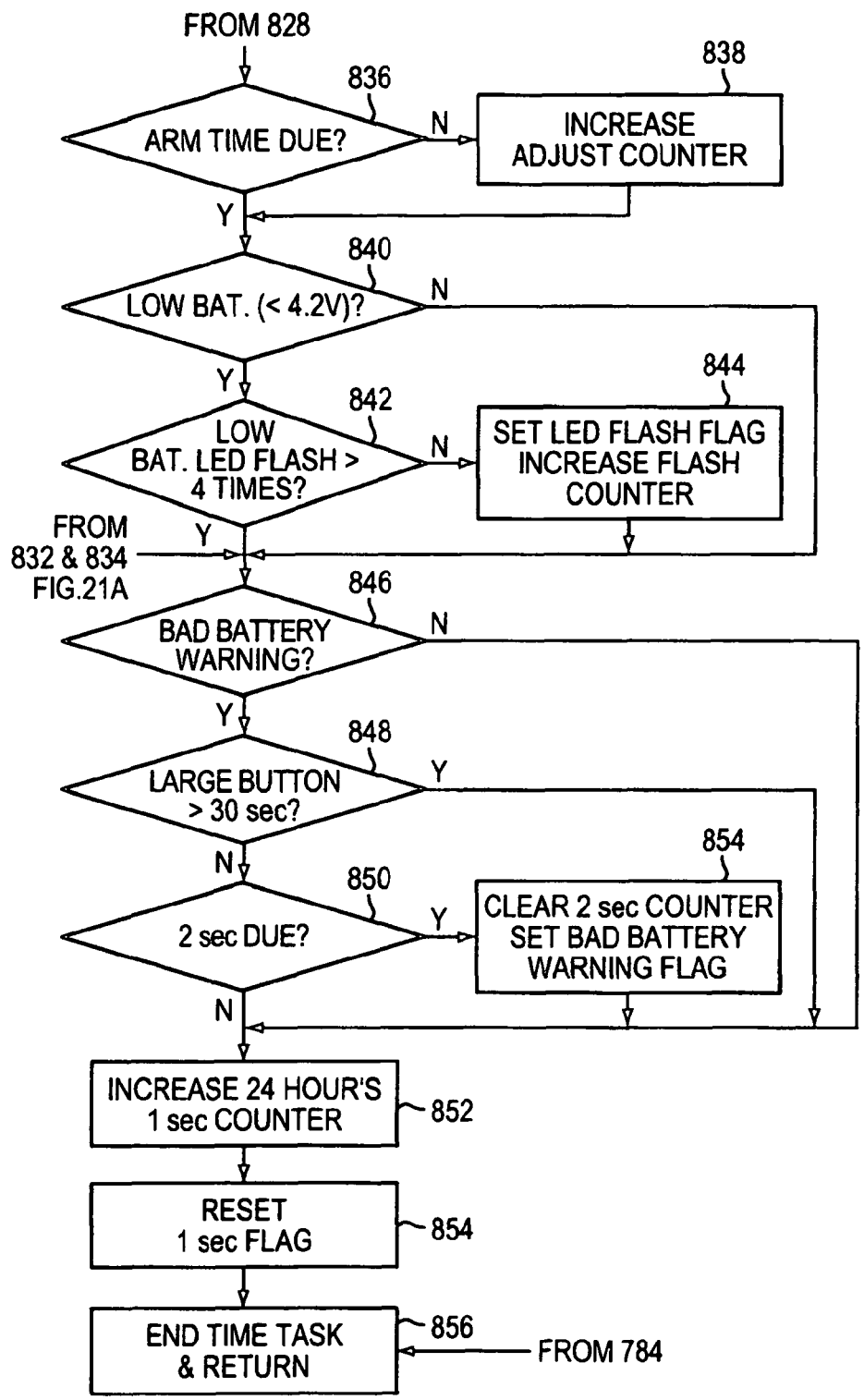

Algorithm 500 executed by the controller includes several subroutines as shown in FIGS. 19-19F. The internal timing tracking subroutine 536 (shown in FIGS. 21, 21A and 21B) manages time-sharing for the microcontroller. The battery power management subroutine 538 (shown in FIGS. 22 and 22A) is used for monitoring of the battery voltage. The open valve timer subroutine 570 (shown in FIGS. 23 and 23A) is used for controlling the flusher's actuator 40. The scan subroutine 584 (shown in FIG. 24) is used for detecting the position of a small button 255 used for a manual water flush having a low volume. The scan subroutine 590 (shown in FIG. 25) is used for detecting the position of a large button 256 used for a manual water flush having a large volume. The keyboard interrupt subroutine 930 (shown in FIG. 24A) is used for interrupting the algorithm.

The IR target detection utilizes the timer interrupt subroutine 620 shown in FIG. 26, and this subroutine includes a proc sensing logic subroutine 626, shown in FIG. 26A. The adjust LED subroutine 660 (shown in FIG. 29) is used to adjust the LED power during the IR target detection. The proc flush logic subroutine 630 (shown in FIG. 27) is used for automatically flushing after IR detection of a target.

Figure 32:
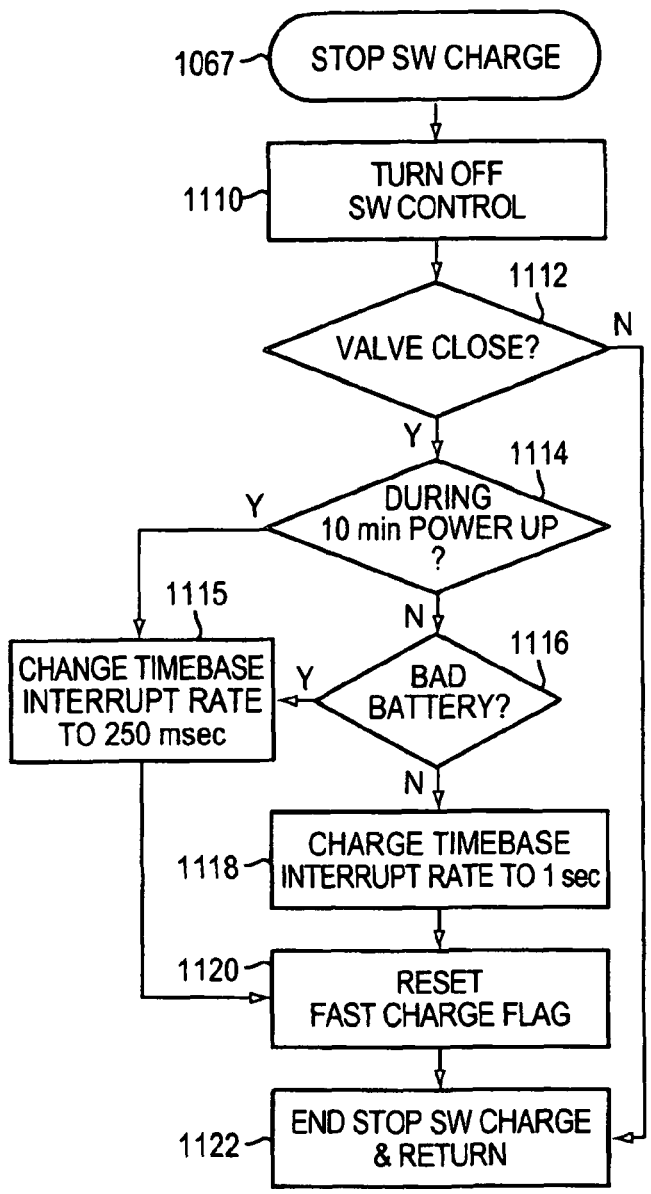
FIG. 32 shows a charge subroutine used in the algorithm shown in FIGS. 31, 31A and 31B.

The power management uses several subroutines. The stop charge subroutine 646 (shown in FIG. 28) is used for controlling the capacitor charging process. The battery power management subroutine (shown in FIG. 30) is used for monitoring the battery voltage. The charge subroutine 578 (shown in FIGS. 31, 31A and 31B) is used for checking and controlling the capacitor charging process, and this subroutine includes a charge subroutine 1067 shown in FIG. 32. All these subroutines are shown in the flow diagrams in great detail so that a person of ordinary skill in this art can write the code in a selected language.

According to another embodiment, the flush valve assembly does not include a diaphragm, but includes a piston valve described in detail in U.S. Pat. No. 5,881,993, which is incorporated by reference. The above-described cover and control unit are also applicable for the piston valve design. Furthermore, the above-described cover and control unit may also be used as a conversion kit for converting manual flushers or utilizing piston valves to automatic flushers using the above-described conversion method.

While the invention has been described with reference to the above embodiments, the present invention is by no means limited to the particular constructions described above and/or shown in the drawings. The present invention also comprises any modifications or equivalents within the scope of the following claims.

The invention claimed is:

1. An automatic bathroom flusher, comprising:
   a valve having a valve body including an inlet and an outlet and a valve seat inside said body;
   a valve member cooperatively arranged with said valve seat, said valve member being constructed and arranged to control water flow between said inlet and said outlet, movement of said valve member between open and closed positions being controlled by water pressure inside a pilot chamber;
   an external cover designed for enclosing an electronic control module comprising a sensor constructed and designed to detect a user, and a controller providing signals to initiate an actuator for controlling operation of said valve by controlling said water pressure, said controller being constructed and programmed to communicate with and control operation of said sensor and execute a target detection algorithm to detect said user, said controller being constructed to initiate an automatic flush cycle after detecting departure of said user; and
   a photovoltaic cell, sensitive to wavelengths of visible light, for providing electrical power to a rechargeable device and said photovoltaic cell providing a signal used by said controller as supplemental data in addition to signals from said sensor for controlling operation of said valve member based on said target detection algorithm and said supplemental data.

2. The flusher of claim 1 wherein said actuator includes a solenoid actuator receiving current from a solenoid driver and including a DC to DC converter connected to receive electrical power from said rechargeable device and provide constant voltage to said solenoid actuator.

3. The flusher of claim 1 wherein said sensor comprises an IR transmitter and an IR receiver.

4. The flush valve of claim 1 wherein said sensor comprises a passive optical sensor.

5. The flusher of claim 1 including an external switch, located on said external cover, for triggering a manual flush of said flush valve.

6. The flusher of claim 1 including two external switches for triggering manual flush cycles of said flush valve having different water volumes.

7. The flusher of claim 1 wherein said external cover includes said removable cover parts forming a main cover body, a front cover and a top cover, said front cover including a sensor window.

8. The flusher of claim 7 wherein said main cover body provides overall rigidity to said external cover.

9. The flusher of claim 7 wherein said top cover is removable while maintaining said front cover including a sensor window located in place with respect to said main cover body.

10. The flusher of claim 7 wherein said sensor includes an optical sensor comprising an IR transmitter and an IR receiver, and said sensor window in an optical window.

11. The flusher of claim 10 further constructed to adjust detection sensitivity of said optical sensor while maintaining said optical window located on said main cover body.

12. The flusher of claim 7 wherein said top cover includes two external switches for triggering manual flush cycles of said flush valve having different water volumes.

13. The flusher of claim 12 wherein said external switches provide a user interface for communicating with a controller of said flusher.

14. The flusher of claim 7 wherein said photovoltaic cell is associated with said top cover.

15. The flusher of claim 1 wherein said controller of said flush valve initiates automatic flush cycles having different water volumes depending on input from said sensor.

16. The flusher of claim 1 wherein said valve member includes a piston.

17. The flusher of claim 1 wherein said valve member includes a flexible diaphragm.

18. The flusher of claim 17 wherein said flexible diaphragm includes a relief passage controlled by said actuator and in communication with said outlet, said flexible diaphragm being retained with respect to said valve body by a pressure cap defining said pilot chamber.

19. The flusher of claim 18 including a bypass orifice in said diaphragm connecting said inlet with said pilot chamber, said orifice having a cross section area smaller than that of said relief passage.

20. The flusher of claim 1 further including a battery for providing electrical power and a power switch coupled to said battery and said rechargeable device receiving power from said photovoltaic cell said controller executing a power management algorithm including controlling said power switch.

21. The flusher of claim 1, wherein said photovoltaic cell provides said signal used by said controller to determine light or dark conditions.

22. The flusher of claim 1, wherein said rechargeable device includes a capacitor.

23. An automatic bathroom flusher, comprising:
a valve having a valve body including an inlet and an outlet and a valve seat inside said body;
a valve member cooperatively arranged with said valve seat, said valve member being constructed and arranged to control water flow between said inlet and said outlet, movement of said valve member between open and closed positions being controlled by water pressure inside a pilot chamber;
an external cover designed for enclosing an electronic control module comprising a sensor constructed and designed to detect a user, and a controller providing signals to a solenoid driver to initiate a solenoid actuator for controlling operation of said valve member by controlling said water pressure, said solenoid driver receiving battery power from a DC to DC converter designed to provide constant voltage, said controller being constructed and programmed to initiate an automatic flush cycle depending on a signal from said sensor; and
a manual override sensor constructed to be activated manually by a user and then provide said signals received by said solenoid driver initiating said solenoid actuator, said controller being constructed and programmed to scan said manual override sensor at a frequency depending on a mode of operation of said controller.

24. The flusher of claim 23, wherein said manual override sensor includes a pushbutton.

25. The flusher of claim 23, wherein said manual override sensor includes a capacitive sensor.

26. The flusher of claim 25, wherein said capacitive sensor is associated with a cover of the flusher.

27. The flusher of claim 25, wherein said capacitive sensor is located on a cover of the flusher.

28. The flusher of claim 23 further including a second manual override sensor, wherein said first-mentioned manual override sensor, and said second manual override sensor are constructed and designed to activate manual flush cycles of said flush valve having different water volumes, and said controller is constructed and programmed to scan both said manual override sensors.

29. The flusher of claim 23 wherein said sensor includes an optical sensor comprising an IR transmitter and an IR receiver.

30. The flusher of claim 23 wherein said sensor includes a passive optical detector comprising an IR receiver.

31. The flusher of claim 23 wherein said sensor includes an ultrasonic sensor.

32. An automatic bathroom flusher, comprising:
a valve having a valve body including an inlet and an outlet and a valve seat inside said body;
a valve member cooperatively arranged with said valve seat for control water flow between said inlet and said outlet by movement of said valve member between open and closed positions with respect to said valve seat;
an electronic control module comprising a sensor constructed and designed to detect a user and a controller providing signals to an actuator for controlling operation of said valve member and thus initiating an automatic flush cycle depending on a signal from said sensor;
a battery for providing electrical power; and
a photovoltaic cell sensitive to wavelengths of visible light, said photovoltaic cell being constructed and connected to provide electrical power to a storage capacitor;
a power switch coupled to said battery and said storage capacitor; and
said controller executing power management including controlling said power switch to optimize power usage from said battery and said storage capacitor and optimize power to said battery.

33. The flusher of claim 32, wherein said photovoltaic cell provides said signal used by said controller to control operation of said actuator.

34. The flusher of claim 32, wherein said photovoltaic cell provides said signal used by said controller to determine light or dark conditions.

35. The flusher of claim 32, wherein said sensor includes an optical sensor.

36. The flusher of claim 35 wherein said optical sensor includes an IR transmitter and an IR receiver.

37. The flusher of claim 32, wherein said optical sensor includes a passive sensor.

38. The flusher of claim 32 wherein said actuator includes a solenoid actuator receiving current from a solenoid driver and including a DC to DC converter connected to receive electrical power from said power switch and provide constant voltage to said solenoid actuator.

* * * * *